(12) United States Patent
Inoue et al.

(10) Patent No.: US 10,487,720 B2
(45) Date of Patent: Nov. 26, 2019

(54) CONTROL SYSTEM OF COMPRESSION-IGNITION ENGINE

(71) Applicant: Mazda Motor Corporation, Aki-gun, Hiroshima (JP)

(72) Inventors: Atsushi Inoue, Aki-gun (JP); Kota Matsumoto, Aki-gun (JP); Yusuke Kawai, Hiorshima (JP); Toru Miyamoto, Higashihiroshima (JP); Yudai Koshiro, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 70 days.

(21) Appl. No.: 15/962,383

(22) Filed: Apr. 25, 2018

(65) Prior Publication Data
US 2018/0334949 A1    Nov. 22, 2018

(30) Foreign Application Priority Data

May 19, 2017 (JP) ................................ 2017-100355
Dec. 13, 2017 (JP) ................................ 2017-238652

(51) Int. Cl.
*F02D 41/30*       (2006.01)
*F02B 9/02*        (2006.01)
(Continued)

(52) U.S. Cl.
CPC ............ *F02B 9/02* (2013.01); *F02B 23/0624* (2013.01); *F02B 23/0669* (2013.01);
(Continued)

(58) Field of Classification Search
CPC .... F02B 9/02; F02B 23/0624; F02B 23/0669; F02B 23/0696; F02M 26/03;
(Continued)

(56) References Cited

U.S. PATENT DOCUMENTS 6,138,639 A  * 10/2000  Hiraya ...................... F01L 3/06
                                                          123/295
8,544,444 B2 * 10/2013  Hitomi ................ F02D 13/0238
                                                          123/294
(Continued)

FOREIGN PATENT DOCUMENTS

JP         4082292 B2     4/2008

*Primary Examiner* — Hai H Huynh
(74) *Attorney, Agent, or Firm* — Alleman Hall Creasman & Tuttle LLP

(57) ABSTRACT

A control system of a compression-ignition engine is provided, which includes an engine, an injector, a spark plug, and a controller connected to the injector and the spark plug, and configured to operate the engine by outputting a control signal to the injector and the spark plug. After the spark plug ignites mixture gas to start combustion, unburned mixture gas combusts by self-ignition. The controller outputs the control signal to the injector to perform a first-stage injection of fuel and then a second-stage injection in which fuel is injected to at least form the mixture gas around the spark plug. The controller also outputs the control signal to the injector to control a ratio of the injection amount of the second-stage injection with respect to the injection amount of the first-stage injection to be higher at a high engine speed than at a low engine speed.

20 Claims, 23 Drawing Sheets

(51) Int. Cl.
    *F02D 41/00*     (2006.01)
    *F02D 37/02*     (2006.01)
    *F02D 41/40*     (2006.01)
    *F02F 3/26*     (2006.01)
    *F02B 23/06*     (2006.01)
    *F02D 13/02*     (2006.01)
    *F02M 26/03*     (2016.01)
    *F02D 41/38*     (2006.01)
    *F02D 41/14*     (2006.01)

(52) U.S. Cl.
    CPC ...... *F02B 23/0696* (2013.01); *F02D 13/0265* (2013.01); *F02D 37/02* (2013.01); *F02D 41/0002* (2013.01); *F02D 41/3041* (2013.01); *F02D 41/401* (2013.01); *F02D 41/402* (2013.01); *F02F 3/26* (2013.01); *F02M 26/03* (2016.02); *F02D 41/1441* (2013.01); *F02D 41/3023* (2013.01); *F02D 2041/001* (2013.01); *F02D 2041/0015* (2013.01); *F02D 2041/389* (2013.01); *F02D 2200/101* (2013.01)

(58) Field of Classification Search
    CPC ............... F02D 41/3041; F02D 41/402; F02D 41/0002; F02D 41/401; F02D 41/3023; F02D 41/1441; F02D 13/0265; F02D 37/02; F02D 2041/001; F02D 2041/0015; F02D 2041/389; F02D 2200/101; F02F 3/26
    USPC ........................ 123/298, 299, 300, 305, 436; 701/103–105, 110
    See application file for complete search history.

(56) References Cited

U.S. PATENT DOCUMENTS

| | | | |
|---|---|---|---|
| 10,119,517 B2* | 11/2018 | Hirooka | F02P 15/003 |
| 2005/0016496 A1 | 1/2005 | Hitomi et al. | |
| 2012/0111302 A1* | 5/2012 | Shishime | F02D 41/405 |
| | | | 123/299 |
| 2012/0216776 A1* | 8/2012 | Nagatsu | F02B 23/101 |
| | | | 123/305 |
| 2014/0060489 A1* | 3/2014 | Iwai | F02B 23/101 |
| | | | 123/478 |

\* cited by examiner

CONTROL SYSTEM OF COMPRESSION-IGNITION ENGINE

TECHNICAL FIELD

The present disclosure relates to a control system of a compression-ignition engine.

BACKGROUND OF THE DISCLOSURE

JP4082292B discloses an engine for combusting a mixture gas inside a combustion chamber by self-ignition within a given operating range where an engine load and an engine speed are low. The engine combusts the mixture gas by spark-ignition within an operating range where the engine load is higher than the given operating range and an operating range where the engine speed is higher than the given operating range.

Incidentally, combustion caused by compression ignition accompanies relatively loud combustion noise. When the engine speed is high, NVH (Noise Vibration Harshness) of the engine exceeds an allowable value.

SUMMARY OF THE DISCLOSURE

The present disclosure is made in view of the above situations and aims to perform combustion by compression ignition while suppressing NVH of a compression-ignition engine below an allowable value.

The present inventors considered a combustion mode in which SI (Spark Ignition) combustion and CI (Compression Ignition) combustion (or self-ignition, AI (Auto Ignition) combustion) are combined. The SI combustion is combustion accompanying flame propagation which starts by forcibly igniting the mixture gas inside a combustion chamber. The CI combustion is combustion which starts by the mixture gas inside the combustion chamber igniting by being compressed. In the combustion mode combining the SI combustion and the CI combustion, a spark plug forcibly ignites the mixture gas inside the combustion chamber to combust it through flame propagation, and heat generated by this combustion raises the temperature inside the combustion chamber, which leads to combustion of unburned mixture gas by self-ignition.

In the CI combustion, the timing of the self-ignition changes greatly due to a variation in the temperature inside the combustion chamber before the compression starts. For example, if the timing of the self-ignition advances, the combustion noise increases.

In this regard, the variation in the temperature inside the combustion chamber before the compression starts can be reduced by adjusting the heat generation amount in the SI combustion. For example, by controlling the ignition timing to adjust the start timing of the SI combustion according to the temperature inside the combustion chamber before the compression starts, the unburned mixture gas can self-ignite at a target timing. Hereinafter, the combustion mode in which the SI combustion and the CI combustion are combined so that the CI combustion is controlled using the SI combustion is referred to as SPCCI (SPark Controlled Compression Ignition) combustion.

The combustion by flame propagation causes a relatively small pressure variation, thus reducing the combustion noise. Further, the CI combustion shortens the combustion period compared to the combustion by flame propagation, which is advantageous in improving fuel efficiency. Therefore, the combustion mode combining the SI combustion and the CI combustion improves fuel efficiency while reducing the combustion noise.

By performing the SPCCI combustion when an engine speed is high, it is possible to perform the CI combustion while suppressing NVH below the allowable value.

Specifically, according to one aspect of the present disclosure, a control system of a compression-ignition engine is provided, which includes an engine configured to cause combustion of a mixture gas inside a combustion chamber, an injector attached to the engine and configured to inject fuel into the combustion chamber, a spark plug disposed to be oriented into the combustion chamber and configured to ignite the mixture gas inside the combustion chamber, and a controller connected to the injector and the spark plug, and configured to operate the engine by outputting a control signal to the injector and the spark plug, respectively.

After the spark plug ignites the mixture gas to start combustion, unburned mixture gas combusts by self-ignition. The controller outputs the control signal to the injector to perform a first-stage injection of the fuel and, after the first-stage injection, a second-stage injection in which the fuel is injected to at least form the mixture gas around the spark plug. The controller also outputs the control signal to the injector to control a ratio of the injection amount of the second-stage injection with respect to the injection amount of the first-stage injection to be higher at a high engine speed than at a low engine speed.

Note that the definition of "combustion chamber" here is not limited to a space formed when a piston is at a top dead center on compression stroke (CTDC) but is broad.

According to this configuration, the injector performs the first-stage injection and the second-stage injection in response to the control signal from the controller. The second-stage injection at least forms the mixture gas around the spark plug. The first-stage injection forms the mixture gas around the mixture gas to be formed by the second-stage injection.

The spark plug forcibly ignites the mixture gas in the combustion chamber, particularly, the mixture gas around the spark plug, in response to the control signal from the controller. The mixture gas around the spark plug combusts by flame propagation. After the combustion starts by the flame propagation, the combustion ends by the unburned mixture gas inside the combustion chamber combusting by self-ignition. In the combustion chamber, the SPCCI combustion is performed. As described above, the SPCCI combustion achieves both prevention of the combustion noise and improvement in the fuel efficiency.

The controller increases the injection amount of the second-stage injection at the high engine speed compared to at the low engine speed. By increasing the injection amount of the second-stage injection, since a concentration of the mixture gas formed around the spark plug increases, the SI combustion in the SPCCI combustion becomes sharp. As a result, the SI combustion is sufficiently performed until the unburned mixture gas self-ignites, and a ratio of the CI combustion in the SPCCI combustion decreases. Thus, the combustion noise generated by the SPCCI combustion is reduced, and when the engine speed is high, NVH is suppressed below the allowable value.

Further, according to another aspect of the present disclosure, a control system of a compression-ignition engine is provided, which includes an engine configured to cause combustion of a mixture gas inside a combustion chamber, an injector attached to the engine and configured to inject fuel into the combustion chamber, a spark plug disposed adjacent to the injector and configured to ignite the mixture gas inside the combustion chamber, and a controller operatively connected to the injector and the spark plug and configured to operate the engine by outputting a control signal to the injector and the spark plug, respectively.

After the spark plug ignites the mixture gas to start combustion, unburned mixture gas combusts by self-ignition. The controller outputs the control signal to the injector to perform a first-stage injection of the fuel in a period from intake stroke to an early half of compression stroke, and a second-stage injection in a period from a latter half of the compression stroke to an early half of expansion stroke. The controller also outputs the control signal to the injector to control a ratio of the injection amount of the second-stage injection with respect to the injection amount of the first-stage injection to be higher at a high engine speed than at a low engine speed.

According to this configuration, similarly to the above description, the controller outputs the control signal to the injector to perform the first-stage injection of the fuel in the period from the intake stroke to the early half of the compression stroke, and the second-stage injection in the period from the latter half of the compression stroke to the early half of the expansion stroke. The early half of the compression stroke may be defined by evenly dividing the compression stroke into two parts of the early half and the latter half. Similarly, the latter half of the compression stroke may be defined by evenly dividing the compression stroke into two parts of the early half and the latter half. The early half of the expansion stroke may be defined by evenly dividing the expansion stroke into two parts of the early half and the latter half. In the second-stage injection, since the injection timing is late, the mixture gas is formed near the spark plug adjacent to the injector, whereas in the first-stage injection, since the injection timing is early, the mixture gas is formed at a position inside the combustion chamber away from the injector and the spark plug.

The spark plug forcibly ignites the mixture gas near the spark plug in response to the control signal from the controller. The mixture gas combusts by flame propagation. After the combustion starts by flame propagation, the combustion ends by the unburned mixture gas away from the spark plug combusting by self-ignition. That is, in the combustion chamber, the SPCCI combustion is performed.

Further, the controller increases the injection amount of the second-stage injection at the high engine speed. Thus, since a concentration of the mixture gas near the spark plug increases, the SI combustion in the SPCCI combustion becomes sharp and the ratio of the CI combustion decreases. As a result, the combustion noise is reduced, and therefore, when the engine speed is high, NVH is suppressed below the allowable value.

The controller may output the control signal to the injector so that the ratio of the injection amount of the second-stage injection changes at a given change rate as the engine speed changes. The controller may cause the change rate to be higher at a high engine speed than at a low engine speed.

Thus, the ratio of the injection amount of the second-stage injection increases at the given change rate as the engine speed increases. When the engine speed is high, the SI combustion in the SPCCI combustion becomes sharp, which is advantageous in reducing the combustion noise. Therefore, when the engine speed is high, NVH is suppressed below the allowable value.

When the engine speed is equal to or lower than a first given speed, the controller may output the control signal to the injector so that the ratio of the injection amount of the second-stage injection is constant even when the engine speed changes. When the engine speed exceeds the first given speed, the controller may output the control signal to the injector so that the ratio of the injection amount of the second-stage injection increases as the engine speed increases.

Since NVH of the engine is small when the engine speed is low, rather than reducing the combustion noise, performing CI combustion at a high ratio in the SPCCI combustion is advantageous in improving fuel efficiency. When the engine speed is equal to or lower than the first given speed, the control signal is outputted to the injector so that the ratio of the injection amount of the second-stage injection is constant even when the engine speed changes. This corresponds to the change rate of the ratio of the injection amount of the second-stage injection changing as the engine speed changes being zero. By having the injection amount of the second-stage injection small and the change rate zero when the engine speed is low, the CI combustion is sufficiently performed in the SPCCI combustion, which improves fuel efficiency.

On the other hand, since NVH of the engine becomes larger when the engine speed increases, it is required to reduce the combustion noise. When the engine speed exceeds the first given speed, the control signal is outputted to the injector so that the ratio of the injection amount of the second-stage injection increases as the engine speed increases. This corresponds to the change rate of the ratio of the injection amount of the second-stage injection changing as the engine speed changes exceeding zero. When the engine speed is high, the SI combustion is sufficiently performed in the SPCCI combustion, which reduces the combustion noise.

When the engine speed exceeds a second given speed that is higher than the first given speed, the controller may output the control signal to the injector so that the ratio of the injection amount of the second-stage injection becomes a given value.

In the second-stage injection, since the timing for injecting the fuel in terms of a crank angle is late, the period until the injected fuel forms the combustible mixture gas is short. Further, as the engine speed increases, the time for the crank angle to change by the same angle is shorter. Therefore, the time length from the injection of the fuel in the second-stage injection to the ignition becomes shorter as the engine speed increases.

As described above, when the ratio of the injection amount of the second-stage injection is increased as the engine speed increases, a large amount of fuel needs to be vaporized in a short period of time to form the mixture gas. Here, in reality, the amount of fuel which does not combust in the SI combustion of the SPCCI combustion increases, a large amount of fuel causes the CI combustion, and thus the combustion noise may increase.

Therefore, in a configuration in which the second-stage injection ratio is increased as the engine speed increases, when the engine speed exceeds the second given speed that is higher than the first given speed, the control signal is outputted to the injector so that the ratio of the injection amount of the second-stage injection becomes the given value. That is, when the engine speed exceeds the second given speed, the injection amount of the second-stage injection is fixed at a given amount regardless of the engine speed. Thus, the fuel which is not combusted in the SI combustion is prevented from increasing, and the combustion noise is avoided from increasing due to the CI combustion.

The control system may further include an intake flow control device attached to the engine and configured to adjust a flow of intake air introduced into the combustion chamber. When the engine speed exceeds the second given speed, the controller may output the control signal to the intake flow control device to strengthen the flow of the intake air.

If the injection amount of the second-stage injection is fixed at the given amount when the engine speed exceeds the second given speed as described above, the effect of reducing the combustion noise caused by increasing the injection amount of the second-stage injection is limited.

Therefore, with the above configuration, when the engine speed exceeds the second given speed, the flow of the intake air is strengthened by the intake flow control device. Thus, a vaporization of the fuel injected by the second-stage injection is stimulated and the SI combustion is performed with the strong flow inside the combustion chamber, which causes the SI combustion in the SPCCI combustion to be sharp. Therefore, even when the engine speed exceeds the second given speed, the combustion noise is reduced.

The controller may output the control signal to the intake flow control device to strengthen the flow of the intake air as the engine speed increases.

Thus, when the engine speed is high, since the SI combustion becomes sharp by the strong intake flow, the combustion noise is reduced. The operating range in which the combustion is performed by the compression ignition is further extended to the higher engine speed side.

The controller may output the control signal to the injector so that an injection timing of the second-stage injection is advanced when the engine operates at a high speed compared to when the engine operates at a low speed.

When the engine speed increases, the vaporization period from the injection of the fuel into the combustion chamber to the ignition thereof becomes shorter. In the SPCCI combustion, the amount of the mixture gas which combusts in the SI combustion decreases and the CI combustion increases. Since the ratio of the injection amount of the second-stage injection is increased when the engine speed is high, the ratio of the CI combustion increases by the decreased amount of the mixture gas which combusts in the SI combustion. As a result, the combustion noise of the SPCCI combustion increases and NVH may exceed the allowable value.

By advancing the injection timing, the vaporization period is extended and the amount of the mixture gas which combusts in the SI combustion increases. Since the combustion noise of the SPCCI combustion is reduced, when the engine speed is high, NVH is suppressed below the allowable value.

The engine may include a piston constituting the combustion chamber, the piston being formed with a cavity facing the injector, by indenting an upper surface of the piston. In the first-stage injection, the fuel may be injected into a squish area outside the cavity on compression stroke, and in the second-stage injection, the fuel may be injected into the cavity.

According to this configuration, the mixture gas in the cavity combusts in the SI combustion. Here, the phrase "the section within the cavity" may mean a combination of a section from a projection plane of an opening surface of the cavity on the ceiling surface of the combustion chamber to the opening surface of the cavity and a section inside the cavity. By injecting the fuel toward the cavity, homogeneous mixture gas is formed inside the cavity and a flow of gas inside the section within the cavity is strengthened. Thus, the spark plug ignites the mixture gas under a state where turbulence kinetic energy inside the section within the cavity is high. Therefore, since the SI combustion becomes sharp, the combustion noise is reduced also at the high engine speed.

The controller may set an SI ratio to be lower than 100% and set the SI ratio to be higher at a high engine speed than at a low engine speed, the SI ratio being an index relating to a ratio of a heat amount generated when the ignited mixture gas combusts by flame propagation with respect to a total heat amount generated when the mixture gas inside the combustion chamber combusts.

In the combustion mode in which the mixture gas combusts by the flame propagation and, after the combustion starts by the flame propagation, the combustion ends by the unburned mixture gas combusting by the self-ignition (i.e., SPCCI combustion), the SI ratio is set to be lower than 100%. In the combustion mode in which the combustion ends only with the combustion by the flame propagation without the combustion by the self-ignition, the SI ratio is set to 100%

When the SI ratio is increased in the SPCCI combustion, the ratio of the SI combustion increases, which is advantageous in reducing the combustion noise. On the other hand, when the SI ratio is decreased in the SPCCI combustion, the ratio of the CI combustion increases, which is advantageous in improving fuel efficiency.

In the above configuration, the ratio of the injection amount of the second-stage injection is increased at the high engine speed compared to at the low engine speed. Thus, the SI ratio in the SPCCI combustion is increased. Therefore, the combustion noise is reduced and, even when the engine speed is high, the SPCCI combustion is performed.

The control system may further include a swirl generating part configured to generate a swirl flow inside the combustion chamber. The controller may output the control signal to the swirl generating part to generate the swirl flow inside the combustion chamber regardless of the engine speed.

If the swirl generating part generates the swirl flow inside the combustion chamber, the SI combustion in the SPCCI combustion becomes sharp. By generating the swirl flow inside the combustion chamber regardless of the engine speed, the combustion noise caused by the SPCCI combustion is reduced without increasing the injection amount of the second-stage injection. Since the vaporization time for the fuel injected by the second-stage injection is short, unburned fuel or soot may be generated. Thus, by not increasing the injection amount of the second-stage injection, the generation of unburned mixture gas or soot is reduced. That is, generating the swirl flow inside the combustion chamber is advantageous in improving an exhaust emission performance of the engine.

At least within a highest speed segment of an operating range of the engine in which the spark plug ignites the mixture gas to start the combustion and then the unburned mixture gas combusts by self-ignition, the controller may output the control signal to the injector so that the ratio of the injection amount of the second-stage injection becomes higher at a high engine speed than at a low engine speed.

As described above, by generating the swirl flow inside the combustion chamber, the injection amount of the second-stage injection is reduced. Therefore, in a configuration in which the injection ratio of the second-stage injection is increased when the engine speed is high, when the engine speed is in a highest speed range in which the SPCCI combustion is performed, the injection amount of the second-stage injection is increased without any limitation.

DETAILED DESCRIPTION OF THE DISCLOSURE

Figure 1:
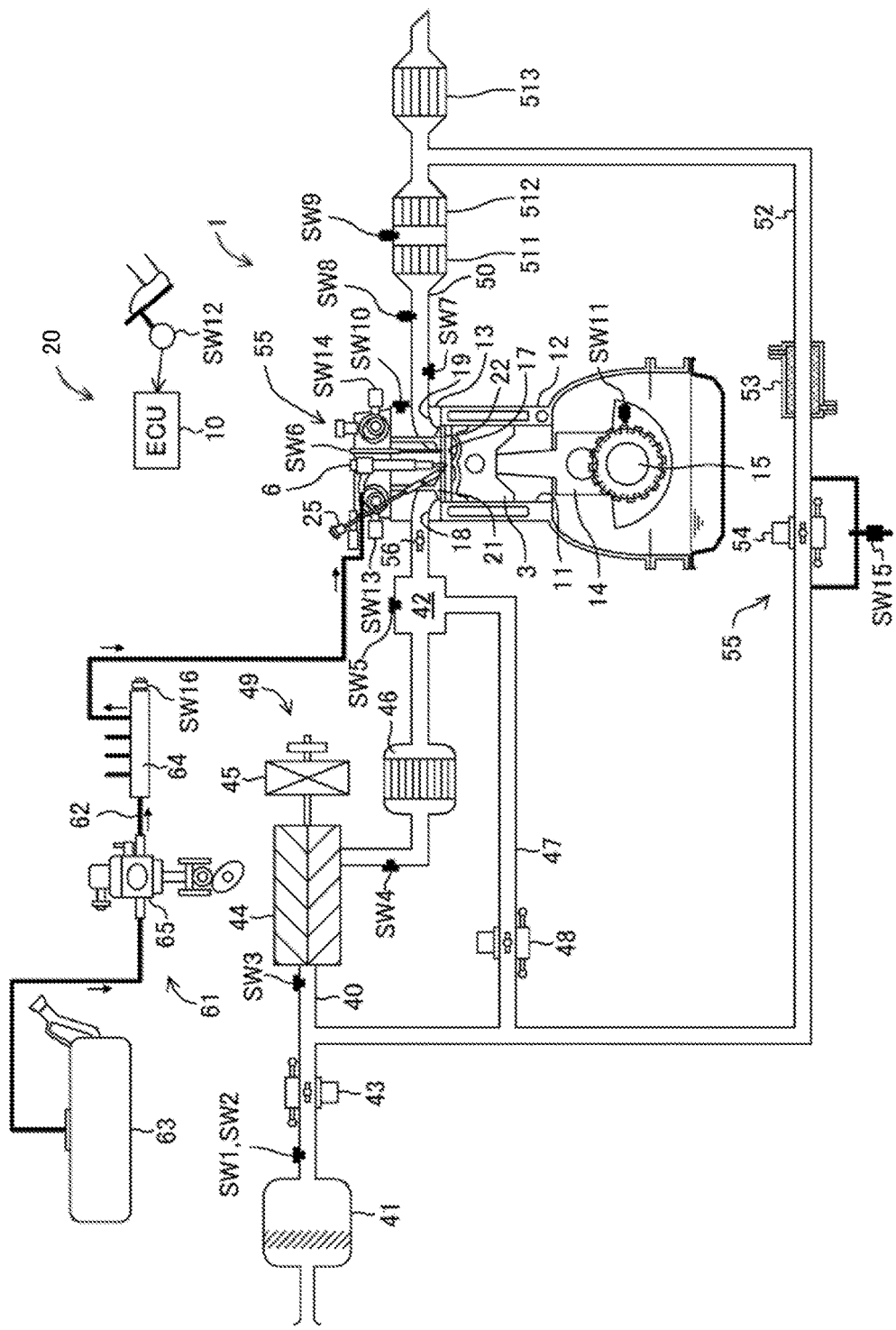
FIG. 1 is a diagram illustrating a configuration of an engine.
Figure 2:
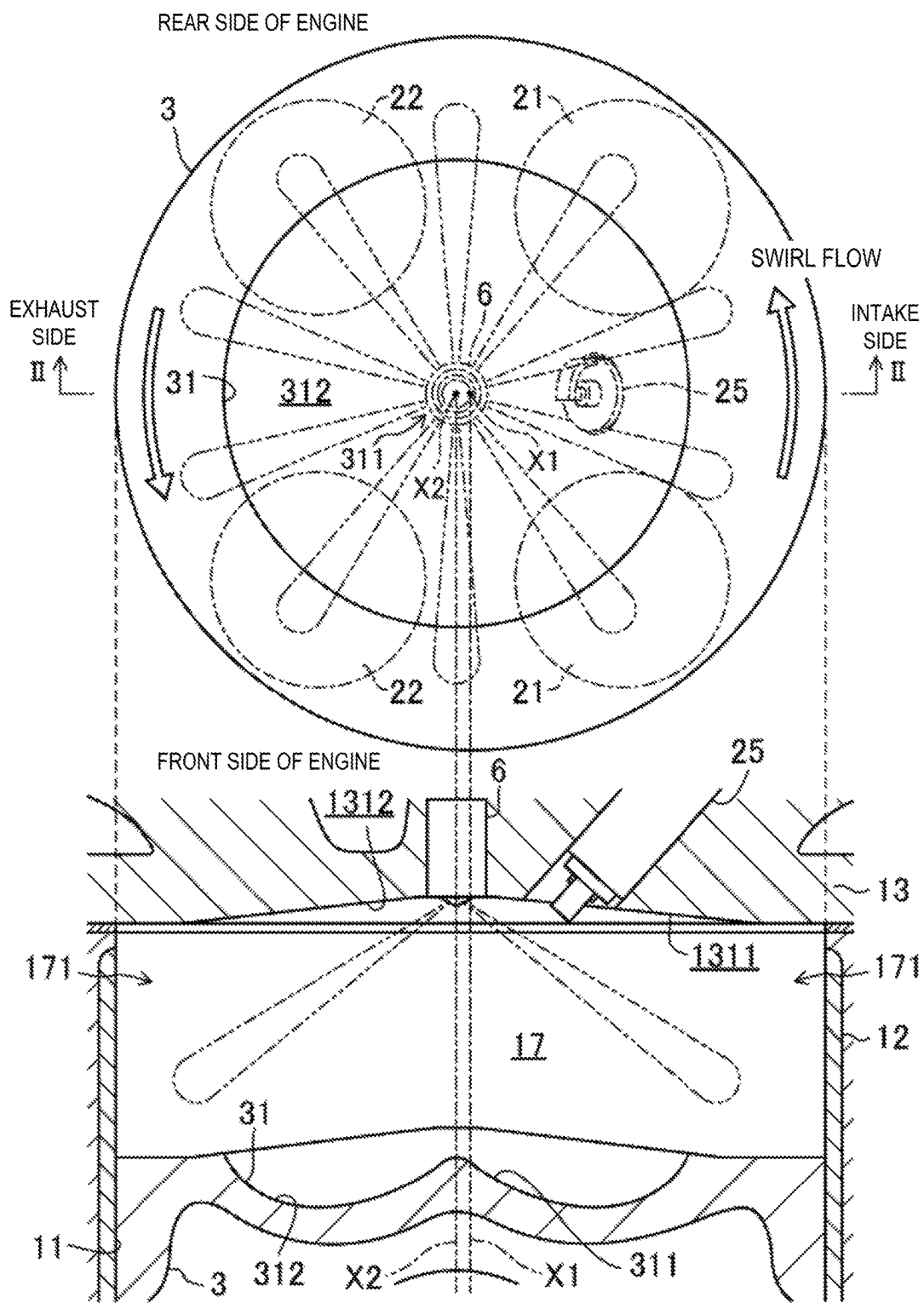
FIG. 2 is a diagram illustrating a structure of a combustion chamber, in which the upper part is a plan view of the combustion chamber and the lower part is a II-II cross-sectional view.
Figure 3:
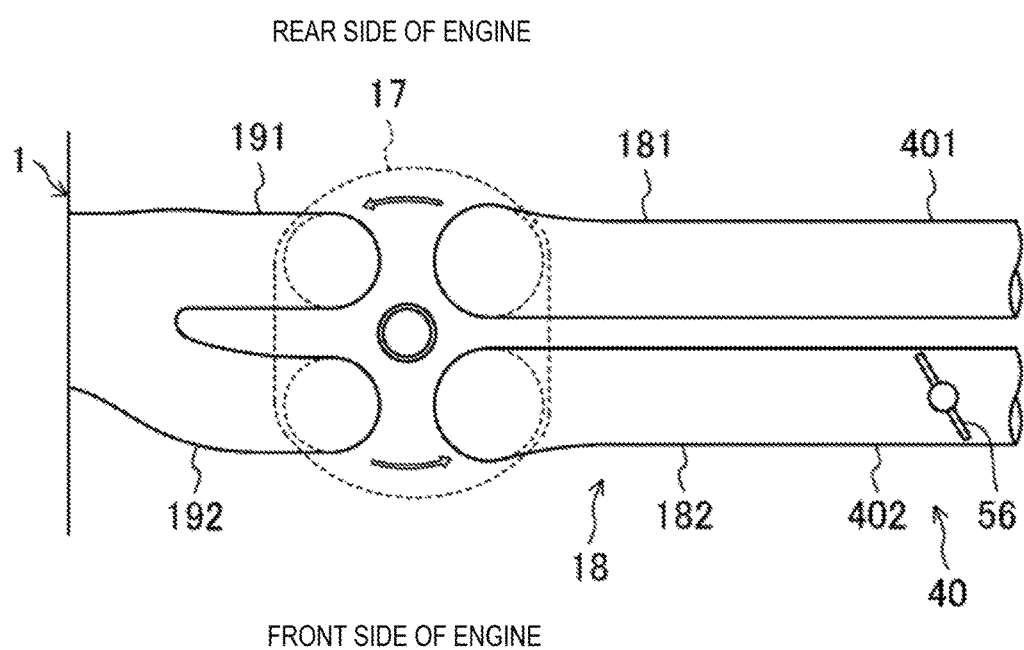
FIG. 3 is a plan view illustrating structures of the combustion chamber and an intake system.
Figure 4:
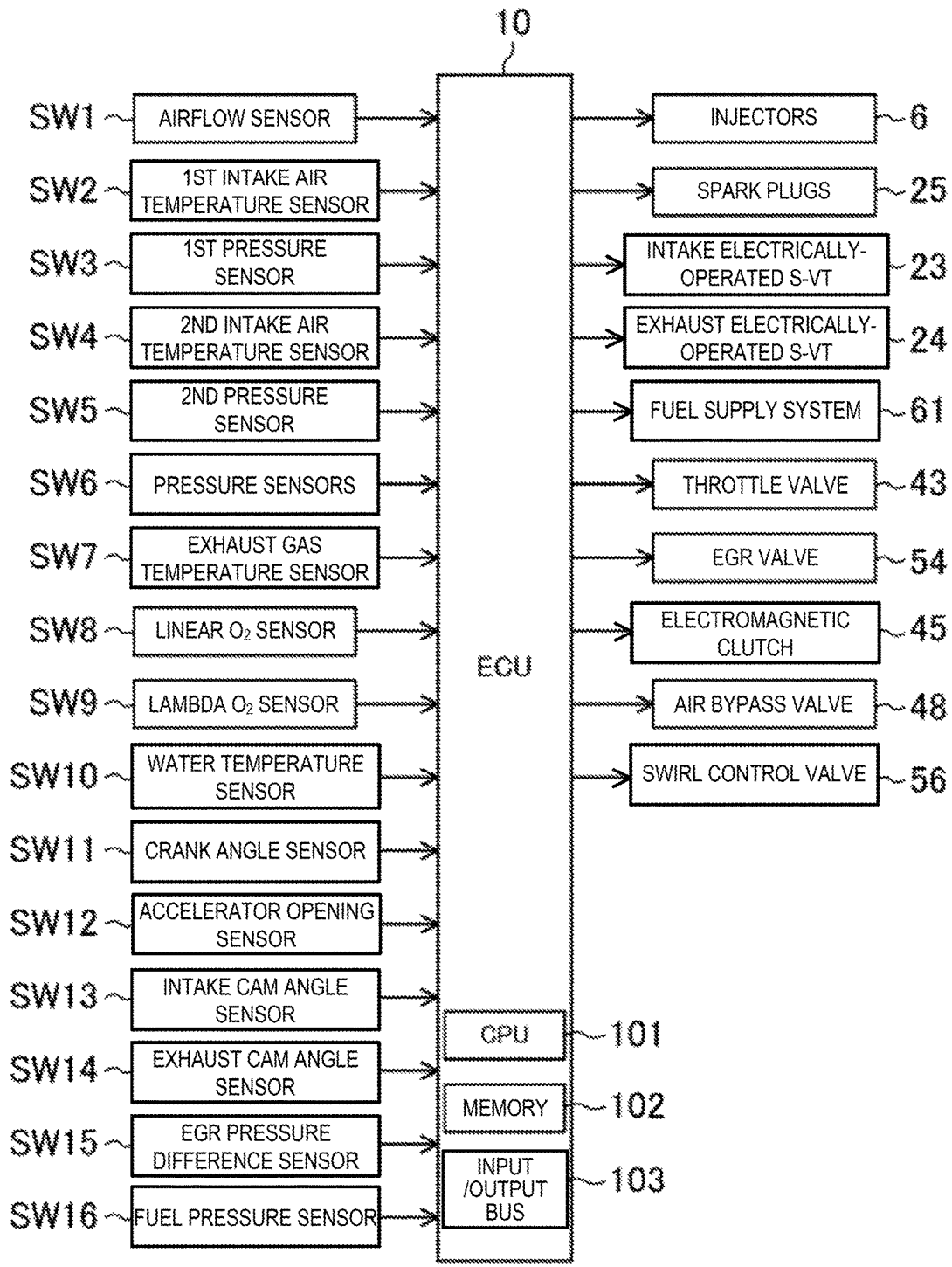
FIG. 4 is a block diagram illustrating a configuration of a control device of the engine.

Hereinafter, embodiments of a control system of a compression-ignition engine are described in detail with reference to the accompanying drawings. The following description gives one example of the control system of the compression-ignition engine. FIG. 1 is a diagram illustrating a configuration of the compression-ignition engine. FIG. 2 is a cross-sectional view illustrating a structure of a combustion chamber, in which the upper part is a plan view of the combustion chamber and the lower part is a II-II cross-sectional view. FIG. 3 is a plan view illustrating structures of the combustion chamber and an intake system. Note that in FIG. 1, an intake side is on the left side and an exhaust side is on the right side of the drawing sheet. Further in FIGS. 2 and 3, the intake side is on the right side and the exhaust side is on the left side of the drawing sheets. FIG. 4 is a block diagram illustrating a configuration of a control device of the compression-ignition engine.

An engine 1 is a four-stroke engine which is operated by a combustion chamber 17 repeating intake stroke, compression stroke, expansion stroke, and exhaust stroke. The engine 1 is mounted on a four-wheel automobile. The automobile travels by the operation of the engine 1. Fuel of the engine 1 is gasoline in this embodiment. The gasoline may contain bioethanol, etc. The fuel of the engine 1 may be any kind of fuel as long as it is a liquid fuel containing at least gasoline.

(Engine Configuration)

The engine 1 includes a cylinder block 12 and a cylinder head 13 placed on the cylinder block 12. The cylinder block 12 is formed therein with a plurality of cylinders 11. In FIGS. 1 and 2, only one cylinder 11 is illustrated. The engine 1 is a multi-cylinder engine.

A piston 3 is reciprocatably inserted in each cylinder 11. The piston 3 is coupled to a crankshaft 15 via a connecting rod 14. The piston 3 defines the combustion chamber 17 together with the cylinder 11 and the cylinder head 13. Note that the definition of "combustion chamber" is not limited to a space formed when the piston 3 is at a top dead center on compression stroke (CTDC) but may be broad. That is, "combustion chamber" may mean any space formed by the piston 3, the cylinder 11 and the cylinder head 13 regardless of the position of the piston 3.

As illustrated in FIG. 2, a lower surface of the cylinder head 13, that is, a ceiling surface of the combustion chamber 17, is formed by an inclined surface 1311 and an inclined surface 1312. The inclined surface 1311 inclines upwardly toward an injection axis X2 (an axis passing through the center of injection of an injector 6 described later) from the intake side. The inclined surface 1312 inclines upwardly toward the injection axis X2 from the exhaust side. The ceiling surface of the combustion chamber 17 has a so-called pent-roof shape.

An upper surface of the piston 3 bulges toward the ceiling surface of the combustion chamber 17. A cavity 31 is formed in the upper surface of the piston 3. The cavity 31 is formed by indenting the upper surface of the piston 3. The cavity 31 has a shallow plate shape. The cavity 31 faces the injector 6 when the piston 3 is located near CTDC.

The center of the cavity 31 is offset from a center axis X1 of the cylinder 11 to the exhaust side and coincides with the injection axis X2 of the injector 6. The cavity 31 has a convex section 311. The convex section 311 is formed on the injection axis X2 of the injector 6. The convex section 311 has a substantially conical shape. The convex section 311 extends upwardly toward the ceiling surface of the cylinder 11 from the bottom of the cavity 31.

The cavity 31 has an indented section 312 formed to surround the convex section 311 entirely. The cavity 31 has a symmetric shape with respect to the injection axis X2.

A circumferential side face of the indented section 312 extends from a bottom surface of the cavity 31 to an opening surface of the cavity 31, inclined with respect to the injection axis X2. An inner diameter of the cavity 31 at the indented section 312 gradually increases from the bottom surface of the cavity 31 to the opening surface of the cavity 31.

Note that the shape of the combustion chamber 17 is not limited to that illustrated in FIG. 2. The shapes of the cavity 31, the upper surface of the piston 3, the ceiling surface of the combustion chamber 17, etc. are suitably changeable. For example, the depth of the indented section 312 may be shallower on the outer circumferential side. In this case, an amount of EGR (Exhaust Gas Recirculation) gas around a spark plug 25 (described later) decreases, and flame propagation of SI combustion in SPCCI combustion (also described later) becomes favorable. Furthermore, the cavity 31 may not have the convex section 311.

The geometric compression ratio of the engine 1 is set high in order to improve a theoretical thermal efficiency and stabilize CI combustion described later. For example, the geometric compression ratio of the engine 1 is 14:1 or higher. The geometric compression ratio may be 18:1, for example. The geometric compression ratio may suitably be set within a range of 14:1 to 20:1.

The cylinder head 13 is formed with an intake port 18 for each cylinder 11. As illustrated in FIG. 3, the intake port 18 includes two intake ports of a first intake port 181 and a second intake port 182. The first intake port 181 and the second intake port 182 are arranged in axial directions of the crankshaft 15, i.e., front-and-rear directions of the engine 1. The intake port 18 communicates with the combustion chamber 17. Although not illustrated in detail, the intake port 18 is a so-called tumble port. That is, the intake port 18 has such a shape that a tumble flow is formed in the combustion chamber 17.

An intake valve 21 is disposed in the intake port 18. The intake valve 21 opens and closes the intake port 18 to and from the combustion chamber 17. The intake valve 21 is opened and closed by a valve operating mechanism at a given timing. This valve operating mechanism may be a variable valve mechanism which makes a valve timing and/or valve lift variable. In this configuration example, as illustrated in FIG. 4, the variable valve mechanism has an intake electrically-operated S-VT (Sequential-Valve Timing) 23. The intake electrically-operated S-VT 23 is continuously variable of a rotational phase of an intake camshaft within a given angular range. Thus, the open and close timings of the intake valve 21 continuously change. Note that the intake valve operating mechanism may have a hydraulically-operated S-VT instead of the electrically-operated S-VT.

The cylinder head 13 is also formed with an exhaust port 19 for each cylinder 11. As illustrated in FIG. 3, the exhaust port 19 also includes two exhaust ports of a first exhaust port 191 and a second exhaust port 192. The first exhaust port 191 and the second exhaust port 192 are arranged in the front-and-rear directions of the engine 1. The exhaust port 19 communicates with the combustion chamber 17.

An exhaust valve 22 is disposed in the exhaust port 19. The exhaust valve 22 opens and closes the exhaust port 19 to and from the combustion chamber 17. The exhaust valve 22 is opened and closed by a valve operating mechanism at a given timing. This valve operating mechanism may be a variable valve mechanism which makes a valve timing and/or valve lift variable. In this configuration example, as illustrated in FIG. 4, the variable valve mechanism has an exhaust electrically-operated S-VT 24. The exhaust electrically-operated S-VT 24 is continuously variable of a rotational phase of an exhaust camshaft within a given angular range. Thus, the open and close timings of the exhaust valve 22 continuously change. Note that the exhaust valve operating mechanism may have a hydraulically-operated S-VT instead of the electrically-operated S-VT.

Although is described later in detail, the engine 1 adjusts the length of an overlap period of the open timing of the intake valve 21 and the close timing of the exhaust valve 22 by the intake electrically-operated S-VT 23 and the exhaust electrically-operated S-VT 24. Thus, residual gas in the combustion chamber 17 is scavenged. Further, by adjusting the length of the overlap period, internal EGR gas is introduced into the combustion chamber 17 or is confined in the combustion chamber 17. In this configuration example, the intake electrically-operated S-VT 23 and the exhaust electrically-operated S-VT 24 constitute an internal EGR system as one of state function setting devices. Note that the internal EGR system is not necessarily constituted by the S-VT.

The injector 6 is attached to the cylinder head 13 for each cylinder 11. The injector 6 injects the fuel directly into the combustion chamber 17. The injector 6 is disposed in a valley portion of the pent roof where the inclined surface 1311 on the intake side and the inclined surface 1312 on the exhaust side intersect. As illustrated in FIG. 2, the injector 6 is disposed so that its injection axis X2 is located on the exhaust side of the center axis X1. The injection axis X2 of the injector 6 is parallel to the center axis X1. As described above, the injection axis X2 of the injector 6 coincides with the position of the convex section 311 of the cavity 31. The injector 6 is oriented toward the cavity 31. Note that the injection axis X2 of the injector 6 may coincide with the center axis X1 of the cylinder 11. Also in this case, it is desirable that the injection axis X2 of the injector 6 coincide with the position of the convex section 311 of the cavity 31.

Although not illustrated in detail, the injector 6 is constructed by a multi-port fuel injector having a plurality of nozzle ports. As indicated by two-dotted chain lines in FIG. 2, the injector 6 injects the fuel so that the fuel spray radially spreads from the radial center of the combustion chamber 17. In this configuration example, the injector 6 has ten nozzle ports, and the nozzle ports are arranged at an even angular interval in the circumferential direction. As illustrated in the upper part of FIG. 2, the axes of the nozzle ports do not circumferentially overlap with the spark plug 25 described later. That is, the spark plug 25 is sandwiched between the axes of two adjacent nozzle ports. Thus, the fuel spray injected from the injector 6 is prevented from directly hitting the spark plug 25 and getting an electrode wet.

As described later, the injector 6 may inject the fuel at the timing when the piston 3 is positioned near CTDC. In this case, when the injector 6 injects the fuel, the fuel spray flows downward along the convex section 311 of the cavity 31 while mixing with fresh air, and flows along the bottom surface and the circumferential surface of the concave portion 312 to spread radially outward from the center of the combustion chamber 17. Then, the mixture gas reaches the opening of the cavity 31, flows along the inclined surface 1311 on the intake side and the inclined surface 1312 on the exhaust side, and further flows from the outer circumferential side toward the center of the combustion chamber 17.

Note that the injector 6 is not limited to the multi-port injector. The injector 6 may adopt an outward-opening valve injector.

A fuel supply system 61 is connected to the injector 6. The fuel supply system 61 includes a fuel tank 63 configured to store the fuel and a fuel supply path 62 connecting the fuel tank 63 with the injector 6. A fuel pump 65 and a common rail 64 are provided in the fuel supply path 62. The fuel pump 65 pumps the fuel to the common rail 64. In this embodiment, the fuel pump 65 is a plunger pump which is driven by the crankshaft 15. The common rail 64 stores the fuel pumped from the fuel pump 65 at high fuel pressure. When the injector 6 opens, the fuel stored in the common rail 64 is injected into the combustion chamber 17 from the nozzle ports of the injector 6. The fuel supply system 61 is able to supply the fuel at a high pressure of 30 MPa or higher to the injector 6. A highest fuel pressure of the fuel supply system 61 may be, for example, about 120 MPa. The pressure of the fuel supplied to the injector 6 may be changed according to an operating state of the engine 1. Note that the structure of the fuel supply system 61 is not limited to the above structure.

The spark plug 25 is attached to the cylinder head 13 for each cylinder 11. The spark plug 25 forcibly ignites the mixture gas in the combustion chamber 17. In this configuration example, the spark plug 25 is disposed at the intake side of the cylinder 11 with respect to the center axis X1. The spark plug 25 is located between the two intake ports 18. The spark plug 25 is attached to the cylinder head 13 to extend downwardly, toward the center of the combustion chamber 17 in a tilted posture with respect to up-and-down directions of the cylinder head 13. As illustrated in FIG. 2, the electrode of the spark plug 25 is located near the ceiling surface of the combustion chamber 17 to be oriented toward inside the combustion chamber 17. Note that the disposed position of the spark plug 25 is not limited to the configuration example of FIG. 2. The spark plug 25 may be disposed on the exhaust side of the center axis X1 of the cylinder 11. Alternatively, the spark plug 25 may be disposed on the center axis X1 of the cylinder 11, and the injector 6 may be disposed on the intake side or the exhaust side with respect to the center axis X1.

An intake passage 40 is connected to one side of the engine 1. The intake passage 40 communicates with the intake ports 18 of the cylinders 11. The intake passage 40 is a passage through which gas to be introduced into the combustion chamber 17 flows. An air cleaner 41 which filters fresh air is disposed in an upstream end part of the intake passage 40. A surge tank 42 is disposed near a downstream end of the intake passage 40. Although not illustrated in detail, a part of the intake passage 40 downstream of the surge tank 42 constitutes independent passages branched for the respective cylinders 11. Downstream ends of the independent passages communicate with the intake ports 18 of the cylinders 11, respectively.

A throttle valve 43 is disposed in the intake passage 40 between the air cleaner 41 and the surge tank 42. The throttle valve 43 adjusts an introduction amount of fresh air into the combustion chamber 17 by adjusting an opening thereof. The throttle valve 43 constitutes one of the state function setting devices.

A booster 44 is disposed in the intake passage 40 downstream of the throttle valve 43. The booster 44 boosts the gas introduced into the combustion chamber 17. In this configuration example, the booster 44 is a supercharger which is driven by the engine 1. The booster 44 may be, for example, of a Roots type. The booster 44 may have any structure. The booster 44 may be of a Lisholm type, a Vane type, or a centrifugal type. Note that the booster may be an electric booster or a turbocharger which is driven by exhaust energy.

An electromagnetic clutch 45 is interposed between the booster 44 and the engine 1. The electromagnetic clutch 45 controls the flow of a driving force between the booster 44 and the engine 1, for example, it transmits the driving force from the engine 1 to the booster 44 or interrupts the transmission of the driving force therebetween. As is described later, by an ECU 10 switching the connection/disconnection of the electromagnetic clutch 45, the on/off of the booster 44 is switched. That is, in this engine 1, boosting the gas to be introduced into the combustion chamber 17 by the booster 44 and not boosting the gas to be introduced into the combustion chamber 17 by the booster 44 are switchable therebetween.

An intercooler 46 is disposed in the intake passage 40 downstream of the booster 44. The intercooler 46 cools the gas compressed in the booster 44. The intercooler 46 may be, for example, of a water cooling type.

A bypass passage 47 is connected to the intake passage 40. The bypass passage 47 connects a part of intake passage 40 upstream of the booster 44 to a part of the intake passage 40 downstream of the intercooler 46 so as to bypass the booster 44 and the intercooler 46. For example, the bypass passage 47 is connected to the surge tank 42. An air bypass valve 48 is disposed in the bypass passage 47. The air bypass valve 48 adjusts a flow rate of the gas flowing through the bypass passage 47.

When the booster 44 is turned off (that is, when the electromagnetic clutch 45 is disconnected), the air bypass valve 48 is fully opened. Thus, the gas flowing through the intake passage 40 bypasses the booster 44 and is introduced into the combustion chamber 17 of the engine 1. The engine 1 operates in a non-boosted state, that is, in a naturally aspirated state.

When the booster 44 is turned on (that is, when the electromagnetic clutch 45 is connected), the gas passed through the booster 44 partially flows back upstream of the booster 44 through the bypass passage 47. By controlling an opening of the air bypass valve 48, a backflow amount is adjusted, which leads to adjusting boosting pressure of the gas introduced into the combustion chamber 17. Note that the term "boosted" may be defined as when the pressure in the surge tank 42 exceeds atmospheric pressure, and the term "non-boosted" may be defined as when the pressure in the surge tank 42 falls below the atmospheric pressure. In this configuration example, a boosting system 49 is comprised of the booster 44, the bypass passage 47, and the air bypass valve 48. The air bypass valve 48 constitutes one of the state function setting devices.

The engine 1 has a swirl generating part which generates a swirl flow in the combustion chamber 17. The swirl generating part is one example of an intake flow control device. In this configuration example, as illustrated in FIG. 3, the swirl generating part is a swirl control valve (SCV) 56 attached to the intake passage 40. The SCV 56 is disposed in a passage. The passage is one of a primary passage 401 and a secondary passage 402 communicating with the first intake port 181 and the second intake port 182, respectively. The SCV 56 is an opening regulating valve which is capable of adjusting the opening of a cross section of the secondary passage. When the opening of the SCV 56 is small, the flow rate of the intake air into the combustion chamber 17 from the first intake port 181 relatively increases while the flow rate of the intake air into the combustion chamber 17 from the second intake port 182 is relatively reduced. Thus, the swirl flow in the combustion chamber 17 becomes strong. When the opening of the SCV 56 is large, the flow rates of the intake air into the combustion chamber 17 from the first intake port 181 and the second intake port 182 become substantially even, and thus the swirl flow in the combustion chamber 17 becomes weak. When the SCV 56 is fully opened, a swirl flow does not occur. Note that the swirl flow circulates in the counter-clockwise direction in FIG. 3 as indicated by the white outlined arrows (also see the white outlined arrows in FIG. 2).

Note that alternatively/additionally to attaching the SCV 56 to the intake passage 40, the swirl generating part may adopt a structure in which the open periods of the two intake valves 21 are varied so as to introduce the intake air into the combustion chamber 17 from only one of the intake valves 21. By opening only one of the two intake valves 21, the intake air is introduced unevenly into the combustion chamber 17, and thus, the swirl flow is generated in the combustion chamber 17. Alternatively, the shapes of the intake ports 18 may be devised so that the swirl generating part generates the swirl flow in the combustion chamber 17.

Figure 5:
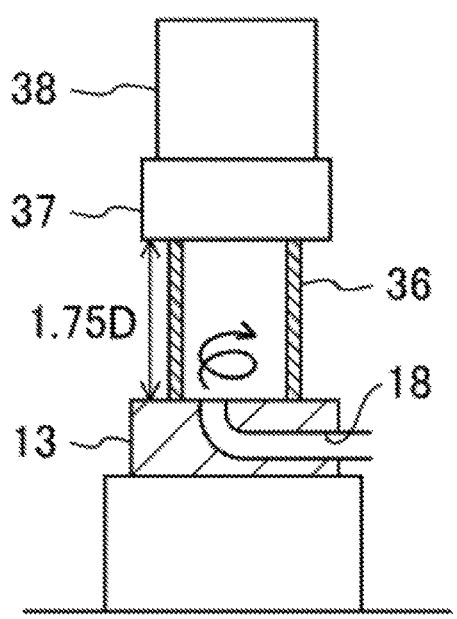
FIG. 5 is a diagram illustrating a rig test device for measuring a swirl ratio.

Here, the strength of the swirl flow in the combustion chamber 17 is defined. In this configuration example, the strength of the swirl flow in the combustion chamber 17 is expressed by a "swirl ratio." The "swirl ratio" may be defined as a value obtained by dividing a value which is obtained from measuring an intake flow lateral angular speed for each valve lift and integrating the value, by an engine angular speed. The intake flow lateral angular speed may be obtained based on a measurement using a rig test device illustrated in FIG. 5. Specifically, the device illustrated in FIG. 5 is structured by placing the cylinder head 13 upside down on a pedestal to connect the intake port 18 to an intake air supply device (not illustrated), and placing a cylinder 36 on the cylinder head 13 to connect, at its upper end, to an impulse meter 38 having a honeycomb rotor 37. A lower surface of the impulse meter 38 is positioned at a position 1.75 D (wherein "D" is a cylinder bore diameter) away from a mating surface between the cylinder head 13 and the cylinder 36. The impulse meter 38 measures torque which acts on the honeycomb rotor 37 by a swirl generated in the cylinder 36 according to the supply of the intake air (see the arrow in FIG. 5), and the intake flow lateral angular speed is obtained based on the torque.

Figure 6:
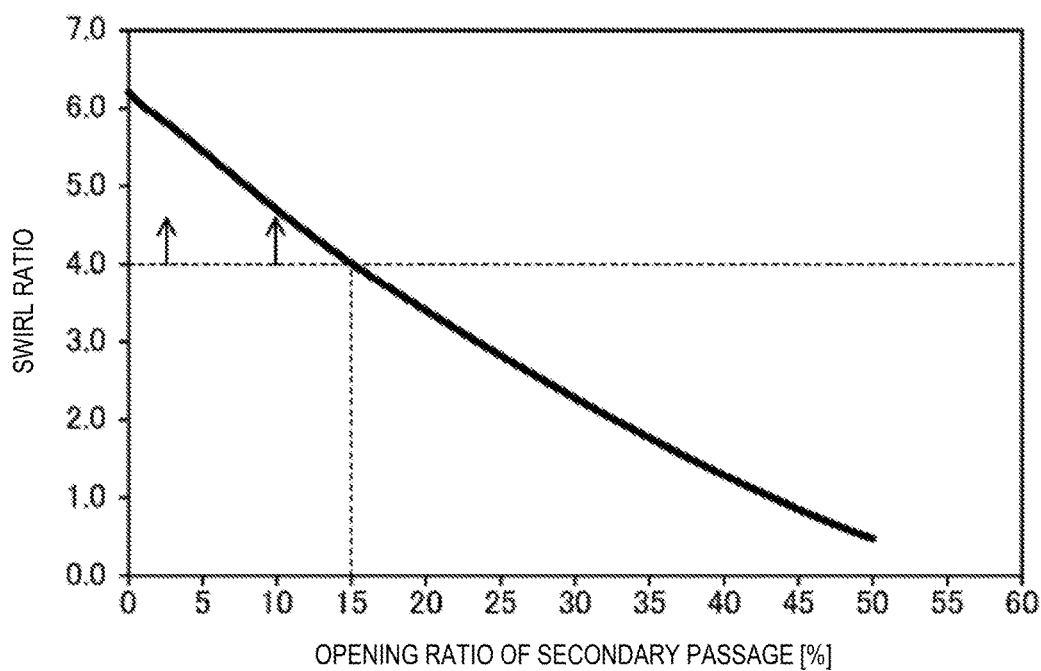
FIG. 6 is a chart illustrating a relationship between an opening ratio of a secondary passage and the swirl ratio.

FIG. 6 illustrates a relationship between the opening of the SCV 56 of the engine 1 and the swirl ratio. In FIG. 6, the opening of the SCV 56 is expressed by an opening ratio with respect to the cross section of the secondary passage 402 when fully opened. The opening ratio of the secondary passage 402 is 0% when the SCV 56 is fully closed, and increases from 0% as the opening of the SCV 56 increases. The opening ratio of the secondary passage 402 is 100% when the SCV 56 is fully opened. As illustrated in FIG. 6, in the engine 1, the swirl ratio becomes around 6 when the SCV 56 is fully closed. In order to set the swirl ratio to be 4 or higher, the opening of the SCV 56 may be adjusted within a range of the opening ratio of 0 to 15%. Moreover, in order to set the swirl ratio to be about 1.5 to 3, the opening of the SCV 56 may be adjusted within a range of the opening ratio of about 25 to 40%.

An exhaust passage 50 is connected to a side of the engine 1 opposite from the intake passage 40. The exhaust passage 50 communicates with the exhaust ports 19 of the cylinders 11. The exhaust passage 50 is a passage through which the exhaust gas discharged from the combustion chamber 17 flows. Although is not illustrated in detail, an upstream part of the exhaust passage 50 constitutes independent passages branched for the respective cylinders 11. Upstream ends of the independent passages are connected to the exhaust ports 19 of the cylinders 11, respectively.

An exhaust gas purification system having one or more catalytic converters is disposed in the exhaust passage 50. The exhaust gas purification system of this configuration example has two catalytic converters. The catalytic converter on the upstream side is disposed in an engine bay, and has a three-way catalyst 511 and a GPF (Gasoline Particulate Filter) 512. The catalytic converter on the downstream side is disposed outside the engine room and has a three-way catalyst 513. Note that the exhaust gas purification system is not limited to have the illustrated structure. For example, the GPF 512 may be omitted. Moreover, the catalytic converter is not limited to have the three-way catalyst. Furthermore, the order of arrangements of the three-way catalyst and the GPF may suitably be changed.

An EGR passage 52 constituting an external EGR system is connected between the intake passage 40 and the exhaust passage 50. The EGR passage 52 is a passage for recirculating a portion of the burned gas to the intake passage 40. An upstream end of the EGR passage 52 is connected to the exhaust passage 50 between the upstream catalytic converter and the downstream catalytic converter. A downstream end of the EGR passage 52 is connected to the intake passage 40 upstream of the booster 44. For example, the downstream end of the EGR passage 52 is connected to an intermediate position of the bypass passage 47. The EGR gas flowing through the EGR passage 52 enters the intake passage 40 upstream of the booster 44 without passing through the air bypass valve 48 of the bypass passage 47.

A water-cooling type EGR cooler 53 is disposed in the EGR passage 52. The EGR cooler 53 cools the burned gas. An EGR valve 54 is also disposed in the EGR passage 52. The EGR valve 54 adjusts the flow rate of the burned gas in the EGR passage 52. By adjusting an opening of the EGR valve 54, the recirculation amount of the cooled burned gas (i.e., external EGR gas) is adjusted.

In this configuration example, an EGR system 55 includes an external EGR system including the EGR passage 52 and the EGR valve 54, and an internal EGR system including the intake electrically-operated S-VT 23 and the exhaust electrically-operated S-VT 24 described above. The EGR valve 54 constitutes one of the state function setting devices. In the external EGR system, since the EGR passage 52 is connected downstream of the upstream catalytic converter and the EGR cooler 53 is provided, the burned gas at a temperature lower than in the internal EGR system is supplied to the combustion chamber 17.

A control system 20 of the compression-ignition engine includes an ECU (Engine Control Unit) 10 configured to operate the engine 1. The ECU 10 is a controller based on a well-known microcomputer. The ECU 10 includes a central processing unit (CPU) 101 (i.e., a processor) configured to execute program(s)/instructions, memory 102 comprised of RAM(s) (Random Access Memory) and ROM(s) (Read Only Memory) and configured to store the program(s)/instructions and data, and an input/output bus 103 configured to input and output electric signals. The ECU 10 is one example of a "controller" or "control device."

As illustrated in FIGS. 1 and 4, various sensors SW1 to SW16 are connected to the ECU 10. The sensors SW1 to SW16 output detection signals to the ECU 10. The sensors include the following sensors.

That is, the sensors include an airflow sensor SW1 disposed in the intake passage 40 downstream of the air cleaner 41 and configured to detect the flow rate of fresh air in the intake passage 40, a first intake air temperature sensor SW2 also disposed in the intake passage 40 downstream of the air cleaner 41 and configured to detect a temperature of the fresh air, a first pressure sensor SW3 disposed in the intake passage 40 downstream of the connecting position with the EGR passage 52 and upstream of the booster 44, and configured to detect pressure of the gas flowing into the booster 44, a second intake air temperature sensor SW4 disposed in the intake passage 40 downstream of the booster 44 and upstream of the connecting position of the bypass passage 47 and configured to detect a temperature of the gas flowed out of the booster 44, a second pressure sensor SW5 attached to the surge tank 42 and configured to detect pressure of the gas at a position downstream of the booster 44, pressure sensors SW6 attached to the cylinder head 13 corresponding to the cylinders 11 and configured to detect pressure in the combustion chambers 17, respectively, an exhaust temperature sensor SW7 disposed in the exhaust passage 50 and configured to detect a temperature of the exhaust gas discharged from the combustion chamber 17, a linear $O_2$ sensor SW8 disposed in the exhaust passage 50 upstream of the upstream catalytic converter and configured to detect an oxygen concentration within the exhaust gas, a lambda $O_2$ sensor SW9 disposed in the upstream catalytic converter downstream of the catalytic converter 511 and configured to detect an oxygen concentration within the exhaust gas, a water temperature sensor SW10 attached to the engine 1 and configured to detect a temperature of the cooling water, a crank angle sensor SW11 attached to the engine 1 and configured to detect a rotational angle of the crankshaft 15, an accelerator opening sensor SW12 attached to an accelerator pedal mechanism and configured to detect an accelerator opening corresponding to an operation amount of an accelerator pedal, an intake cam angle sensor SW13 attached to the engine 1 and configured to detect a rotational angle of the intake camshaft, an exhaust cam angle sensor SW14 attached to the engine 1 and configured to detect a rotational angle of the exhaust camshaft, an EGR pressure difference sensor SW15 disposed in the EGR passage 52 and configured to detect a difference in pressure between positions upstream and downstream of the EGR valve 54, and a fuel pressure sensor SW16 attached to the common rail 64 of the fuel supply system 61 and configured to detect pressure of the fuel to be supplied to the injector 6.

Based on these detection signals, the ECU 10 determines the operating state of the engine 1 and calculates control amounts of the various devices. The ECU 10 outputs control signals related to the calculated control amounts to the injector 6, the spark plug 25, the intake electrically-operated S-VT 23, the exhaust electrically-operated S-VT 24, the fuel supply system 61, the throttle valve 43, the EGR valve 54, the electromagnetic clutch 45 of the booster 44, the air bypass valve 48, and the SCV 56.

For example, the ECU 10 sets a target torque of the engine 1 and determines a target boosting pressure, based on the detection signal of the accelerator opening sensor SW12 and a preset map. Then, the ECU 10 executes a feedback control to bring the boosting pressure to the target boosting pressure by adjusting the opening of the air bypass valve 48 based on the target boosting pressure and a pressure difference between the upstream and downstream sides of the booster 44 obtained from the detection signals of the first pressure sensor SW3 and the second pressure sensor SW5.

Further, the ECU 10 sets a target EGR ratio (that is, a ratio of the EGR gas with respect to all the gas in the combustion chamber 17) based on the operating state of the engine 1 and a preset map. Then, the ECU 10 determines a target EGR gas amount based on the target EGR ratio and the intake air amount based on the detection signal of the accelerator opening sensor SW12. Then, the ECU 10 executes a feedback control to bring the external EGR gas amount introduced into the combustion chamber 17 to the target EGR gas amount by adjusting the opening of the EGR valve 54 based on the pressure difference between the upstream and downstream sides of the EGR valve 54 obtained from the detection signal of the EGR difference sensor SW15.

Further, the ECU 10 executes an air-fuel ratio feedback control when a given control condition is satisfied. For example, based on the oxygen concentrations within the exhaust gas detected by the linear $O_2$ sensor SW8 and the lambda $O_2$ sensor SW9, the ECU 10 adjusts the fuel injection amount of the injector 6 to bring the air-fuel ratio of the mixture gas to a desired value.

Note that details of other controls of the engine 1 by the ECU 10 are described later.

(First Configurational Example of Operating Range Map of Engine)

Figure 7A:
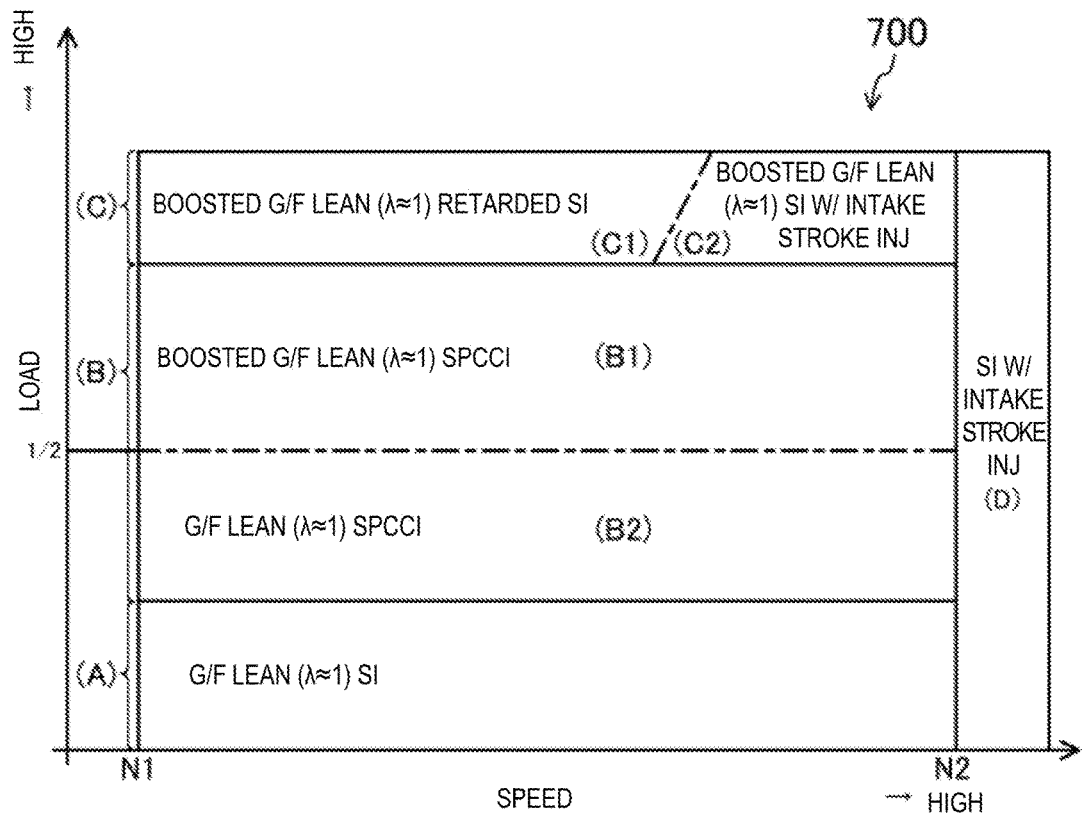
FIG. 7A is a chart illustrating an operating range map of the engine.

FIG. 7A illustrates a first configuration example of an operating range map of the engine 1. An operating range map 700 of the engine 1 is determined by an engine load and an engine speed. The operating range map 700 is roughly divided into four ranges based on the engine load and the engine speed. For example, the four ranges include a low load range (A) including an idle operation, a high load range (C) including a full engine load, a medium load range (B) between the low load range (A) and the high load range (C), and a high speed range (D) where the engine speed is higher than in the low load range (A), the medium load range (B), and the high load range (C). Within the high speed range (D), the engine 1 injects the fuel into the combustion chamber 17 on the intake stroke and performs the SI combustion by spark-ignition.

Further, the engine 1 performs combustion by compression self-ignition within the medium load range (B) in order to improve the fuel efficiency and exhaust gas performance. Hereinafter, the combustion modes in each of the low load range (A), the medium load range (B), and the high load range (C) will be described in detail.

(Low Load Range)

The combustion mode when the operating state of the engine 1 is within the low load range (A) is the SI combustion in which the spark plug 25 ignites the mixture gas inside the combustion chamber 17 to combust it by flame propagation. This is for prioritizing reliably securing combustion stability. Hereinafter, the combustion mode within the low load range (A) may be referred to as "low-load SI combustion."

When the operating state of the engine 1 is within the low load range (A), the air-fuel ratio (A/F) of the mixture gas is at the stoichiometric air-fuel ratio (A/F≈14.7:1). Note that below, the air-fuel ratio, an excess air ratio λ, and the value of G/F mean the values taken at an ignition timing. When the air-fuel ratio of the mixture gas is set to the stoichiometric air-fuel ratio, the three-way catalyst is able to purify the exhaust gas discharged from the combustion chamber 17, and thus the exhaust gas performance of the engine 1 improves. The A/F of the mixture gas may be set to remain within the purification window of the three-way catalyst (i.e., an air-fuel ratio width exhibiting the three-way purification function). Therefore, the excess air ratio λ of the mixture gas may be set to 1.0±0.2.

In order to improve the fuel efficiency of the engine 1, when the operating state of the engine 1 is within the low load range (A), the EGR system 55 introduces the EGR gas into the combustion chamber 17. The G/F of the mixture gas, which is a mass ratio of the total gas to the fuel in the combustion chamber 17, is set between 18 and 30. The mixture gas is EGR lean and has a high dilution ratio. By setting the G/F of the mixture gas to, for example, 25, within the low load range (A), the SI combustion is stably performed without the mixture gas self-igniting. Within the low load range (A), the G/F of the mixture gas is maintained substantially constant regardless of the engine load. Thus, the SI combustion is stable throughout the entire low load range. Additionally, the fuel efficiency of the engine 1 improves and the exhaust gas performance improves.

When the operating state of the engine 1 is within the low load range (A), since the fuel amount is low, a charge amount of gas into the combustion chamber 17 needs to be lower than 100% in order to bring λ of the mixture gas to 1.0±0.2 and G/F to a value between 18 and 30. For example, the engine 1 executes throttling for adjusting the opening of the throttle valve 43 and/or a mirror cycle for retarding the close timing of the intake valve 21 to after a bottom dead center (BDC) on the intake stroke.

Note that within a low-load and low-speed segment of the low load range (A), the combustion temperature of the mixture gas and the temperature of the exhaust gas may be raised by reducing the charge amount of gas even smaller. This is advantageous in keeping the catalytic converter in an active state.

(Medium Load Range)

When the operating state of the engine 1 is within the medium load range (B), the fuel injection amount increases. The temperature of the combustion chamber 17 increases, and thus, the self-ignition is performed stably. Within the medium load range (B), the engine performs the CI combustion in order to improve the fuel efficiency and exhaust gas performance.

In the combustion caused by self-ignition, the timing of the self-ignition changes greatly if the temperature inside the combustion chamber varies before the compression starts. Therefore, within the medium load range (B), the engine 1 performs the SPCCI combustion in which the SI combustion and the CI combustion are combined. In the SPCCI combustion, the spark plug 25 forcibly ignites the mixture gas inside the combustion chamber 17 to combust it through flame propagation, and the heat generated by this combustion raises the temperature inside the combustion chamber 17, which leads to combustion of unburned mixture gas by self-ignition. It is possible to reduce the variation of the temperature inside the combustion chamber 17 before the compression starts by adjusting the heat generation amount in the SI combustion. Therefore, even when the variation in the temperature inside the combustion chamber 17 varies before the compression starts, for example, by controlling the ignition timing to adjust the start timing of the SI combustion, the unburned mixture gas self-ignites at a target timing.

In order to accurately control the timing of self-ignition in the SPCCI combustion, the self-ignition timing needs to change corresponding to the change of the ignition timing. It is preferable that the sensitivity of the self-ignition timing changing according to the change of the ignition timing is high.

According to a study conducted by the present inventors, it was found that when the G/F of the mixture gas is between 18 and 30, the SPCCI combustion is stably performed and the self-ignition timing sensitively changes in response to the change of the ignition timing. Therefore, when the operating state of the engine 1 is within the medium load range (B), the engine 1 sets the state inside the combustion chamber 17 so that λ of the mixture gas becomes 1.0±0.2 and the G/F of the mixture gas becomes a value between 18 and 30. Moreover, at the ignition timing, a required temperature Tig inside the combustion chamber 17 is 570 to 800 K, a required pressure Pig inside the combustion chamber 17 is 400 to 920 kPa, and turbulence kinetic energy inside the combustion chamber 17 is 17 to 40 $m^2/s^2$.

By accurately controlling the self-ignition timing in the SPCCI combustion, an increase of the combustion noise is avoided when the operating state of the engine 1 is within the medium load range (B). Moreover, by increasing the dilution ratio of the mixture gas as high as possible and performing the CI combustion, the fuel efficiency of the engine 1 is improved. Moreover, by setting λ of the mixture gas to 1.0±0.2, the three-way catalyst is able to purify the exhaust gas, and thus the exhaust gas performance of the engine 1 improves.

As described above, within the low load range (A), the G/F of the mixture gas is set between 18 and 30 (e.g., 25) and λ of the mixture gas is set to 1.0±0.2. The state function inside the combustion chamber 17 does not vary greatly between the states where the operating state of the engine 1 is within the low load range (A) and within the medium load range (B). Therefore, robustness of the control of the engine 1 against the change of the engine load improves.

When the operating state of the engine 1 is within the medium load range (B), different from being within the low load range (A), the fuel amount increases, therefore the charge amount of gas introduced into the combustion chamber 17 is not required to be adjusted. Here, the throttle valve 43 is fully opened.

When the engine load increases and the fuel amount further increases, in the naturally aspirated state, the introduction amount of gas into the combustion chamber 17 becomes insufficient for setting λ of the mixture gas to 1.0±0.2 and the G/F of the mixture gas between 18 and 30. Therefore, in a segment of the medium load range (B) where the engine load is higher than a given load, the booster 44 boosts the gas to be introduced into the combustion chamber 17. The medium load range (B) is divided into a first medium load segment (B1) in which the engine load is higher than the given load and the boost is performed, and a second medium load segment (B2) in which the engine load is lower than the given load and the boost is not performed. The given load is, for example, ½ load. The second medium load segment (B2) is a segment where the engine load is lower than the first medium load segment (B1). Hereinafter, the combustion mode within the first medium load segment (B1) may be referred to as "boosted SPCCI combustion" and the combustion mode within the second medium load segment (B2) may be referred to as "non-boosted SPCCI combustion."

Within the second medium load segment (B2) in which the boost is not performed, as the fuel amount increases, the introduction amount of fresh air into the combustion chamber 17 increases while the EGR gas decreases. The G/F of the mixture gas decreases as the engine load increases. Since the throttle valve 43 is fully opened, the engine 1 adjusts the introduction amount of EGR gas into the combustion chamber 17 to adjust the amount of fresh air introduced into the combustion chamber 17. Within the second medium load segment (B2), the state function inside the combustion chamber 17 is set such that, for example, λ of the mixture gas is substantially constant at 1.0 while the G/F of the mixture gas is changed between 25 and 28.

On the other hand, within the first medium load segment (B1) in which the boost is performed, the engine 1 increases the introduction amounts of fresh air and EGR gas into the combustion chamber 17 as the fuel amount increases. Thus, the G/F of the mixture gas is substantially constant even when the engine load increases. In the state function inside the combustion chamber 17 within the first medium load segment (B1), for example, λ of the mixture gas is substantially constant at 1.0 and the G/F of the mixture gas is constant at 25.

(High Load Range)

The combustion mode when the operating state of the engine 1 is within the high load range (C) is the SI combustion. This is for prioritizing avoiding the combustion noise. Hereinafter, the combustion mode within the high load range (C) may be referred to as "high-load SI combustion."

When the operating state of the engine 1 is within the high load range (C), λ of the mixture gas becomes 1.0±0.2, and the G/F of the mixture gas is basically set at between 18 and 30. Within the high load range (C), the throttle valve 43 is fully opened and the booster 44 performs the boost.

Within the high load range (C), the engine 1 reduces the EGR gas amount as the engine load increases. The G/F of the mixture gas decreases as the engine load increases. The introduction amount of fresh air into the combustion chamber 17 increases by the reduced amount of EGR gas, therefore, the fuel amount may be increased, which is advantageous in increasing a highest output of the engine 1.

The state function inside the combustion chamber 17 does not vary greatly between the states where the operating state of the engine 1 is within the high load range (C) and within the medium load range (B). Therefore, the robustness of the control of the engine 1 against the change of the engine load improves.

Since the engine 1 performs the SI combustion within the high load range (C) as described above, there is an issue with abnormal combustion, such as pre-ignition and knocking, occurring easily.

Therefore, within the high load range (C), by devising the fuel injection mode, abnormal combustion is avoided in the engine 1. For example, the ECU 10 outputs control signals to the fuel supply system 61 and the injector 6 to inject the fuel into the combustion chamber 17 at a fuel pressure of 30 MPa or higher, at a timing in a period from a final stage of the compression stroke to an early stage of the expansion stroke (hereinafter, this period is referred to as "retard period"). The ECU 10 also outputs a control signal to the spark plug 25 to ignite the mixture gas at a timing near CTDC after the fuel injection. Hereinafter, the fuel injection into the combustion chamber 17 at the high fuel pressure at the timing in the retard period is referred to as "high-pressure retard injection."

The high-pressure retard injection shortens reaction time of the mixture gas to avoid abnormal combustion. That is, the reaction time of the mixture gas is a total length of time of (1) a period for which the injector 6 injects the fuel (i.e., injection period), (2) a period for which combustible mixture gas is formed around the spark plug 25 after the fuel injection (i.e., mixture gas formation period), and (3) a period from the start of ignition until the SI combustion ends (i.e., combustion period).

The injection period and the mixture gas formation period become shorter by injecting the fuel into the combustion chamber 17 at the high fuel pressure. By shortening the injection period and the mixture gas formation period, the timing of starting the fuel injection approaches the ignition timing. In the high-pressure retard injection, since the fuel injection into the combustion chamber 17 is performed at the high fuel pressure, the fuel is injected at a timing in the retard period from the final stage of the compression stroke to the early stage of the expansion stroke.

Injecting the fuel into the combustion chamber 17 at the high fuel pressure increases turbulence kinetic energy inside the combustion chamber 17. By bringing the fuel injection timing close to CTDC, it is possible to start the SI combustion while the turbulence kinetic energy inside the combustion chamber 17 is high. As a result, the combustion period becomes short.

Thus, in the high-pressure retard injection, since the injection period, the mixture gas formation period, and the combustion period are respectively shortened, the reaction time of the mixture gas is significantly shortened compared with a case where the fuel is injected into the combustion chamber 17 on the intake stroke. As a result, abnormal combustion is avoided.

In the technical field of the engine control, conventionally, the ignition timing is retarded to avoid abnormal combustion. However, retarding the ignition timing degrades the fuel efficiency. In the high-pressure retard injection, the ignition timing is not required to be retarded. Therefore, the fuel efficiency improves by using the high-pressure retard injection.

By setting the fuel pressure to be, for example, 30 MPa or higher, the injection period, the mixture gas formation period, and the combustion period are effectively shortened. Note that the fuel pressure may suitably be set according to properties of the fuel. An upper limit of the fuel pressure may be, for example, 120 MPa.

Here, when the engine speed is low, compared to when it is high, the time required for the crank angle to change by the same angle is longer, therefore, shortening the reaction time of the mixture gas by the high-pressure retard injection is particularly effective in avoiding abnormal combustion. On the other hand, when the engine speed is high, due to the shorter time required for the crank angle to change by the same angle, shortening the reaction time of the mixture gas is not particularly effective in avoiding abnormal combustion.

Further in the high-pressure retard injection, the fuel is injected into the combustion chamber 17 only after reaching near CTDC, on the compression stroke, fuel-free gas, in other words, the gas with a high ratio of specific heat, is compressed within the combustion chamber 17. If the high-pressure retard injection is performed when the engine speed is high, the temperature inside the combustion chamber 17 at CTDC, i.e., the compression end temperature, rises, which may cause abnormal combustion, such as knocking.

Therefore, in the engine 1, the high load range (C) is divided into a first high load segment (C1) on the low engine speed side and a second high load segment (C2) where the engine speed is higher than within the first high load segment (C1). When the high load range (C) is evenly divided into three ranges of low engine speed, medium engine speed, and high engine speed, the first high load segment (C1) may include the low engine speed range and the medium engine speed range, and the second high load segment (C2) may include the high engine speed range.

Within the first high load segment (C1), the injector 6, in response to receiving the control signal of the ECU 10, performs the high-pressure retard injection described above. Within the second high load segment (C2), the injector 6, in response to receiving the control signal of the ECU 10, performs the fuel injection at a given timing on the intake stroke. The fuel injection performed on the intake stroke does not require high fuel pressure. Therefore, the ECU 10 outputs the control signal to the fuel supply system 61 so that the fuel pressure falls below the fuel pressure of the high-pressure retard injection (e.g., below 40 MPa). Since lowering the fuel pressure reduces a mechanical resistance loss of the engine 1, it is advantageous in improving the fuel efficiency.

The ratio of the specific heat of the gas inside the combustion chamber 17 decreases by injecting the fuel into the combustion chamber 17 on the intake stroke, therefore, the compression end temperature drops, and thus, abnormal combustion is avoided. Since it is not necessary to retard the ignition timing for avoiding abnormal combustion, within the second high load segment (C2), similar to the first high load segment (C1), the spark plug 25 ignites the mixture gas at a timing near CTDC.

Within the first high load segment (C1), since the mixture gas does not result in self-ignition because the high-pressure retard injection is applied, the engine 1 performs stable SI combustion. Within the second high load segment (C2), since the mixture gas does not result in self-ignition because the fuel is injected on the intake stroke, the engine 1 performs stable SI combustion.

(SPCCI Combustion)

Figure 8:
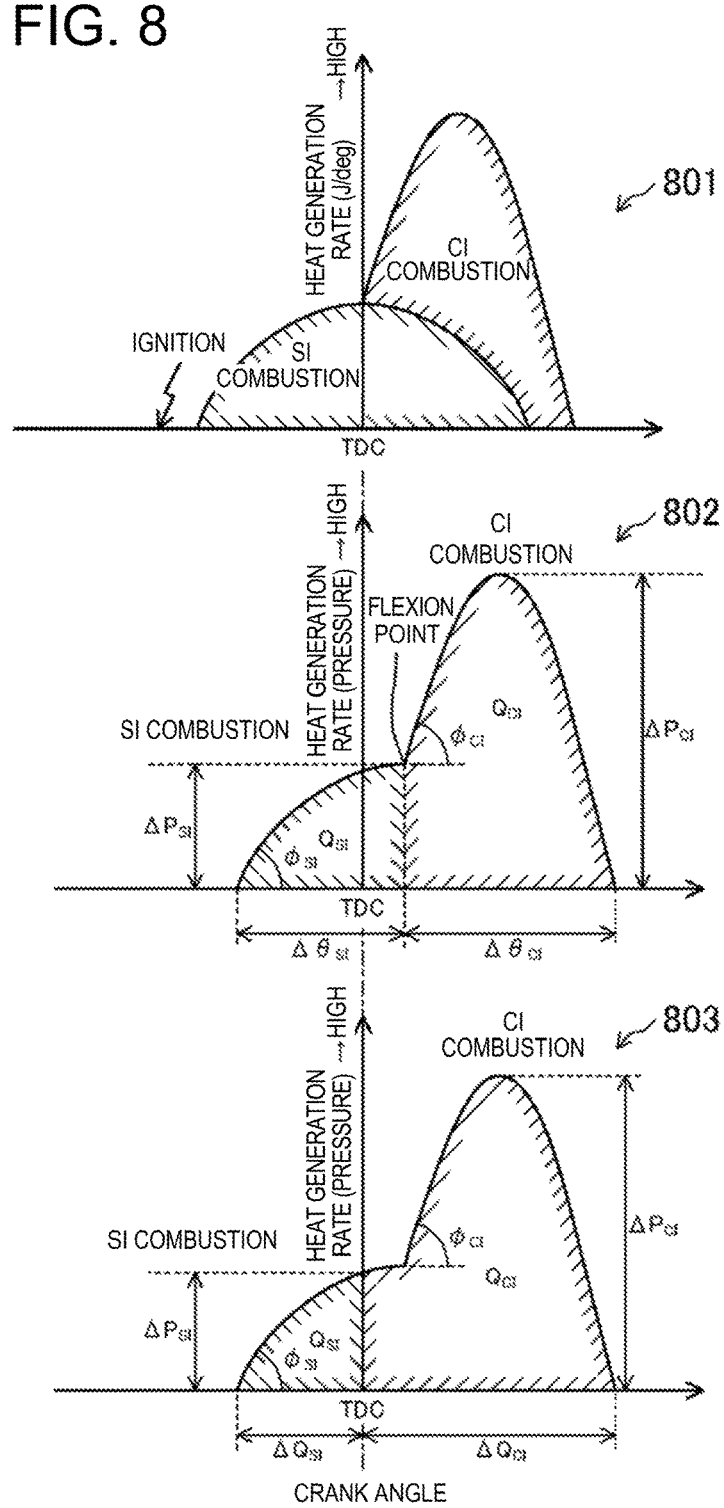
FIG. 8 shows charts in which the upper part conceptually illustrates a change in heat generation rate in SPCCI combustion in which SI combustion and CI combustion are combined, the middle part illustrates a definition of an SI ratio in the SPCCI combustion, and the lower part illustrates another definition of the SI ratio in the SPCCI combustion.

Next, the SPCCI combustion described above is described in detail. The upper chart of FIG. 8 illustrates a waveform 801 which is one example of a change in a heat generation rate with respect to the crank angle. When the spark plug 25 ignites the mixture gas near CTDC, specifically at a given timing before CTDC, the combustion starts by flame propagation. The heat generation in the SI combustion is slower than the heat generation in the CI combustion. Therefore, the waveform of the heat generation rate has a relatively shallow slope. Although not illustrated, a pressure variation ($dp/d\theta$) in the combustion chamber 17 is shallower in the SI combustion than in the CI combustion.

When the temperature and pressure inside the combustion chamber 17 rise due to the SI combustion, the unburned mixture gas self-ignites. In the example of the waveform 801, the slope of the waveform of the heat generation rate changes from gentle to sharp, i.e., the waveform of the heat generation rate has a flexion point at a timing when the CI combustion starts.

After the CI combustion starts, the SI combustion and the CI combustion are performed in parallel. In the CI combustion, since the heat generation is greater than in the SI combustion, the heat generation rate becomes relatively high. Note that since the CI combustion is performed after CTDC, the piston 3 descends by motoring. Therefore, the slope of the waveform of the heat generation rate by the CI combustion is avoided from becoming excessively sharp. The $dp/d\theta$ in the CI combustion also becomes relatively gentle.

The $dp/d\theta$ is usable as an index expressing the combustion noise. Since the SPCCI combustion is able to lower the $dp/d\theta$ as described above, it becomes possible to avoid the combustion noise from becoming excessively loud. Thus, combustion noise is suppressed below an allowable value.

The SPCCI combustion ends by finishing the CI combustion. The CI combustion has a shorter combustion period than in the SI combustion. The SPCCI combustion advances the combustion end timing compared to the SI combustion. In other words, the SPCCI combustion brings the combustion end timing on the expansion stroke closer to CTDC. The SPCCI combustion is advantageous in improving fuel efficiency of the engine 1 compared to the SI combustion.

Therefore, the SPCCI combustion achieves both prevention of the combustion noise and improvement in the fuel efficiency.

Here, an SI ratio is defined as a parameter indicating a property of the SPCCI combustion. The SI ratio is defined as an index relating to a ratio of the heat amount generated by the SI combustion with respect to a total heat amount generated by the SPCCI combustion. The SI ratio is a heat volume ratio resulted from two combustions with different combustion modes. The SI ratio may be a ratio of heat amount generated by the SI combustion with respect to the heat amount generated by the SPCCI combustion. For example, in the waveform 801, the SI ratio may be expressed as SI ratio=(area of SI combustion)/(area of SPCCI combustion). In the waveform 801, the SI ratio may be referred to as "SI fuel ratio" in the meaning of the ratio of fuel to be combusted in the SI combustion.

In the SPCCI combustion combined the SI combustion and the CI combustion, the SI ratio is a ratio of the SI combustion with respect to the CI combustion. The ratio of the SI combustion is high when the SI ratio is high, and the ratio of the CI combustion is high when the SI ratio is low.

Various definitions may be considered for the SI ratio without limiting to the definition described above. For example, the SI ratio may be a ratio of the heat amount generated by the SI combustion with respect to the heat amount generated by the CI combustion. In other words, in the waveform 801, SI ratio=(area of SI combustion)/(area of CI combustion) may be set.

Further, in the SPCCI combustion, the waveform of the heat generation rate has a flexion point at the timing when the CI combustion starts. Therefore, as indicated by the reference character 802 in the middle chart of FIG. 8, by having a boundary at the flexion point in the waveform of the heat generation rate, the SI combustion may be applied for a range on the advancing side of the boundary, and the CI combustion may be applied for a range on the retarding side of the boundary. In this case, as indicated by hatching the waveform 802, based on an area $Q_{SI}$ of the advancing-side range and an area $Q_{CI}$ of the retarding-side range, SI ratio=$Q_{SI}/(Q_{SI}+Q_{CI})$ or SI ratio=$Q_{SI}/Q_{CI}$ may be set. Alternatively, the SI ratio may be defined based on an area of a part of the advancing-side range and an area of a part of the retarding-side range, instead of the entire area.

Further, instead of defining the SI ratio based on the heat generation, based on a crank angle $\Delta\theta_{SI}$ of the advancing-side range and a crank angle $\Delta\theta_{CI}$ of the retarding-side range, SI ratio=$\Delta\theta_{SI}/(\Delta\theta_{SI}+\Delta\theta_{CI})$ or SI ratio=$\Delta\theta_{SI}/\Delta\theta_{CI}$ may be set.

Moreover, based on a peak $\Delta\beta_{SI}$ of the heat generation rate in the advancing-side range and a peak $\Delta P_{CI}$ of the heat generation rate in the retarding-side range, SI ratio=$\Delta P_{SI}/(\Delta P_{SI}+\Delta P_{CI})$ or SI ratio=$\Delta P_{SI}/\Delta P_{CI}$ may be set.

Furthermore, based on a slope $\varphi_{SI}$ of the heat generation rate in the advancing-side range and a slope $\varphi_{CI}$ of the heat generation rate in the retarding-side range, SI ratio=$\varphi_{SI}/(\varphi_{SI}+\varphi_{CI})$ or SI ratio=$\varphi_{SI}/\varphi_{CI}$ may be set.

Additionally, in this embodiment, the SI ratio is defined by one of the area (i.e., the heat generation amount), length in the horizontal axis (i.e., the crank angle), length in the vertical axis (i.e., the heat generation rate), and the slope (i.e., the change rate in the heat generation rate) based on the waveform of the heat generation rate. Although not illustrated, the SI ratio may similarly be defined based on a waveform of pressure (P) in the combustion chamber 17, by one of the area, length in the horizontal axis, length in the vertical axis, and the slope.

In the SPCCI combustion, the flexion point of the combustion waveform regarding the heat generation rate or pressure does not necessarily appear clearly all the time. The following may be used as a definition of the SI ratio which is not based on the flexion point. That is, as indicated by a reference character 803 in the lower chart of FIG. 8, in the combustion waveform, the SI combustion may be applied for a range on the advancing side of CTDC and the CI combustion may be applied for a range on the retarding side of CTDC. Under this condition, the SI ratio may be defined by one of the area ($Q_{SI}$, $Q_{CI}$), length in the horizontal axis ($\Delta\theta_{SI}$, $\Delta\theta_{CI}$), length in the vertical axis ($\Delta P_{SI}$, $\Delta P_{CI}$) and the slope (($\varphi_{SI}$, $\varphi_{CI}$).

Alternatively, the SI ratio may be defined based on the fuel amount instead of the actual combustion waveform in the combustion chamber 17. As described later, within the medium load range in which the SPCCI combustion is performed, split injections including a first-stage injection and a second-stage injection may be performed. The fuel injected into the combustion chamber 17 by the second-stage injection ignites within a short time after the injection, it reaches near the spark plug 25 without spreading inside the combustion chamber 17. Therefore, the fuel injected into the combustion chamber 17 by the second-stage injection combusts mainly in the SI combustion. On the other hand, the fuel injected into the combustion chamber 17 by the first-stage injection combusts mainly in the CI combustion. Therefore, the SI ratio may be defined based on the fuel amount injected in the first-stage injection ($m_1$) and the fuel amount injected in the second-stage injection ($m_2$). In other words, SI ratio=$m_2/(m_1+m_2)$ or SI ratio=$m_2/m_1$ may be set.

(Operation Control of Engine in Load Direction)

As described above, the engine 1 switches between the SI combustion and the SPCCI combustion according to the operating state. Further, the engine 1 changes the SI ratio according to the operating state of the engine 1. Thus, the engine 1 is achieved in preventing the generation of combustion noise and improving the fuel efficiency.

Figure 9:
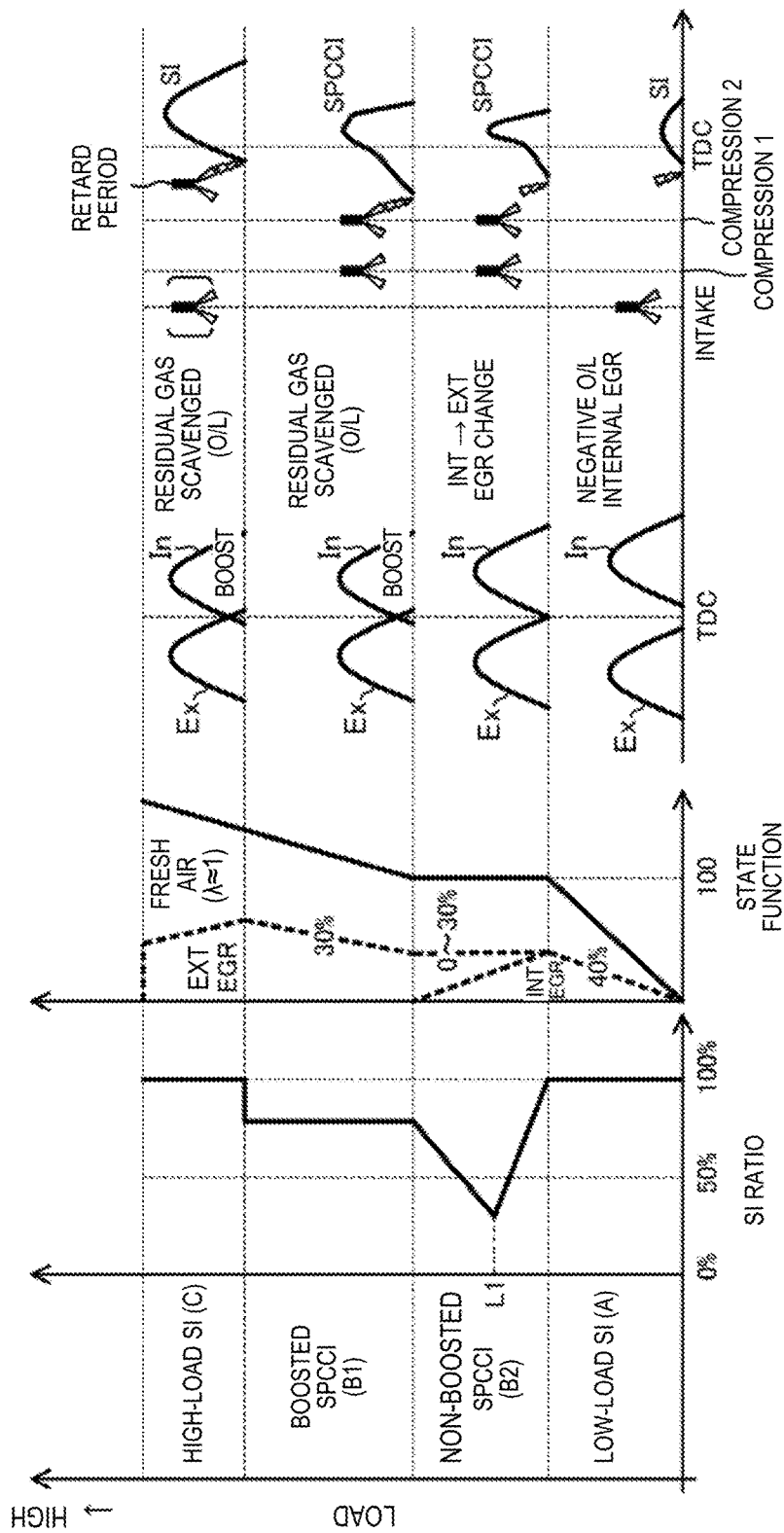
FIG. 9 is a chart illustrating a change in the SI ratio, a change in a state function inside a combustion chamber, a change in an overlap period between an intake valve and an exhaust valve, and changes in an injection timing and ignition timing of fuel, with respect to an engine load.

FIG. 9 is a chart illustrating a change in the SI ratio, a change in the state function inside the combustion chamber 17, changes in the open periods of the intake valve 21 and the exhaust valve 22, and changes in the injection timing and ignition timing of the fuel, with respect to the engine load. FIG. 9 corresponds to the operating range map 700 of FIG. 7A. Hereinafter, the operation control of the engine 1 is described for a condition in which the engine load gradually increases at a given engine speed.

(Low Load Range (Low-Load SI Combustion))

Within the low load range (A), the engine 1 performs the low-load SI combustion. When the operating state of the engine 1 is within the low load range (A), the SI ratio is constant at 100%.

Within the low load range (A), as described above, the G/F of the mixture gas is fixed between 18 and 30. The engine 1 introduces the fresh air and the burned gas by amounts corresponding to the fuel amount, into the combustion chamber 17. The introduction amount of fresh air, as described above, is adjusted by throttling and/or the mirror cycle. Since the dilution ratio is high, the temperature inside the combustion chamber 17 is raised to stabilize the SI combustion. Within the low load range (A), the engine 1 introduces the internal EGR gas into the combustion chamber 17.

The internal EGR gas is introduced into the combustion chamber 17 (i.e., the burned gas is confined inside the combustion chamber 17) by providing a negative overlap period in which the intake and exhaust valves 21 and 22 are both closed over the exhaust TDC. The adjustment of the internal EGR gas amount is performed by suitably setting the length of the negative overlap period by the intake electrically-operated S-VT 23 adjusting the open timing of the intake valve 21 and the exhaust electrically-operated S-VT 24 adjusting the open timing of the exhaust valve 22. Note that the internal EGR gas may be introduced into the combustion chamber 17 by providing a positive overlap period in which the intake and exhaust valves 21 and 22 are both opened.

Within the low load range (A), the charge amount into the combustion chamber 17 is adjusted to be below 100%. The amount of fresh air introduced into the combustion chamber 17 and the amount of the internal EGR gas gradually increase as the fuel amount increases. The EGR ratio within the low load range (A) is, for example, 40%.

The injector 6 injects the fuel into the combustion chamber 17 on the intake stroke. Inside the combustion chamber 17, a homogeneous mixture gas in which the excess air ratio λ is 1.0±0.2 and the G/F is between 18 and 30 is formed. The excess air ratio λ is preferably 1.0 to 1.2. By the spark plug 25 igniting the mixture gas at the given timing before CTDC, the mixture gas combusts by flame propagation without reaching the self-ignition.

(Second Medium Load Segment (Non-Boosted SPCCI Combustion))

When the engine load increases and the operating state enters the second medium load segment (B2), the engine 1 switches from the low-load SI combustion to the non-boosted SPCCI combustion. The SI ratio falls below 100%. The fuel amount increases as the engine load increases. When the engine load is low within the second medium load segment (B2), the ratio of the CI combustion is increased as the fuel amount increases. The SI ratio gradually decreases as the engine load increases. In the example of FIG. 9, the SI ratio decreases to a given value (lowest value) lower than 50%.

Since the fuel amount increases, the combustion temperature rises within the second medium load segment (B2). If the temperature inside the combustion chamber 17 rises excessively, the heat generation at the start of the CI combustion becomes sharp, which results in increasing the combustion noise.

Therefore, within the second medium load segment (B2), the ratio between the internal EGR gas and the external EGR gas is changed according to the change in the engine load in order to adjust the temperature inside the combustion chamber 17 before the compression starts. That is, as the engine load increases, the internal EGR gas is gradually reduced and the cooled external EGR gas is gradually increased. Within the second medium load segment (B2), the negative overlap period changes from a longest length to zero as the engine load increases. Also within the second medium load segment (B2), the internal EGR gas becomes zero when the engine load reaches a highest value. This is similar for when the positive overlap period between the intake and exhaust valves 21 and 22 is provided. As a result of control the temperature inside the combustion chamber 17 by adjusting the overlap period, the SI ratio in the SPCCI combustion is adjusted.

Within the second medium load segment (B2), the opening of the EGR valve 54 is changed so that the external EGR gas increases as the engine load increases. The amount of external EGR gas introduced into the combustion chamber 17 is adjusted, when expressed by the EGR ratio, between 0 and 30%, for example. Within the second medium load segment (B2), the EGR gas is replaced from the internal EGR gas to the external EGR gas as the engine load increases. Since the temperature inside the combustion chamber 17 is also controlled by adjusting the EGR ratio, the SI ratio of the SPCCI combustion is adjusted.

Note that the EGR gas amount introduced into the combustion chamber 17 is continuous between the low load range (A) and the second medium load segment (B2). Within a low engine load section of the second medium load segment (B2), a large amount of the internal EGR gas is introduced into the combustion chamber 17, the same as in the low load range (A). Since the temperature inside the combustion chamber 17 becomes high, the mixture gas surely self-ignites when the engine load is low. Within a high engine load section of the second medium load segment (B2), the external EGR gas is introduced into the combustion chamber 17. Since the temperature inside the combustion chamber 17 decreases, the combustion noise accompanying the CI combustion is reduced when the engine load is high.

Within the second medium load segment (B2), the charge amount introduced into the combustion chamber 17 is set to 100%. The throttle valve 43 is fully opened. By adjusting the EGR gas amount which is a total of the internal EGR gas and the external EGR gas, the introduction amount of fresh air into the combustion chamber 17 is adjusted to the amount corresponding to the fuel amount.

As the ratio of the CI combustion in the non-boosted SPCCI combustion increases, the self-ignition timing advances. If the self-ignition timing advances than CTDC, the heat generation at the start of the CI combustion becomes sharp, which results in increasing the combustion noise. Therefore, in the engine 1, once the engine load reaches the given load L1, the SI ratio is gradually increased as the engine load further increases therefrom.

That is, the engine 1 increases the ratio of the SI combustion as the fuel amount increases. For example, as illustrated in the upper chart of FIG. 10, in the non-boosted SPCCI combustion, the ignition timing is gradually advanced as the fuel amount increases. Since the temperature inside the combustion chamber 17 is adjusted by reducing the introduction amount of the internal EGR gas and increasing the introduction amount of the external EGR gas as described above, the temperature rise at CTDC is suppressed even when the SI ratio is increased as the fuel amount increases. The slope of the heat generation rate of the SI combustion scarcely changes even when the engine load increases. Advancing the ignition timing causes the SI combustion to start earlier, and the heat generation amount of SI combustion accordingly increases.

As a result of suppressing the temperature rise inside the combustion chamber 17 caused by the SI combustion, the unburned mixture gas self-ignites at a timing after CTDC. The heat generation amount by the CI combustion is substantially the same even when the engine load increases since the heat generation amount of the SI combustion is increased. Therefore, by setting the SI ratio to be gradually higher according to the increase in the engine load, the combustion noise is avoided from increasing. Note that the center of gravity of combustion in the non-boosted SPCCI combustion retards as the engine load increases.

Within the second medium load segment (B2), the injector 6 injects the fuel into the combustion chamber 17 in two stages, the first-stage injection and the second-stage injection. In the first-stage injection, the fuel is injected at a timing separated from the ignition timing, and in the second-stage injection, the fuel is injected at a timing close to the ignition timing. The first-stage injection may be performed in a period from the intake stroke to an early half of the compression stroke, and the second-stage injection may be performed in a period from a latter half of the compression stroke to an early half of the expansion stroke. The early half and latter half of the compression stroke may be defined by evenly dividing the compression stroke into two in terms of the crank angle. The early half of the expansion stroke may be defined by evenly dividing the expansion stroke into two in terms of the crank angle.

When the injector 6 performs the first-stage injection in the period from the intake stroke to the early half of the compression stroke, since the piston 3 is separated from TDC, the injected fuel spray reaches the upper surface of the piston 3 elevating toward TDC, outside the cavity 31. A section outside the cavity 31 forms a squish area 171 as illustrated in FIG. 2. The fuel injected in the first-stage injection remains in the squish area 171 while the piston 3 elevates and forms the mixture gas in the squish area 171. This mixture gas is combusted mainly in the CI combustion.

When the injector 6 performs the second-stage injection in the period from the latter half of the compression stroke to the early half of the expansion stroke, since the piston 3 is close to TDC, the injected fuel spray enters the cavity 31. The fuel injected in the second-stage injection forms the mixture gas in the section within the cavity 31. Here, the phrase "the section within the cavity 31" may mean a combination of a section from a projection plane of the opening surface of the cavity on the ceiling surface of the combustion chamber 17 to the opening surface of the cavity 31 and a section inside the cavity 31. The phrase "the section within the cavity 31" may also be said to be a section of the combustion chamber 17 outside the squish area 171. The fuel is distributed substantially evenly inside the entire combustion chamber 17 by the first-stage injection and the second-stage injection.

Due to injecting the fuel into the cavity 31 by the second-stage injection, the flow of gas occurs in the section within the cavity 31. When the time to the ignition timing is long, the turbulence kinetic energy inside the combustion chamber 17 attenuates as the compression stroke progresses. However, since the injection timing of the second-stage injection is close to the ignition timing compared to that of the first-stage injection, the spark plug 25 ignites the mixture gas in the section within the cavity 31 while keeping the high turbulence kinetic energy therewithin. Thus, the speed of the SI combustion increases. Since the SI combustion becomes stable when the speed of the SI combustion increases, the controllability of the CI combustion by the SI combustion improves.

In the entire combustion chamber 17, the mixture gas becomes a state where the excess air ratio λ is 1.0±0.2 and the G/F is a value between 18 and 30. Since the fuel is distributed substantially homogeneously, the improvement in fuel efficiency by reducing an unburned fuel loss and the improvement in exhaust gas performance by avoiding the smoke generation are achieved. Note that the excess air ratio λ is preferably 1.0 to 1.2 in the entire combustion chamber 17.

By the spark plug 25 igniting the mixture gas at the given timing before CTDC, the mixture gas combusts by flame propagation. Then the unburned mixture gas self-ignites at the target timing and causes the CI combustion. The fuel injected in the second-stage injection mainly causes the SI combustion. The fuel injected in the first-stage injection mainly causes the CI combustion. Since the first-stage injection is performed on the compression stroke, the fuel injected in the first-stage injection is prevented from causing abnormal combustion, such as the pre-ignition. Moreover, the fuel injected in the second-stage injection is stably combusted by flame propagation.

(First Medium Load Segment (Boosted SPCCI Combustion))

When the engine load further increases and the operating state of the engine 1 enters the first medium load segment (B1), the booster 44 boosts the fresh air and the external EGR gas. The amount of fresh air introduced into the combustion chamber 17 and the amount of the external EGR gas both increase as the engine load increases. The amount of external EGR gas introduced into the combustion chamber 17 is, when expressed by the EGR ratio, 30%, for example. The EGR ratio is substantially constant regardless of the engine load. Therefore, the G/F of the mixture gas is also substantially constant regardless of the engine load. Note that the EGR gas amount introduced into the combustion chamber 17 is continuous between the second medium load segment (B2) and the first medium load segment (B1).

The SI ratio is fixed or substantially fixed at a given value below 100% with respect to the engine load. When the SI ratio of the second medium load segment (B2), particularly the SI ratio which gradually increases as the engine load increases from a value above the given load L1 is compared with the SI ratio of the first medium load segment (B1), the SI ratio of the first medium load segment (B1) where the engine load is higher is higher than that of the second medium load segment (B2). The SI ratio is continuous over the boundary between the first medium load segment (B1) and the second medium load segment (B2).

Here, within the first medium load segment, the SI ratio may slightly be changed according to the change of the engine load. The change rate of the SI ratio according to the engine load within the first medium load segment may be lower than that at a high engine load side of the second medium load segment.

Figure 10:
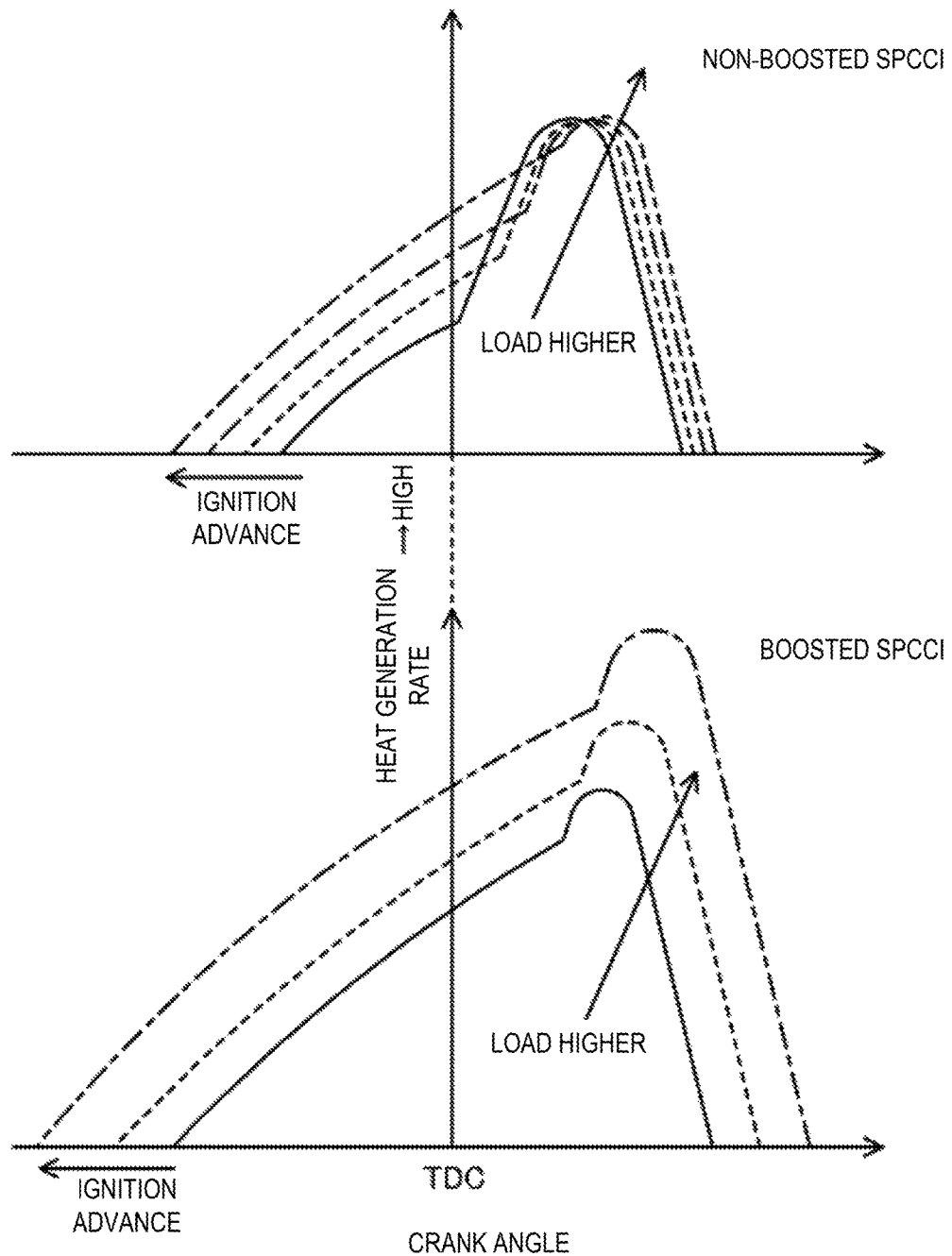
FIG. 10 shows charts in which the upper part illustrates a change in a combustion waveform due to an increase in the engine load in non-boosted SPCCI combustion, and the lower part illustrates a change in a combustion waveform due to an increase in the engine load in boosted SPCCI combustion.

As illustrated in the lower chart of FIG. 10, also in the boosted SPCCI combustion, the ignition timing is gradually advanced as the fuel amount increases. Since the fresh air and the EGR gas amount introduced into the combustion chamber 17 are increased by boosting as described above, the heat volume is large. Therefore, even when the fuel amount increases, the temperature increase inside the combustion chamber 17 caused by the SI combustion is suppressed. The waveform of the heat generation rate of the boosted SPCCI combustion becomes larger (the area of the section formed by the waveform and the horizontal axis becomes larger) in a similar shape as the engine load increases.

That is, the heat generation amount of the SI combustion increases while the slope of the heat generation rate of the SI combustion scarcely changes. The unburned mixture gas self-ignites at substantially the same timing after CTDC. The heat generation amount of the CI combustion increases as the engine load increases. As a result, within the first medium load segment (B1), since both the heat generation amount of the SI combustion and the heat generation amount of the CI combustion increase, the SI ratio is constant with respect to the engine load. Although the combustion noise increases when the peak of the heat generation of the CI combustion rises, since the engine load is relatively high within the first medium load segment (B1), a certain level of combustion noise is allowed. Note that the center of gravity of combustion in the boosted SPCCI combustion retards as the engine load increases.

Within the first medium load segment (B1), the positive overlap period in which the intake and exhaust valves 21 and 22 are both opened is provided over the exhaust TDC. The unburned gas residing in the combustion chamber 17 is scavenged by the boosting pressure. Thus, the temperature in the combustion chamber 17 drops, and as a result, abnormal combustion is prevented from occurring when the engine load is relatively high. Further, by dropping the temperature in the combustion chamber 17, within the range where the engine load is relatively high, the self-ignition timing is adjusted to a suitable timing and the SI ratio is maintained at a given SI ratio. That is, the SI ratio is controlled by adjusting the overlap period. Further, by scavenging the burned gas, the charge amount of fresh air in the combustion chamber 17 is increased.

Within the first medium load segment (B1), similarly to the second medium load segment (B2), the injector 6 injects the fuel into the combustion chamber 17 in two stages, the first-stage injection and the second-stage injection. In the first-stage injection, the fuel is injected at the timing separated from the ignition timing, and in the second-stage injection, the fuel is injected at the timing close to the ignition timing. The first-stage injection may be performed in the period from the intake stroke to the early half of the compression stroke, and the second-stage injection may be performed in the period from the latter half of the compression stroke to the early half of the expansion stroke.

When the injector 6 performs the first-stage injection in the period from the intake stroke to the early half of the compression stroke, the mixture gas is formed in the squish area 171. When the injector 6 performs the second-stage injection in the period from the latter half of the compression stroke to the early half of the expansion stroke, the mixture gas is formed in the cavity 31.

By the injector 6 performing the first-stage injection and the second-stage injection, in the combustion chamber 17, substantially homogeneous mixture gas in which the excess air ratio $\lambda$ is 1.0±0.2 and the G/F is 18 to 30 is formed as a whole. Since the mixture gas is substantially homogeneous, the improvement in the fuel efficiency by reducing the unburned fuel loss and the improvement in the exhaust gas performance by avoiding the smoke generation are achieved. Note that the excess air ratio $\lambda$ is preferably 1.0 to 1.2 in the entire combustion chamber 17.

By the spark plug 25 igniting the mixture gas at the given timing before CTDC, the mixture gas combusts by flame propagation. Then the unburned mixture gas self-ignites at the target timing and causes the CI combustion. The fuel injected in the second-stage injection mainly causes the SI combustion. The fuel injected in the first-stage injection mainly causes the CI combustion. Since the first-stage injection is performed on the compression stroke, the fuel injected in the first-stage injection is prevented from causing abnormal combustion, such as the pre-ignition. Moreover, the fuel injected in the second-stage injection is stably combusted by flame propagation.

(High Load Range (High-Load SI Combustion))

When the engine load increases and the operating state of the engine 1 enters the high load range (C), the engine 1 performs the high-load SI combustion. Therefore, the SI ratio within the high load range (C) becomes 100%.

The throttle valve 43 is fully opened. The booster 44 boosts the fresh air and the external EGR gas even within the high load range (C). The EGR valve 54, by adjusting its opening, gradually reduces the introduction amount of the external EGR gas as the engine load increases. In this manner, the fresh air introduced into the combustion chamber 17 increases as the engine load increases. Since the fuel amount is increased as the fresh air amount increases, it is advantageous in increasing the highest output of the engine 1. Note that the EGR gas amount introduced into the combustion chamber 17 is continuous between the first medium load segment (B1) and the high load range (C).

Also within the high load range (C), similarly to the first medium load segment (B1), the positive overlap period in which the intake and exhaust valves 21 and 22 are both opened is provided over the exhaust TDC. The unburned gas residing in the combustion chamber 17 is scavenged by the boosting pressure. Thus, the occurrence of abnormal combustion is prevented. Further, the charge amount of fresh air in the combustion chamber 17 is increased.

Within a low engine speed segment of the high load range (C) (i.e., the first high load segment (C1)), the injector 6 injects the fuel into the combustion chamber 17 in the retard period as described above. Within a high engine speed segment of the high load range (C) (i.e., the second high load segment (C2)), the injector 6 injects the fuel into the combustion chamber 17 on the intake stroke. Within either segment, substantially homogeneous mixture gas in which the excess air ratio $\lambda$ is 1.0±0.2 and the G/F is 18 to 30 is formed inside the combustion chamber 17. At the highest load, the excess air ratio $\lambda$ may be 0.8, for example. Moreover, the G/F of the mixture gas may be, for example, 17 at the highest load. By the spark plug 25 igniting the mixture gas at the given timing before CTDC, the mixture gas is combusted by flame propagation. Within the high load range (C), due to the high-pressure retard injection or the fuel injection on the intake stroke, the mixture gas causes the SI combustion without reaching the self-ignition.

(Operation Control of Engine in Speed Direction)
(Second-Stage Injection Ratio)

Figure 11:
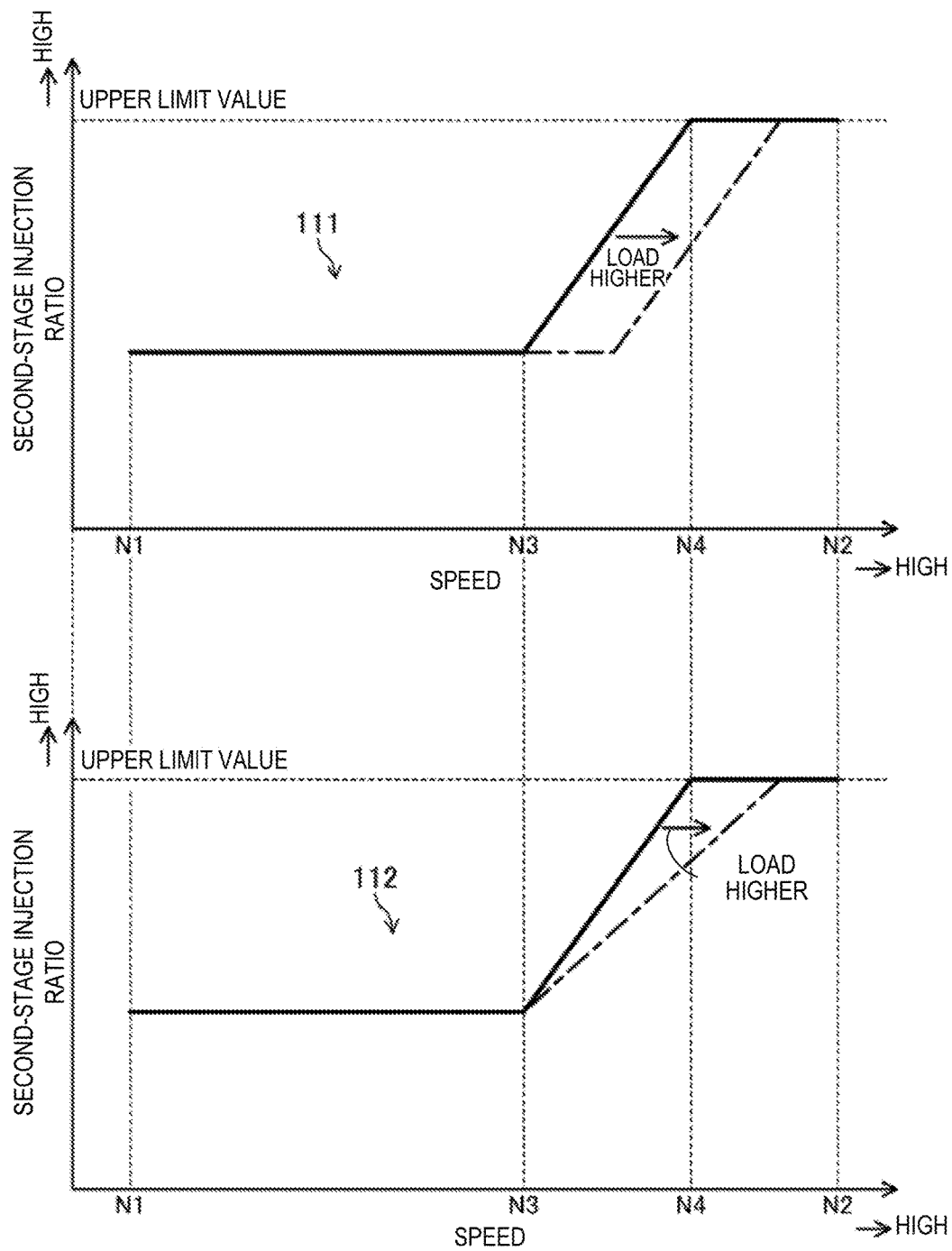
FIG. 11 shows charts in which the upper part illustrates one example of a relationship between an engine speed and a second-stage injection ratio within an operating range in which the SPCCI combustion is performed, and the lower part illustrates another example of the relationship between the engine speed and the second-stage injection ratio within the operating range in which the SPCCI combustion is performed.

FIG. 11 illustrates a relationship between the engine speed and the second-stage injection ratio within the medium load range (B) in which the SPCCI combustion is performed. The second-stage injection ratio indicates a ratio of the injection amount in the second-stage injection with respect to the injection amount in the first-stage injection. As the second-stage injection ratio increases, the injection amount in the second-stage injection increases and the injection amount in the first-stage injection decreases. On the other hand, as the second-stage injection ratio decreases, the injection amount in the second-stage injection decreases and the injection amount in the first-stage injection increases.

When the engine speed is low, the ECU 10 sets the second-stage injection ratio to a given low injection ratio. As described above, the second-stage injection forms the mixture gas around the spark plug 25. This mixture gas is spark-igniting mixture gas which combusts mainly in the SI combustion of the SPCCI combustion. When the second-stage injection ratio is low, since the concentration of fuel within the spark-igniting mixture gas decreases, the SI ratio of the SPCCI combustion decreases and the CI combustion increases. Generally, when the engine speed is low, NVH of the engine 1 is low. Therefore, even when the combustion noise increases by a certain level by the CI combustion, NVH falls below the allowable value. When the engine speed is low, by reducing the second-stage injection ratio and sufficiently performing the CI combustion, the fuel efficiency is improved.

Figure 14:
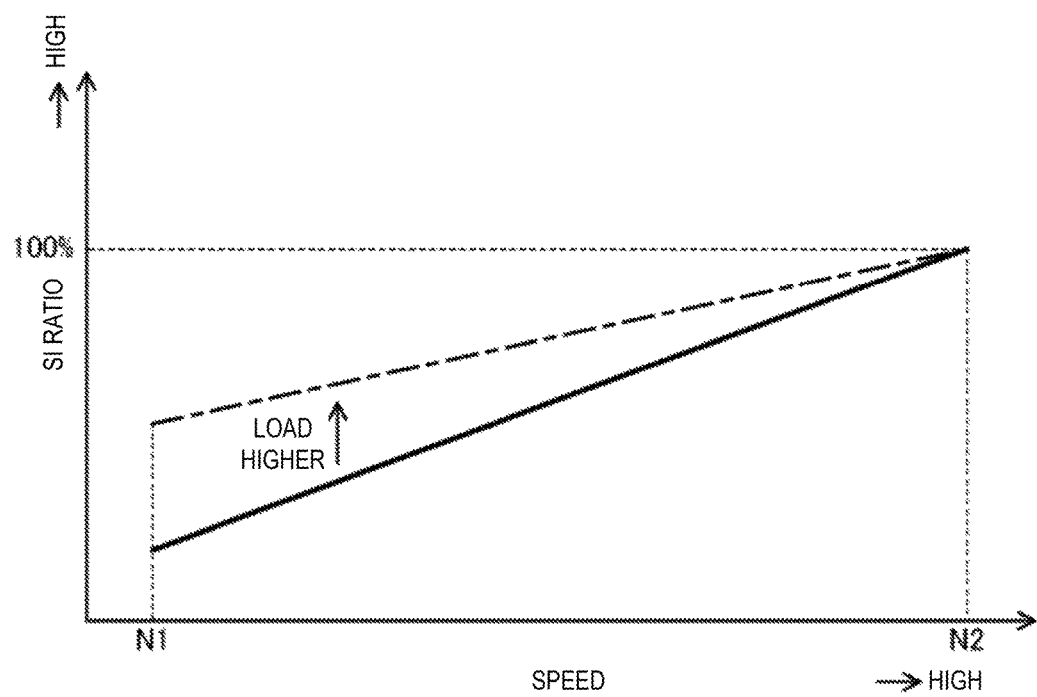
FIG. 14 is a chart illustrating one example of a relationship between the engine speed and the SI ratio within the operating range in which the SPCCI combustion is performed.

When the engine speed increases, NVH of the engine 1 increases. Moreover, with the addition of the combustion noise caused by the CI combustion, NVH may exceed the allowable value. Therefore, when the engine speed increases, the ECU 10 increases the SI ratio of the SPCCI combustion. For example, as illustrated in FIG. 14, the ECU 10 linearly increases the SI ratio as the engine speed increases. As illustrated in FIG. 7A, a speed N2 corresponds to the boundary between the medium load range (B) in which the SPCCI combustion is performed and the high speed range (D) in which the SI combustion is performed. The SI ratio is 100% at the speed N2.

In order to change the SI ratio according to the change in the engine speed, the ECU 10 changes the second-stage injection ratio according to the change in the engine speed as illustrated by a waveform 111 in the upper chart of FIG. 11. For example, when the engine speed exceeds a given speed N3, the ECU 10 increases the second-stage injection ratio as the engine speed increases. The given speed N3 is between a lowest speed N1 and the highest speed N2 of the medium load range (B). The given speed N3 may be higher than a middle speed ((N1+N2)/2) of the lowest speed N1 and the highest speed N2 within the medium load range (B). Alternatively, the given speed N3 may be equal to or higher than the middle speed of the lowest engine speed and the highest engine speed in the entire operating range of the engine 1 illustrated in FIG. 7A. In other words, the given speed N3 may suitably be set within the high speed range when the operating range of the engine 1 is evenly divided into two ranges of the low speed range and the high speed range.

In the example of the waveform 111, when the engine speed exceeds the given speed N3, the ECU 10 continuously increases the second-stage injection ratio at a given change rate as the engine speed increases. Alternatively, the ECU 10 may increase in a stepwise fashion (i.e., discontinuously) the second-stage injection ratio as the engine speed increases. By increasing the second-stage injection ratio, the fuel concentration of the spark-ignition mixture gas formed around the spark plug 25 increases. Since the SI combustion becomes sharp as a result, the SI ratio in the SPCCI combustion increases. Since the CI combustion decreases as the SI ratio increases, the combustion noise generated by the SPCCI combustion is reduced. When the engine speed is high, NVH is suppressed below the allowable value.

When the engine 1 is operating in the medium load range (B), the ECU 10 outputs a control signal to the injector 6 so that the second-stage injection ratio changes at the given change rate according to the change in the engine speed as described above. More specifically, the ECU 10 sets the change rate when the engine speed is higher than the given speed N3 (i.e., the slope of the upper chart of FIG. 11) to be higher (sharper) than the change rate when the engine speed is equal to or lower than the given speed N3 (i.e., in the example of the upper chart of FIG. 11, the slope of the chart is zero).

Note that although not illustrated, when the engine speed is equal to or lower than the given speed N3, instead of setting the change rate of the second-stage injection amount to zero, it may be increased as the engine speed increases. In this case, the change rate when the engine speed is equal to or lower than the given speed N3 may be lower than that when the engine speed exceeds the given speed N3.

As illustrated in the upper chart of FIG. 11, an upper limit value is determined for the second-stage injection ratio. When the engine speed exceeds a given speed N4, the ECU 10 sets the second-stage injection ratio at the upper limit value. The given speed N4 is lower than the highest speed N2 of the medium load range (B) illustrated in FIG. 7A. In the second-stage injection, since the timing for injecting the fuel in terms of the crank angle is late, the period until the injected fuel forms the combustible mixture gas is short. Further, the time for the crank angle to change by the same angle is shorter as the engine speed increases. Therefore, the time length from the injection of the fuel in the second-stage injection to the ignition becomes shorter as the engine speed increases.

As described above, when the second-stage injection ratio is increased as the engine speed is increased, a large amount of fuel needs to be vaporized in a short period of time to form the mixture gas. Here, in reality, the amount of fuel which does not combust in the SI combustion of the SPCCI combustion increases, a large amount of fuel causes the CI combustion, and thus the combustion noise may increase.

Therefore, in a configuration in which the second-stage injection ratio is increased as the engine speed increases, when the engine speed exceeds the given speed N4, the injection amount of the second-stage injection is limited so as not to exceed a given amount. When the engine speed exceeds the given speed N4, the ECU 10 fixes the injection amount of the second-stage injection at a given amount. Thus, the fuel which is not combusted in the SI combustion is prevented from increasing, and the combustion noise is avoided from increasing due to the CI combustion.

When the second-stage injection ratio is limited to the upper limit value, the SI ratio of the SPCCI combustion does not increase, and therefore, the effect of reducing the combustion noise caused by increasing the injection amount of the second-stage injection is limited. Therefore, when the second-stage injection ratio is limited to the upper limit value, the engine 1 is increased in the SI ratio by using another method. For example, the ECU 10 controls the SCV 56 to strengthen the flow of the intake air. If the intake air flow is strengthened, the SI ratio increases because the SI combustion becomes sharp. As a result, the combustion noise of the SPCCI combustion is reduced.

Figure 13:
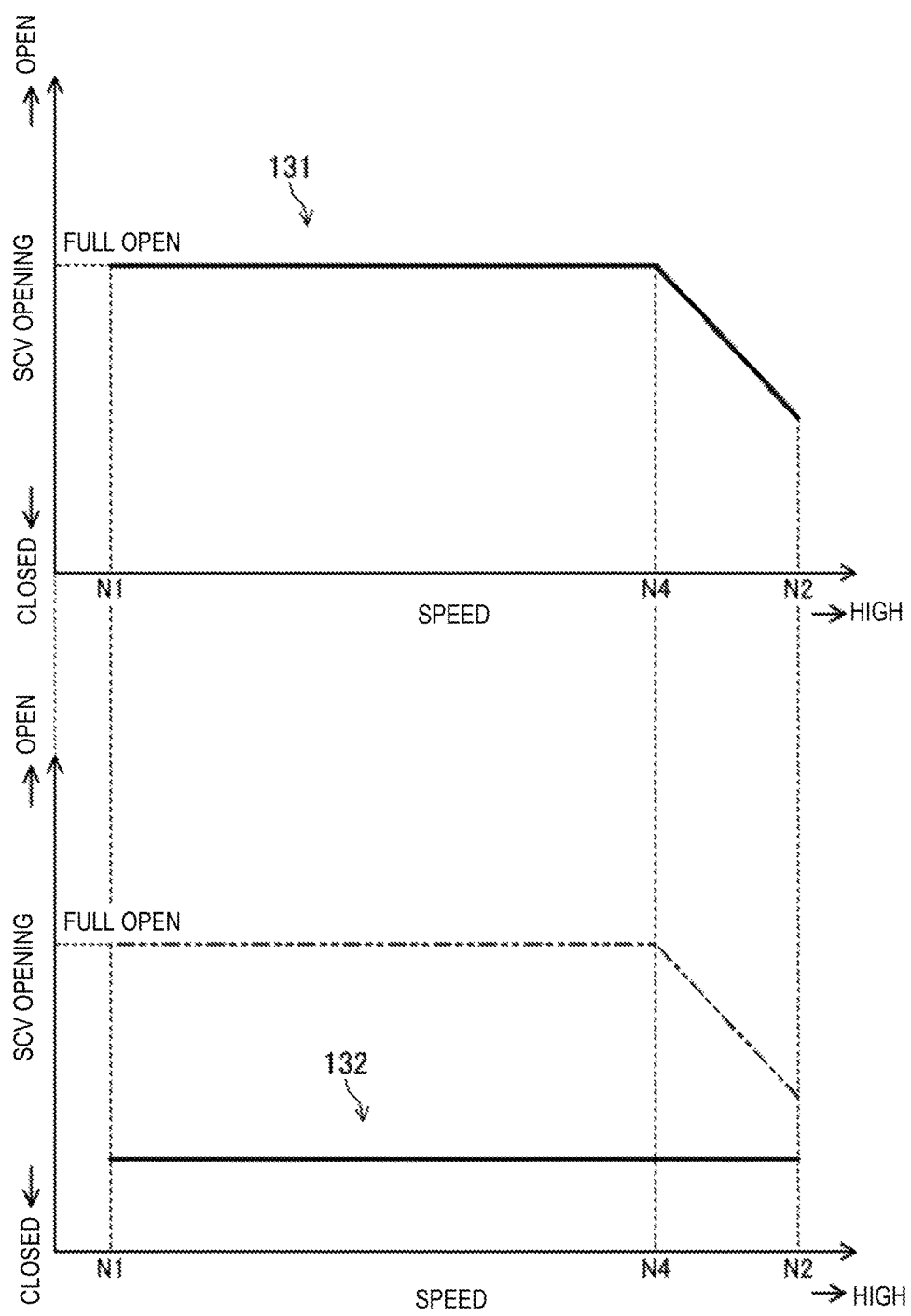
FIG. 13 shows charts in which the upper part illustrates one example of a relationship between the engine speed and an opening of a swirl control valve within the operating range on the operating range map of FIG. 7A in which the SPCCI combustion is performed, and the lower part illustrates another example of the relationship between the engine speed and the opening of the swirl control valve within the operating range on the operating range map of FIG. 7C in which the SPCCI combustion is performed.

A waveform 131 in the upper chart of FIG. 13 illustrates a relationship between the engine speed and the opening of the SCV 56. When the engine speed reaches the given speed N4 and the second-stage injection ratio is limited to the upper limit value, the ECU 10 narrows the opening of the SCV 56 from the fully opened state. Thus, the swirl flow in the combustion chamber 17 becomes strong. The ECU 10 linearly changes the opening of the SCV 56 as the engine speed increases. As the engine speed increases, since the swirl flow becomes stronger, the SI combustion becomes even sharper. Thus, the combustion noise of the SPCCI combustion is reduced. As a result, when the engine speed is high, NVH is suppressed below the allowable value.

In this engine 1, since NVH is suppressed below the allowable value by adjusting the SI ratio in the speed direction of the engine 1, the range where the SPCCI combustion is performed expands to the higher speed side. Therefore, the engine 1 excels in the fuel efficiency.

When the engine load is high, since the temperature in the combustion chamber 17 becomes relatively high, the SI combustion in the SPCCI combustion becomes sharper than when the engine load is low. When the engine load is high, the SI ratio becomes higher than when the engine load is low. Therefore, as indicated by the one-dotted chain line of FIG. 14, the straight line indicating the relationship between the engine speed and the SI ratio has a gentler slope at a high engine load than at a low engine load.

When the SI ratio increases due to the high engine load, since the combustion noise is reduced, it is not required to increase the second-stage injection ratio to increase the SI ratio. Therefore, the ECU 10 may shift the speed N3 at which the second-stage injection ratio starts increasing, to the higher speed side, as illustrated by the one-dotted chain line in the upper chart of FIG. 11. In this manner, the range where the low second-stage injection ratio is maintained is expanded to the higher speed side. As described above, if the second-stage injection ratio is low, the CI combustion in the SPCCI combustion increases, which is advantageous in improving the fuel efficiency.

Note that different from the example of the upper chart of FIG. 11, as indicated by the one-dotted chain line in a waveform 112 of the lower chart of FIG. 11, the ECU 10 may set the slope of the straight line indicating the relationship between the engine speed and the second-stage injection ratio gentler at a high engine load than at a low engine load.

(Fuel Injection Timing)

Figure 12:
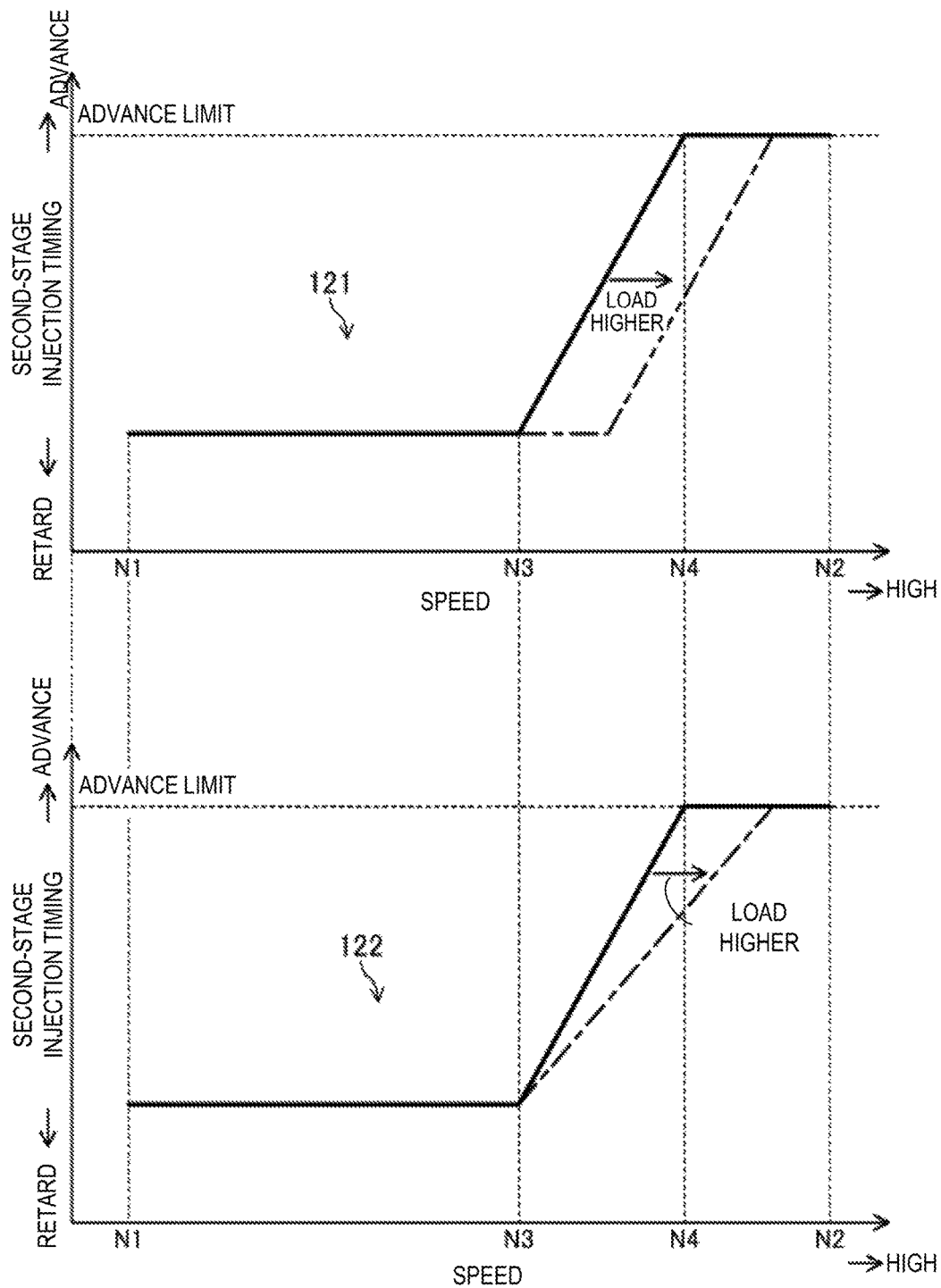
FIG. 12 shows charts in which the upper part illustrates one example of a relationship between the engine speed and a second-stage injection timing within the operating range in which the SPCCI combustion is performed, and the lower part illustrates another example of the relationship between the engine speed and the second-stage injection timing within the operating range in which the SPCCI combustion is performed.

A waveform 121 in the upper chart of FIG. 12 illustrates the relationship between the engine speed and the injection timing of the second-stage injection in the medium load range (B) in which the SPCCI combustion is performed. Note that although not illustrated in FIG. 12, the injection timing of the first-stage injection remains unchanged at a given timing regardless of the engine speed.

When the engine speed is low, the ECU 10 sets the injection timing of the second-stage injection at a given retarded timing. By retarding the timing of the second-stage injection, the mixture gas is ignited in a state where the flow of the gas in the combustion chamber 17 is strong. Thus, the SI combustion becomes sharp and the self-ignition timing is accurately controlled.

When the engine speed increases, the vaporization period from the injection of the fuel in the second-stage injection to the ignition thereof becomes shorter. In the SPCCI combustion, the amount of the mixture gas which does not combust in the SI combustion increases and the SI ratio drops. As a result, the CI combustion in the SPCCI combustion increases and the combustion noise of the SPCCI combustion increases. When the combustion noise increases, NVH may exceed the allowable value.

Therefore, as indicated by the waveform 121, when the engine speed exceeds the given speed N3, the ECU 10 advances the injection timing of the second-stage injection at a given change rate as the engine speed increases. The given speed N3 is the same as the speed N3 illustrated in FIG. 11.

The ECU 10 continuously advances the injection timing of the second-stage injection as the engine speed increases. Alternatively, the ECU 10 may advance in a stepwise fashion (i.e., discontinuously) the injection timing of the second-stage injection as the engine speed increases. By advancing the injection timing of the second-stage injection, the vaporization period is extended. As a result, the amount of the mixture gas which does not combust in the SI combustion decreases, which increases the SI ratio in the SPCCI combustion. As illustrated in FIG. 14, the SI ratio linearly increases as the engine speed increases. Since the combustion noise of the SPCCI combustion is suppressed low by increasing the SI ratio, when the engine speed is high, NVH is suppressed below the allowable value.

When the engine 1 is operating in the medium load range (B), the ECU 10 outputs a control signal to the injector 6 so that the second-stage injection timing changes at the given change rate according to the change in the engine speed as described above. More specifically, the ECU 10 sets the change rate when the engine speed is higher than the given speed N3 (i.e., the slope of the upper chart of FIG. 12) to be higher than the change rate when the engine speed is equal to or lower than the given speed N3 (i.e., in the example of the upper chart of FIG. 12, the slope of the chart is zero).

Note that although not illustrated, when the engine speed is equal to or lower than the given speed N3, instead of setting the change rate of the injection timing of the second-stage injection to zero, the injection timing may be advanced as the engine speed increases. In this case, the change rate when the engine speed is equal to or lower than the given speed N3 may be lower than that when the engine speed exceeds the given speed N3.

As illustrated in the upper chart of FIG. 12, an upper limit value is also determined for the injection timing of second-stage injection. If the injection timing of the second-stage injection is excessively early, the flow in the combustion chamber 17 at the ignition timing becomes weak, which makes the SI combustion slow. When the SI combustion becomes slow, the self-ignition timing cannot accurately be controlled as described above.

Therefore, the ECU 10 outputs a control signal to the injector 6 so as not to exceed a given advance limit. Since the injection ratio of the second-stage injection is linearly advanced as the engine speed increases, when the engine speed exceeds the given speed N4, the ECU 10 outputs the control signal to the injector 6 so that the injection timing of the second-stage injection reaches the advance limit. As a result, it is avoided that the SI combustion slows down, and the controllability of the self-ignition timing in the SPCCI combustion is prevented from degrading.

When the SI ratio increases due to the high engine load, since the combustion noise is reduced, it is not required to advance the second-stage injection to increase the SI ratio. Therefore, the ECU 10 may shift the speed N3 at which the injection timing starts to be advanced, to the higher speed side, as illustrated by the one-dotted chain line in the waveform 121. In this manner, the range where the injection timing of the second-stage injection is late is extended to the higher speed side. Since the SI combustion in the SPCCI combustion becomes sharp if the second-stage injection is late as described above, the controllability of the self-ignition timing improves.

Note that different from the example of the waveform 121, as indicated by the one-dotted chain line in a waveform 122 of the lower chart of FIG. 12, the ECU 10 may set the slope of the straight line indicating the relationship between the engine speed and the injection timing of the second-stage injection gentler.

In addition, although the ECU 10 changes both the second-stage injection ratio and the injection timing of the second-stage injection according to the change in the engine speed, the ECU 10 may alternatively change only the injection ratio of the second-stage injection according to the change in the engine speed.

(Adjustment of SI Ratio)

Figure 15:
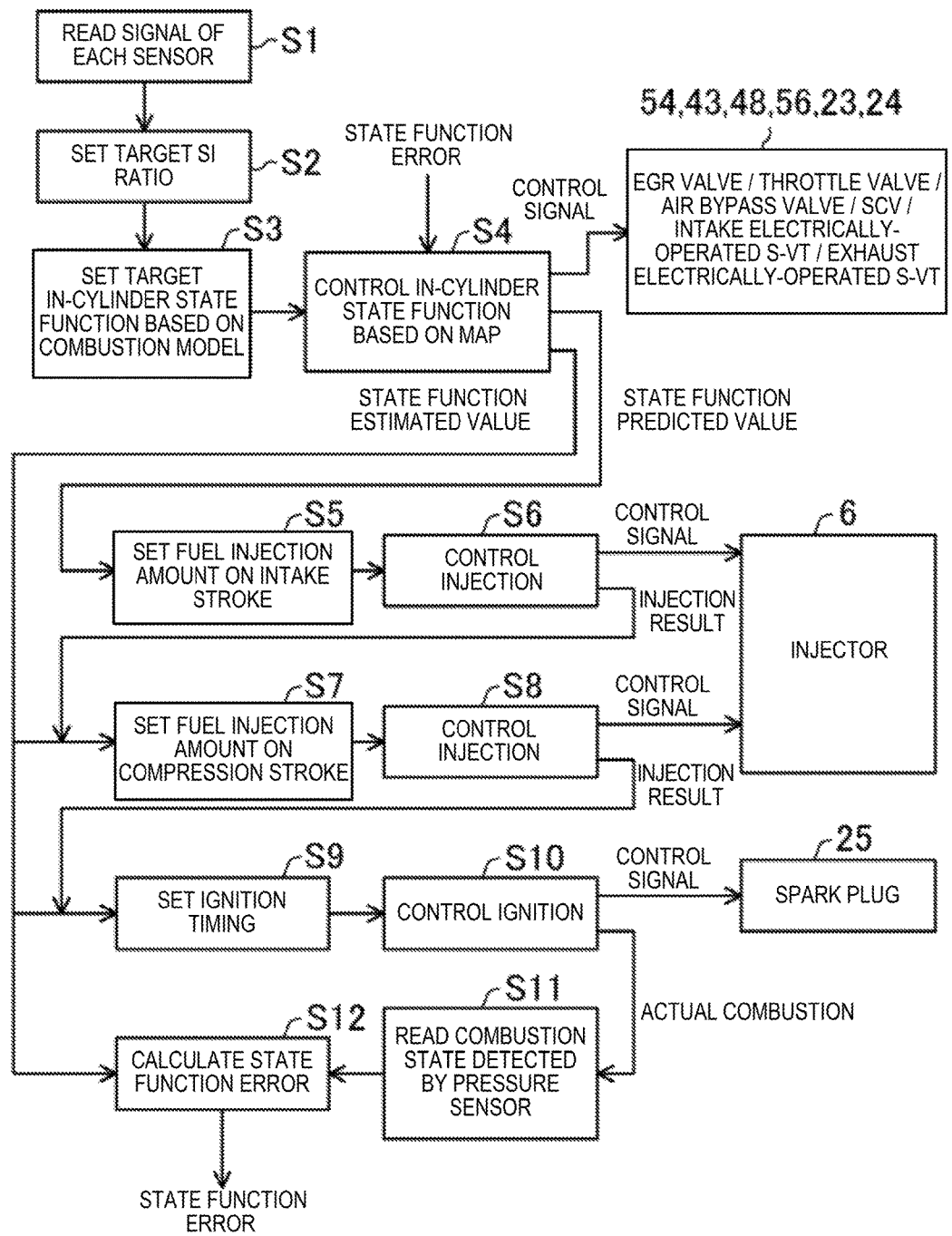
FIG. 15 is a flowchart illustrating a flow of a control of the engine executed by an ECU.

FIG. 15 illustrates a flow regarding the operation control of the engine executed by the ECU 10. Based on the detection signals from the sensors SW1 to SW16, the ECU 10 determines the operating state of the engine 1, and also adjusts the state function inside the combustion chamber 17, the injection amount, the injection timing, and the ignition timing so that the combustion in the combustion chamber 17 is of the SI ratio corresponding to the operating state. The ECU 10 further adjusts the SI ratio when the adjustment thereof is determined to be needed, based on the detection signals from the sensors.

First at 51, the ECU reads the detection signals of the sensors SW1 to SW16. Next at S2, the ECU 10 determines the operating state of the engine 1 based on the detection signals and sets the target SI ratio which is as illustrated in FIG. 9 or 14.

Next at S3, the ECU 10 sets a target in-cylinder state function for achieving the set target SI ratio, based on a preset combustion model. For example, the target temperature, the target pressure, and the target state function in the combustion chamber 17 are set. At S4, the ECU 10 sets the opening of the EGR valve 54, the opening of the throttle valve 43, the opening of the air bypass valve 48, the opening of the SCV 56, and the phase angles of the intake electrically-operated S-VT 23 and the exhaust electrically-operated S-VT 24 which are required for achieving the target in-cylinder state function. The ECU 10 sets the control amounts of these devices in advance based on a map stored in the ECU 10. Based on the set control amounts, the ECU 10 outputs control signals to the EGR valve 54, the throttle valve 43, the air bypass valve 48, the SCV 56, the intake electrically-operated S-VT 23, and the exhaust electrically-operated S-VT 24. As each device operates based on the control signal from the ECU 10, the state function in the combustion chamber 17 becomes the target state function.

The ECU 10 further calculates a predicted value and an estimated value of the state function in the combustion chamber 17 based on the set control amount of each device. The state function predicted value is obtained by predicting the state function in the combustion chamber 17 before the intake valve 21 is closed, and is used for setting the fuel injection amount on the intake stroke as described later. The state function estimated value is obtained by estimating the state function in the combustion chamber 17 after the intake valve 21 is closed, and is used for setting of the fuel injection amount and the ignition timing on the compression stroke as described later. The state function estimated value is also used for calculating a state function error based on comparison with an actual combustion state as described later.

At S5, the ECU 10 sets the fuel injection amount on the intake stroke based on the state function predicted value. Note that in a case where the fuel injection is not performed on the intake stroke, the fuel injection amount is zero. At S6, the ECU 10 controls the injection of the injector 6. That is, the ECU 10 outputs a control signal to the injector 6 to inject the fuel into the combustion chamber 17 at a given injection timing.

At S7, the ECU 10 sets the fuel injection amount on the compression stroke based on the state function estimated value and the fuel injection result on the intake stroke. Note that in the case where the fuel injection is not performed on the compression stroke, the fuel injection amount is zero. In the case where the split injections are performed on the compression stroke, the injection amount of the first-stage injection and the injection amount of the second-stage injection are respectively set. At S8, the ECU 10 outputs a control signal to the injector 6 to inject the fuel into the combustion chamber 17 at the injection timing based on the preset map.

At S9, the ECU 10 sets the ignition timing based on the state function estimated value and the fuel injection result on the compression stroke. At S10, the ECU 10 outputs a control signal to the spark plug 25 to ignite the mixture gas into the combustion chamber 17 at the set ignition timing.

The SI combustion or SPCCI combustion is performed in the combustion chamber 17 by the spark plug 25 igniting the mixture gas. At S11, the ECU 10 reads a change in pressure inside the combustion chamber 17 detected by the pressure sensor SW6, and, based on this change, determines the combustion state of the mixture gas in the combustion chamber 17. At S12, the ECU 10 further compares the detection result of the combustion state with the state function estimated value estimated at S4 to calculate a difference (error) between the state function estimated value and the actual state function. The calculated error is used in the estimation at S4 in the next cycle and/or its subsequent cycles. The ECU 10 adjusts the openings of the throttle valve 43, the EGR valve 54, the SCV 56, and/or the air bypass valve 48, and the phase angles of the intake electrically-operated S-VT 23 and the exhaust electrically-operated S-VT 24. Thus, the introduction amounts of fresh air and EGR gas amount into the combustion chamber 17 are adjusted. The feedback of the state function error is equivalent to adjusting the SI ratio when the ECU 10 determines that the adjustment of the SI ratio is needed based on the error between the target SI ratio and the actual SI ratio (error).

If, at S8, the temperature in the combustion chamber 17 is estimated to be lower than the target temperature based on the state function estimated value, the ECU 10 advances the injection timing on the compression stroke than the injection timing which is based on the map so that the ignition timing advances. On the other hand, if the temperature in the combustion chamber 17 is estimated to be higher than the target temperature based on the state function estimated value at S8, the ECU 10 retards the injection timing on the compression stroke than the injection timing which is based on the map so that the ignition timing retards.

Figure 16:
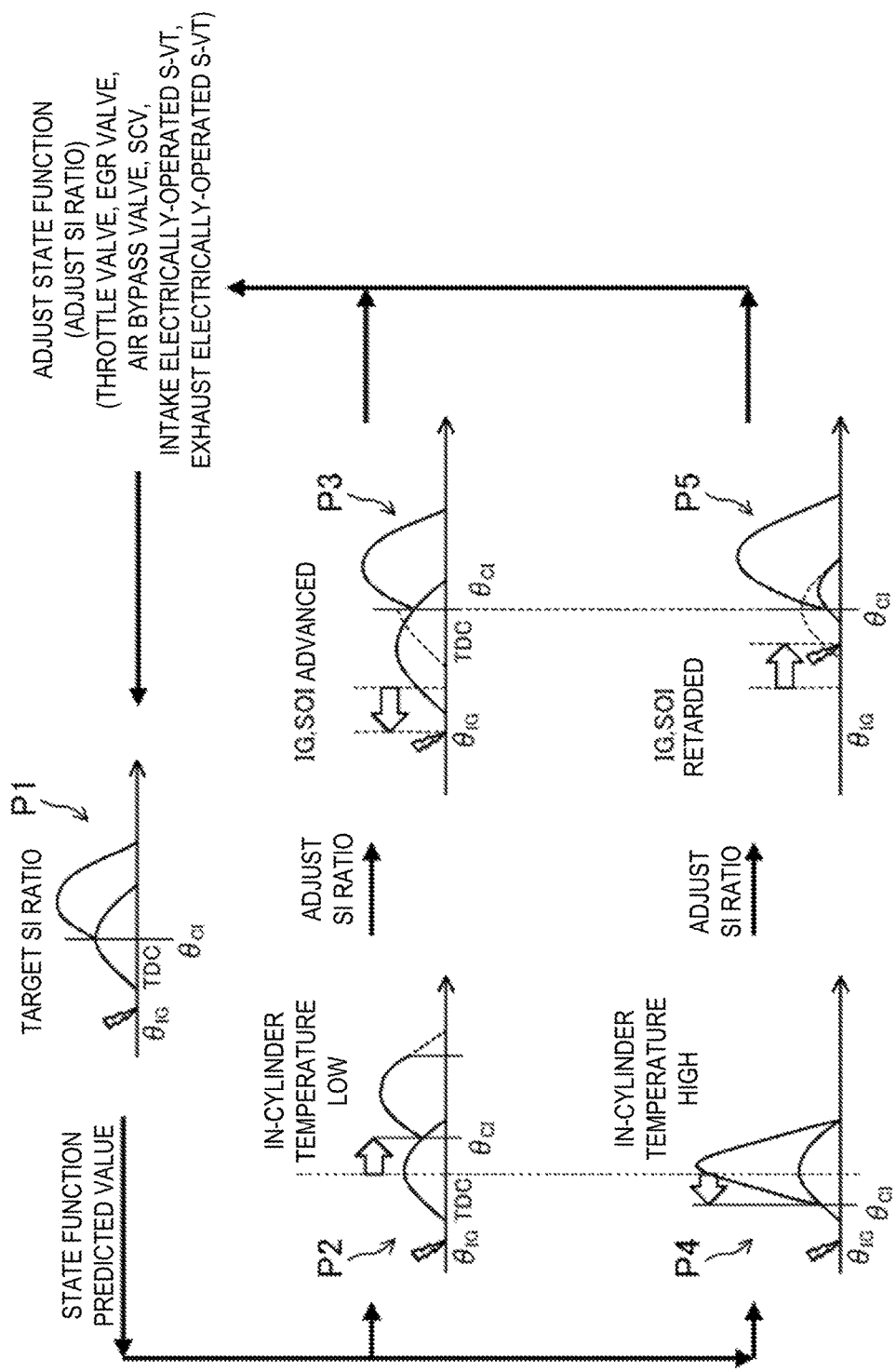
FIG. 16 is a diagram illustrating a control concept regarding an adjustment of the SI ratio.

That is, as indicated by P2 of FIG. 16, if the temperature in the combustion chamber 17 is low, the timing $\theta_{CI}$ at which the unburned mixture gas self-ignites after the SI combustion is started by the spark-ignition retards, and the SI ratio shifts from the target SI ratio (see P1). In this case, the unburned fuel increases and the exhaust gas performance degrades.

Therefore, when the temperature in the combustion chamber 17 is estimated to be lower than the target temperature, the ECU 10 advances the injection timing as well as the ignition timing $\theta_{IG}$ at S10 of FIG. 15. As indicated by P3 in FIG. 16, since the start of SI combustion is advanced, sufficient heat generation by the SI combustion occurs, and therefore, the timing $\theta_{CI}$ of the self-ignition of the unburned mixture gas is prevented from retarding when the temperature in the combustion chamber 17 is low. As a result, the SI ratio approaches the target SI ratio. The increase of the unburned fuel and the degradation of exhaust gas performance are prevented.

Moreover, as indicated by P4 of FIG. 16, when the temperature in the combustion chamber 17 is high, the unburned mixture gas self-ignites immediately after the SI combustion is started by the spark-ignition, and the SI ratio shifts from the target SI ratio (see P1). In this case, the combustion noise increases.

Therefore, when the temperature in the combustion chamber 17 is estimated to be exceed the target temperature, the ECU 10 retards the injection timing as well as the ignition timing θIG at S10 of FIG. 15. As indicated by P5 in FIG. 16, since the start of SI combustion is retarded, the timing $\theta_{CI}$ of the self-ignition of the unburned mixture gas is prevented from advancing when the temperature in the combustion chamber 17 is high. As a result, the SI ratio approaches the target SI ratio. The increase of combustion noise is avoided.

The adjustments of the injection timing and the ignition timing are equivalent to adjusting the SI ratio when the ECU 10 determines that the SI ratio in the SPCCI combustion is required to be adjusted. By adjusting the injection timing, suitable mixture gas is formed in the combustion chamber 17 at the advanced or retarded ignition timing. The spark plug 25 reliably ignites the mixture gas, and the unburned mixture gas self-ignites at a suitable timing.

Note that the adjustment of the state function inside the combustion chamber 17 through controlling the throttle valve 43, the EGR valve 54, the air bypass valve 48, the intake electrically-operated S-VT 23, the exhaust electrically-operated S-VT 24, and the SCV 56 based on the actual combustion state in FIG. 16 is as described at S12 and S4 of FIG. 15.

The engine 1 adjusts the SI ratio by the state function setting devices including the throttle valve 43, the EGR valve 54, the air bypass valve 48, the intake electrically-operated S-VT 23, the exhaust electrically-operated S-VT 24, and the SCV 56. The SI ratio may roughly be adjusted by adjusting the state function inside the combustion chamber 17. At the same time, the engine 1 adjusts the SI ratio by adjusting the injection timing and the ignition timing of the fuel. By adjusting the injection timing and the ignition timing, for example, the difference between the cylinders may be corrected and the self-ignition timing is finely adjusted. By adjusting the SI ratio in two stages, the engine 1 accurately achieves the target SPCCI combustion corresponding to the operating state.

(Second Configuration Example of Engine Operating Range Map)

Figure 7B:
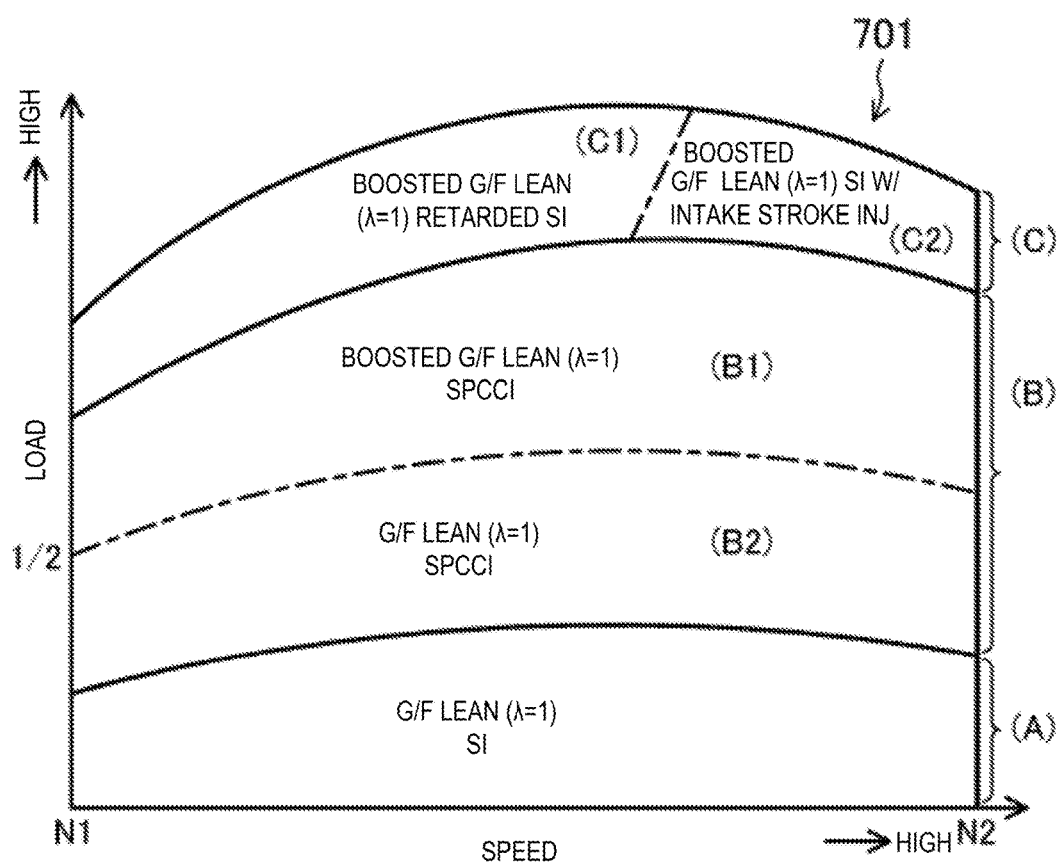
FIG. 7B is a chart illustrating another operating range map of the engine.

FIG. 7B illustrates a second configuration example of the operating range map of the engine 1. An operating range map 701 is divided into three ranges in terms of the engine load. For example, the three ranges include a low load range (A) including the idle operation, a high load range (C) including the full engine load, a medium load range (B) between the low load range (A) and the high load range (C). The low load range (A) of the operating range map 701 corresponds to the low load range (A) of the operating range map 700 of FIG. 7A, the medium load range (B) of the operating range map 701 corresponds to the medium load range (B) of the operating range map 700 of FIG. 7A, and the high load range (C) of the operating range map 701 corresponds to the high load range (C) of the operating range map 700 of FIG. 7A. The medium load range (B) is divided into a first medium load segment (B1) and a second medium load segment (B2) in the engine load direction, and the high load range (C) is divided into a first high load segment (C1) and a second high load segment (C2) in the engine speed direction.

On the operating range map 701 of FIG. 7B, no high speed range (D) of the operating range map 700 is provided, and the low load range (A), the medium load range (B) and the high load range (C) are respectively extended to a highest speed N2. Note that a speed N1 of FIG. 7B corresponds to the speed N1 of FIG. 7A in terms of being the lowest engine speed for performing the SPCCI combustion, and the speed N2 of FIG. 7B corresponds to the speed N2 of FIG. 7A in terms of being the highest engine speed for performing the SPCCI combustion.

Also on the operating range map 701 of FIG. 7B, the control in the engine load direction is performed as described with reference to FIGS. 9 and 10, and, within the medium load range (B) in which the SPCCI combustion is performed, the SI ratio in the SPCCI combustion may be changed by changing the second-stage injection ratio and/or the second-stage injection timing in the engine speed direction as described with reference to FIGS. 11 to 14.

(Third Configuration Example of Engine Operating Range Map)

Figure 7C:
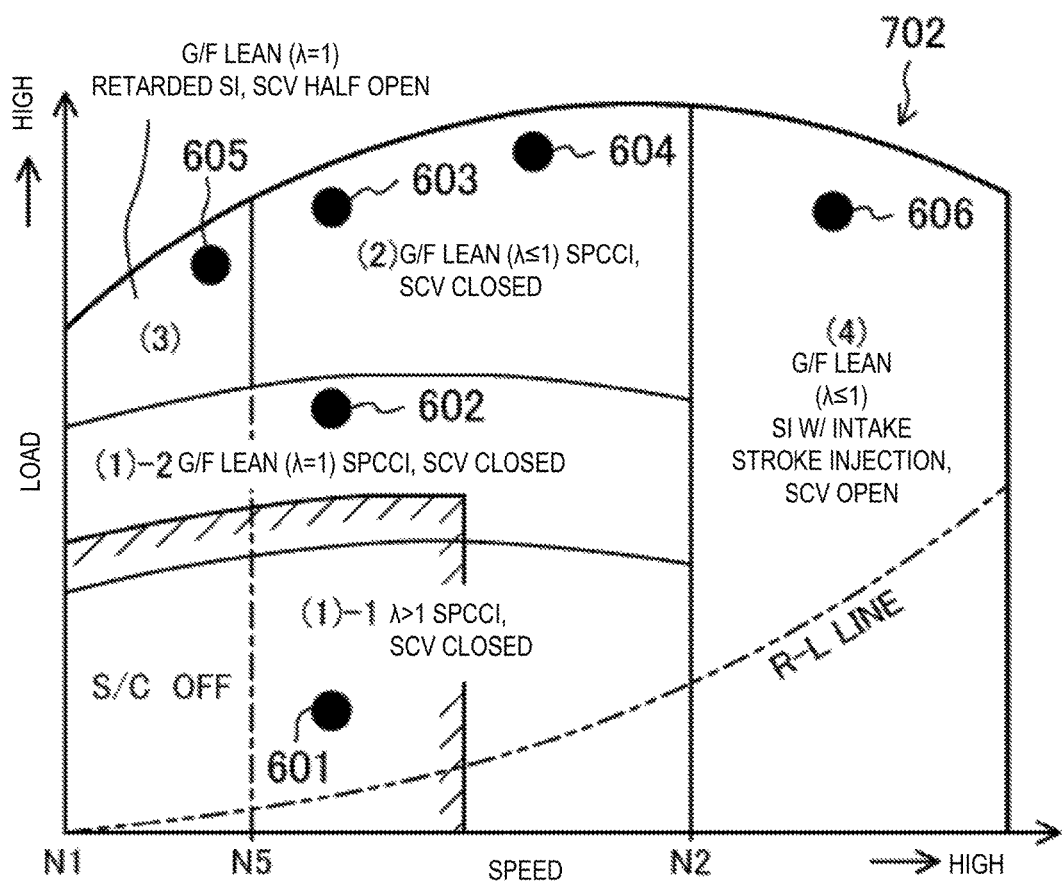
FIG. 7C is a chart illustrating another operating range map of the engine.

FIG. 7C illustrates another configuration example of the operating range map of the engine 1 in a warmed-up state of the engine. An operating range map 702 of the engine 1 is divided into five ranges in terms of the engine load and the engine speed. For example, the five ranges include: a low load range (1)-1 including the idle operation and extending in low and medium engine speed ranges; a medium load range (1)-2 in which the engine load is higher than the low load range and extending in the low and medium engine speed ranges; a high-load medium-speed range (2) in which the engine load is higher than the medium load range (1)-2 and which is located in the high load range including the full engine load; a high-load low-speed range (3) located in the high load range and in which the engine speed is lower than the high-load medium-speed range (2); and a high speed range (4) in which the engine speed is higher than the low load range (1)-1, the medium load range (1)-2, the high-load medium-speed range (2), and the high-load low-speed range (3). Here, the low speed range, the medium speed range, and the high speed range may be defined by substantially evenly dividing, in the engine speed direction, the entire operating range of the engine 1 into three ranges of the low speed range, the medium speed range and the high speed range. In the example of FIG. 7C, the engine speed lower than a speed N5 is defined as low, the engine speed higher than a speed N2 is defined as high, and the engine speed between engine speeds N5 and N2 is defined as medium. For example, the speed N5 may be about 1,200 rpm and the speed N2 may be about 4,000 rpm. Note that the speed N2 in FIG. 7C corresponds to the speed N2 of FIGS. 7A and 7B in terms of being the highest engine speed for performing the SPCCI combustion. Further, the two-dotted chain line in FIG. 7C indicates the road-load line of the engine 1.

Here, in the third configuration example, the geometric compression ratio of the engine 1 is set relatively low. Reducing the geometric compression ratio is advantageous in reducing a cooling loss and a mechanical loss. For example, the geometric compression ratio may be set to 14:1 to 17:1 in regular specifications (the octane number of the fuel is about 91) and to 15:1 to 18:1 in high-octane specifications (the octane number of the fuel is about 96).

While reducing the geometric compression ratio, in order to increase the temperature inside the combustion chamber 17 to a certain extent when the piston 3 reaches CTDC, in the third configuration example, the effective compression ratio is increased. That is, the close timing of the intake valve 21 is advanced to approach BDC of the intake stroke. Even if the internal EGR gas is to be introduced into the combustion chamber 17 by providing the negative overlap period in which both the intake valve 21 and the exhaust valve 22 are closed as described above, since the open period of the intake valve 21 needs to be set to the advancing side in order to increase the effective compression ratio, the introduction amount of the internal EGR gas cannot be increased. Therefore, in the third configuration example, the internal EGR gas is introduced into the combustion chamber 17 by providing the positive overlap period in which the intake and exhaust valves 21 and 22 are both opened. Thus, both of increasing the effective compression ratio and introducing the internal EGR gas into the combustion chamber 17 are achieved.

On the operating range map 702, mainly for improving the fuel efficiency and the exhaust gas performance, the engine 1 performs combustion by compression self-ignition (i.e., SPCCI combustion) within the low load range (1)-1, the medium load range (1)-2, and the high-load medium-speed range (2). The operating range map 702 is different from the operating range map 700 or 701 in that the SPCCI combustion is performed also when the engine 1 operates at a low load and when the engine 1 operates at a high load. Further, the engine 1 performs the combustion by spark-ignition within the other ranges, specifically, the high-load low-speed range (3) and the high speed range (4).

In the third configuration example, a swirl flow is formed in the combustion chamber 17 by setting the opening of the SCV 56 to the closing side at least within the range in which the SPCCI combustion is performed.

According to the study of the present inventors, by generating the swirl flow in the combustion chamber 17, the residual gas (i.e., burned gas) accumulated in the cavity 31 on the top surface of the piston 3 is led outside the cavity 31. When the fuel is distributed substantially evenly throughout the combustion chamber 17, the G/F of the mixture gas near the spark plug 25 is relatively lowered since no residual gas is located in the cavity 31, the G/F of the mixture gas located away from the spark plug 25 is relatively increased since it includes the residual gas. The G/F of the mixture gas in the combustion chamber 17 may be stratified.

The SI combustion in the SPCCI combustion is the combustion of the mixture gas ignited by the spark plug 25. The mixture gas near the spark plug 25 mainly combusts in the SI combustion. On the other hand, the CI combustion in the SPCCI combustion is the combustion caused by self-ignition of the unburned mixture after the SI combustion starts. The mixture gas located away from the spark plug 25 mainly combusts in the CI combustion.

When the G/F in the combustion chamber 17 is stratified, the upper limit value of the total G/F in the entire combustion chamber 17 for stabilizing the SPCCI combustion exceeds the range of 18 to 30 described above. According to the study of the present inventors, the SPCCI combustion can be stabilized if the total G/F range is from 18 to 50. Here, the range of G/F of the mixture gas near the spark plug 25 is from 14 to 22. Stratifying the G/F of the mixture gas in the combustion chamber 17 further dilutes the mixture gas while stabilizing the SPCCI combustion, which is advantageous in improving the fuel efficiency of the engine.

Hereinafter, the operation of the engine 1 within each range of the operating range map 702 is described in detail with reference to the fuel injection timing and the ignition timing illustrated in FIG. 17. Note that the reference characters 601, 602, 603, 604, 605, and 606 in FIG. 17 correspond to the operating state of the engine 1 indicated by the reference characters 601, 602, 603, 604, 605, and 606 on the operating range map 702 of FIG. 7C.

(Low Load Range (1)-1)

When the engine 1 is operating within the low load range (1)-1, the engine 1 performs the SPCCI combustion.

Figure 17:
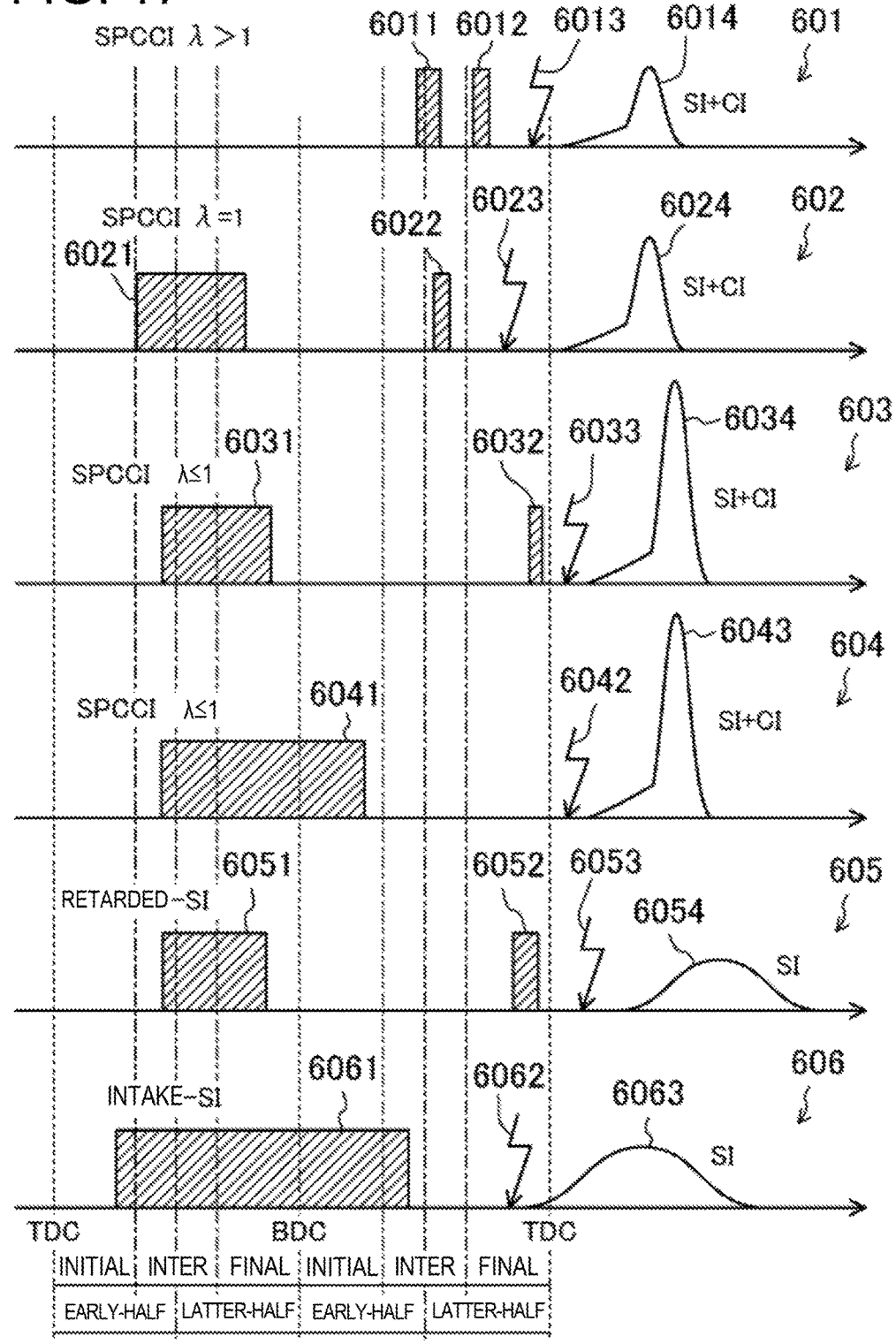
FIG. 17 is a diagram illustrating fuel injection timings, ignition timings, and combustion waveforms in respective operating states on the operating range map of FIG. 7C.

The reference character 601 in FIG. 17 indicates one example of the fuel injection timings (reference characters 6011 and 6012) and the ignition timing (reference character 6013), and a combustion waveform (i.e., a waveform indicating a change in heat generation rate with respect to the crank angle; the reference character 6014) when the engine 1 is operating in the operating state of the reference character 601 within the low load range (1)-1 of the engine 1.

In order to improve the fuel efficiency of the engine 1, the EGR system 55 introduces the EGR gas into the combustion chamber 17 when the engine 1 is operating within the low load range (1)-1. For example, by providing the positive overlap period in which the intake valve 21 and the exhaust valve 22 are both opened near TDC of the exhaust stroke, a portion of the exhaust gas discharged from the combustion chamber 17 to the intake port 18 and the exhaust port 19 is reintroduced into the combustion chamber 17. Since hot burned gas is introduced into the combustion chamber 17 in this case, the temperature in the combustion chamber 17 increases, which is advantageous in stabilizing the SPCCI combustion.

When the engine 1 is operating within the low load range (1)-1, the swirl flow is formed in the combustion chamber 17. The swirl flow is strong in an outer circumferential portion of the combustion chamber 17 and weak in a center portion. The SCV 56 is fully closed or has a given narrow opening. As described above, since the intake port 18 is a tumble port, an oblique swirl flow having a tumble component and a swirl component is formed in the combustion chamber 17.

When the engine 1 operates within the low load range (1)-1, the air-fuel ratio (A/F) of the mixture gas is leaner than the stoichiometric air-fuel ratio in the entire combustion chamber 17. That is, the excess air ratio $\lambda$ of the mixture gas exceeds 1 in the entire combustion chamber 17. More specifically, the A/F of the mixture gas in the entire combustion chamber 17 is 30:1 or higher. In this manner, generation of raw $NO_x$ is reduced and the exhaust gas performance is improved.

When the engine 1 operates within the low load range (1)-1, the mixture gas is stratified between the center portion and the outer circumferential portion of the combustion chamber 17. The center portion of the combustion chamber 17 is the portion where an ignition plug 25 is disposed, and the outer circumferential portion is the portion around the center portion and in contact with a liner of the cylinder 11. The center portion of the combustion chamber 17 may be defined as a portion where the swirl flow is weak and the outer circumferential portion may be defined as a portion where the swirl flow is strong.

The fuel concentration of the mixture gas in the center portion is higher than that in the outer circumferential portion. For example, the A/F of the mixture gas in the center portion is between 20:1 and 30:1, and the A/F of the mixture gas in the outer circumferential portion is 35:1 or higher.

When the engine 1 operates within the low load range (1)-1, the injector 6 basically injects the fuel into the combustion chamber 17 by splitting it into in a plurality of injections on the compression stroke. The mixture gas is stratified in the center portion and the outer circumferential portion of the combustion chamber 17 by the split injections of the fuel and the strong swirl flow in the combustion chamber 17.

After the fuel injection is ended, the spark plug 25 ignites the mixture gas in the center portion of the combustion chamber 17 at the given timing before CTDC (see the reference character 6013). Since the fuel concentration of the mixture gas in the center portion is relatively high, ignitability improves and the SI combustion by the flame propagation stabilizes. By stabilizing the SI combustion, the CI combustion starts at the suitable timing. The controllability of the CI combustion improves in the SPCCI combustion. As a result, when the engine 1 operates within the low load range (1)-1, both the reduction of the generation of combustion noise and the improvement of the fuel efficiency by the shortening of the compression period are achieved.

Since the engine 1 performs the SPCCI combustion by making the mixture gas leaner than the stoichiometric airfuel ratio within the low load range (1)-1 as described above, the low load range (1)-1 may be referred to as "SPCCI lean range."

(Medium Load Range (1)-2)

Also when the engine 1 is operating within the medium load range (1)-2, the engine 1 performs the SPCCI combustion similarly to the low load range (1)-1. The medium load range (1)-2 corresponds to the medium load range (B) on the operating range map 700 or 701.

The reference character 602 in FIG. 17 indicates one example of the fuel injection timings (reference characters 6021 and 6022) and the ignition timing (reference character 6023), and a combustion waveform (reference character 6024) when the engine 1 is operating in the operating state of the reference character 602 within the medium load range (1)-2 of the engine 1.

The EGR system 55 introduces the EGR gas into the combustion chamber 17 when the operating state of the engine 1 is within the medium load range (1)-2. For example, similar to the low load range (1)-1, by providing the positive overlap period in which the intake valve 21 and the exhaust valve 22 are both opened near TDC of the exhaust stroke, a portion of the exhaust gas discharged from the combustion chamber 17 to the intake port 18 and the exhaust port 19 is reintroduced into the combustion chamber 17. That is, the internal EGR gas is introduced into the combustion chamber 17. Further, within the medium load range (1)-2, the exhaust gas cooled by the EGR cooler 53 is introduced into the combustion chamber 17 through the EGR passage 52. That is, the external EGR gas at a lower temperature than the internal EGR gas is introduced into the combustion chamber 17. Within the medium load range (1)-2, the internal EGR gas and/or external EGR gas is introduced into the combustion chamber 17 to adjust the temperature in the combustion chamber 17 to an appropriate temperature.

Also when the engine 1 operates within the medium load range (1)-2, similar to the low load range (1)-1, a swirl flow is formed in the combustion chamber 17. The SCV 56 is fully closed or has a given narrow opening. By forming the swirl flow, the residual gas accumulated in the cavity 31 is led outside the cavity 31. As a result, the G/F of the mixture gas in the SI portion near the spark plug 25 may be varied from the G/F of the mixture gas in the CI portion around the SI portion. Therefore, the SPCCI combustion is stabilized by setting the total G/F in the entire combustion chamber 17 to between 18 and 50 as described above.

Further, since the turbulence kinetic energy in the combustion chamber 17 increases by forming the swirl flow, when the engine 1 operates within the medium load range (1)-2, the flame of the SI combustion propagates promptly and the SI combustion is stabilized. The controllability of the CI combustion improves by stabilizing the SI combustion. By making the timing of the CI combustion in the SPCCI combustion appropriate, the generation of combustion noise is reduced and the fuel efficiency is improved. Further, the variation in torque between cycles is reduced.

When the engine 1 operates within the medium load range (1)-2, the air-fuel ratio (A/F) of the mixture gas is at the stoichiometric air-fuel ratio (A/F≈4.7:1) in the entire combustion chamber 17. The three-way catalyst purifies the exhaust gas discharged from the combustion chamber 17. Thus, the exhaust gas performance of the engine 1 becomes good. The A/F of the mixture gas may be set to remain within the purification window of the three-way catalyst. Therefore, the excess air ratio λ of the mixture gas may be set to 1.0±0.2.

When the engine 1 operates within the medium load range (1)-2, the injector 6 performs the fuel injection on the intake stroke (reference character 6021) and the fuel injection on the compression stroke (reference character 6022). By performing the first injection 6021 on the intake stroke, the fuel is distributed substantially evenly in the combustion chamber 17. By performing the second injection 6022 on the compression stroke, the temperature in the combustion chamber 17 is reduced by latent heat of vaporization of the fuel. The mixture gas containing the fuel injected in the first injection 6021 is prevented from causing pre-ignition. Note that within the medium load range (1)-2, particularly in the operating state where the engine load is low, the second injection 6022 may be omitted.

When the injector 6 performs the first injection 6021 on the intake stroke and the second injection 6022 on the compression stroke, the mixture gas with the excess air ratio λ of 1.0±0.2 as a whole is formed in the combustion chamber 17. Since the fuel concentration of the mixture gas is substantially homogeneous, the improvement in the fuel efficiency by reducing the unburned fuel loss and the improvement in the exhaust gas performance by avoiding the smoke generation are achieved. The excess air ratio λ is preferably 1.0 to 1.2. Further, the total G/F in the entire combustion chamber 17 is 18 to 50, and the G/F of the SI portion near the spark plug 25 is 14 to 22.

By the spark plug 25 igniting the mixture gas at the given timing before CTDC (reference character 6023), the mixture gas combusts by flame propagation. After the combustion by flame propagation is started, the unburned mixture gas self-ignites at the target timing and causes the CI combustion. The fuel injected in the second-stage injection mainly causes the SI combustion. The fuel injected in the first-stage injection mainly causes the CI combustion. By having the total G/F in the entire combustion chamber 17 between 18 and 50 and the G/F of the SI portion near the spark plug 25 between 14 and 22, the SPCCI combustion is stabilized.

Therefore, within the medium load range (1)-2, since the engine 1 performs the SPCCI combustion by setting the mixture gas to the stoichiometric air-fuel ratio, the medium load range (1)-2 may be referred to as "SPCCIλ=1 range."

Here, on the operating range map 702, a range in which the booster 44 is turned off (refer to S/C OFF) is a part of the low load range (1)-1 and a part of the medium load range (1)-2. In detail, the booster 44 is turned off within the low engine speed segment of the low load range (1)-1. Within a high engine speed segment of the low load range (1)-1, the booster 44 is turned on to increase the boosting pressure in order to secure a required intake charge amount corresponding to the engine speed being high. Further, within a low-load low-speed segment of the medium load range (1)-2, the booster 44 is turned off. Within a high load segment of the medium load range (1)-2, the booster 44 is turned on in order to secure the required intake charge amount corresponding to the engine speed being high. Within a high speed segment of the medium load range (1)-2, the booster 44 is turned on in order to secure the required intake charge amount corresponding to the engine speed being high.

Note that within the high-load medium-speed range (2), the high-load low-speed range (3), and the high speed range (4), the booster 44 is turned on throughout the ranges.

(High-Load Medium-Speed Range (2))

Also when the engine 1 is operating within the high-load medium-speed range (2), the engine 1 performs the SPCCI combustion similarly to the low load range (1)-1 and the medium load range (1)-2.

The reference character 603 in FIG. 17 indicates one example of the fuel injection timings (reference characters 6031 and 6032) and the ignition timing (reference character 6033), and a combustion waveform (reference character 6034) when the engine 1 is operating in the operating state of the reference character 603 within the high-load medium-speed range (2) of the engine 1. Further, the reference character 604 in FIG. 17 indicates one example of the fuel injection timings (reference character 6041) and the ignition timing (reference character 6042), and a combustion waveform (reference character 6043) when the engine speed is higher than in the operating state of the reference character 603.

The EGR system 55 introduces the EGR gas into the combustion chamber 17 when the operating state of the engine 1 is within the high-load medium-speed range (2). The engine 1 reduces the EGR gas amount as the engine load increases. At the full engine load, the EGR gas may be set to zero.

Also when the engine 1 operates within the high-load medium-speed range (2), similar to the low load range (1)-1, a swirl flow is formed in the combustion chamber 17. The swirl flow may be, for example, a strong swirl flow at a swirl ratio of 4 or higher. The SCV 56 is fully closed or has a given narrow opening.

When the engine 1 operates within the high-load medium-speed range (2), the air-fuel ratio (A/F) of the mixture gas is at or richer than the stoichiometric air-fuel ratio in the entire combustion chamber 17 (i.e., the excess air ratio λ of the mixture gas is λ≤1).

When the engine 1 operates at the low speed side of the high-load medium-speed range (2), the injector 6 injects the fuel on the intake stroke (reference character 6031) and injects the fuel at a final stage of the compression stroke (reference character 6032). The final stage of the compression stroke may be defined by evenly dividing the compression stroke into three stages of an initial stage, an intermediate stage, and the final stage.

The first-stage injection 6031 starting on the intake stroke may start the fuel injection in an early half of the intake stroke. The early half of the intake stroke may be defined by evenly dividing the intake stroke into two parts of the early half and the latter half. For example, the first-stage injection may start the fuel injection at 280° CA before TDC.

When the injection of the first-stage injection 6031 is started in the early half of the intake stroke, although not illustrated, the fuel spray hits an opening edge of the cavity 31 so that a portion of the fuel enters the squish area 171 of the combustion chamber 17 and the rest of the fuel enters the section within the cavity 31. The swirl flow is strong in the outer circumferential portion of the combustion chamber 17 and weak in the center portion. Therefore, the portion of the fuel that enters the squish area 171 joins the swirl flow, and the remaining fuel that enters the section within the cavity 31 joins the inner side of the swirl flow. The fuel joins the swirl flow, remains in the swirl flow during the intake stroke and the compression stroke and forms the mixture gas for the CI combustion in the outer circumference portion of the combustion chamber 17. The fuel that enters the inner side of the swirl flow also remains at the inner side of the swirl flow during the intake stroke and the compression stroke and forms the mixture gas for the SI combustion in the center portion of the combustion chamber 17.

When the engine 1 operates within the high-load medium-speed range (2), the excess air ratio $\lambda$ of the mixture gas in the center portion where the ignition plug 25 is disposed preferably is 1 or less, and the excess air ratio $\lambda$ of the mixture gas in the outer circumferential portion is 1 or less, preferably below 1. The air-fuel ratio (A/F) of the mixture gas in the center portion may be, for example, between 13 and the stoichiometric air-fuel ratio (14.7:1). The air-fuel ratio of the mixture gas in the center portion may be leaner than the stoichiometric air-fuel ratio. Further, the air-fuel ratio of the mixture gas in the outer circumferential portion may be, for example, between 11:1 and the stoichiometric air-fuel ratio, preferably between 11:1 and 12:1. Since the amount of fuel within the mixture gas increases in the outer circumferential portion when the excess air ratio $\lambda$ of the outer circumferential portion of the combustion chamber 17 is set to below 1, the temperature is lowered by the latent heat of vaporization of the fuel. The air-fuel ratio of the mixture gas in the entire combustion chamber 17 may be between 12.5:1 and the stoichiometric air-fuel ratio, preferably between 12.5:1 and 13:1.

The second-stage injection 6032 performed in the final stage of the compression stroke may start the fuel injection at 10° CA before TDC. By performing the second-stage injection immediately before TDC, the temperature in the combustion chamber 17 is lowered by the latent heat of vaporization of the fuel. Although a low-temperature oxidation reaction of the fuel injected by the first-stage injection 6031 progresses on the compression stroke and transitions to a high-temperature oxidation reaction before TDC, by performing the second-stage injection 6032 immediately before TDC so as to lower the temperature inside the compression stroke, the transition from the low-temperature oxidation reaction to the high-temperature oxidation reaction is avoided and pre-ignition is prevented. Note that the ratio between the injection amount of the first-stage injection and the injection amount of the second-stage injection may be, for example, 95:5.

The spark plug 25 ignites the mixture gas in the center portion of combustion chamber 17 near CTDC (reference character 6033). The spark plug 25 ignites, for example, after CTDC. Since the spark plug 25 is disposed in the center portion of the combustion chamber 17, the ignition of the ignition plug 25 causes the mixture gas in the center portion to start the SI combustion by flame propagation.

Within the high load range, the fuel injection amount increases as well as the temperature of the combustion chamber 17, therefore the CI combustion is likely to start early. In other words, within the high load range, the pre-ignition of the mixture gas is likely to occur. However, since the temperature of the outer circumferential portion of the combustion chamber 17 is lowered by the latent heat of vaporization of the fuel as described above, the CI combustion is avoided from starting immediately after the mixture gas is spark-ignited.

As described above, when the spark plug 25 ignites the mixture gas in the center portion, the combustion speed increases and the SI combustion is stabilized by high turbulence kinetic energy, and the flame of the SI combustion propagates in the circumferential direction along the strong swirl flow inside the combustion chamber 17. Then, at a given position of the outer circumferential portion of the combustion chamber 17 in the circumferential direction, the unburned mixture gas ignites by being compressed and the CI combustion starts.

In the concept of this SPCCI combustion, by the combination of stratifying the mixture gas in the combustion chamber 17 and causing the strong swirl flow in the combustion chamber 17, the SI combustion is sufficiently performed until the CI combustion starts. As a result, the generation of combustion noise is reduced, and since the combustion temperature does not become excessively high, generation of $NO_x$ is also reduced. Further, the variation in torque between cycles is reduced.

Further, since the temperature in the outer circumferential portion is low, the CI combustion becomes slower and the generation of the combustion noise is reduced. Moreover, since the combustion period is shortened by the CI combustion, within the high load range, the torque improves and also the thermal efficiency improves. Thus, by performing the SPCCI combustion within the high engine load range, the engine 1 is improved in the fuel efficiency while avoiding the combustion noise.

When the engine 1 operates at the high speed side of the high-load medium-speed range (2), the injector 6 starts the fuel injection on the intake stroke (reference character 6041).

The first-stage injection 6041 starting on the intake stroke may start the fuel injection in the early half of the intake stroke similarly to the above description. For example, the first-stage injection 6041 may start the fuel injection at 280° CA before TDC. The first-stage injection may last over the intake stroke and end on the compression stroke. By setting the start of injection of the first-stage injection 6041 in the early half of the intake stroke, the mixture gas for the CI combustion is formed in the outer circumferential portion of the combustion chamber 17 and the mixture gas for the SI combustion is formed in the center portion of the combustion chamber 17. Similar to the above description, the excess air ratio $\lambda$ of the mixture gas in the center portion where the ignition plug 25 is disposed preferably is 1 or less, and the excess air ratio $\lambda$ of the mixture gas in the outer circumferential portion is 1 or less, preferably below 1. The air-fuel ratio (A/F) of the mixture gas in the center portion may be, for example, between 13 and the stoichiometric air-fuel ratio (14.7:1). The air-fuel ratio of the mixture gas in the center portion may be leaner than the stoichiometric air-fuel ratio. Further, the air-fuel ratio of the mixture gas in the outer circumferential portion may be, for example, between 11:1 and the stoichiometric air-fuel ratio, preferably between 11:1 and 12:1. The air-fuel ratio of the mixture gas in the entire combustion chamber 17 may be between 12.5:1 and the stoichiometric air-fuel ratio, preferably between 12.5:1 and 13:1.

When the engine speed increases, the time length during which the fuel injected in the first-stage injection 6041 reacts becomes shorter. Therefore, the second-stage injection for suppressing the oxidation reaction of the mixture gas may be omitted.

The spark plug 25 ignites the mixture gas in the center portion of combustion chamber 17 near CTDC (reference character 6042). The spark plug 25 ignites, for example, after CTDC.

As described above, by stratifying the mixture gas, within the high-load medium-speed range (2), the combustion noise is reduced and the SPCCI combustion is stabilized.

Since the engine 1 performs the SPCCI combustion by setting the mixture gas to or leaner than the stoichiometric air-fuel ratio within the high-load medium-speed range (2) as described above, the high-load medium-speed range (2) may be referred to as "SPCCIλ≤1 range."

(High-Load Low-Speed Range (3))

When the engine 1 is operating within the high-load low-speed range (3), the engine 1 performs the SI combustion instead of the SPCCI combustion. The high-load low-speed range (3) corresponds to the first high load segment (C1) on the operating range map 700 or 701.

The reference character 605 in FIG. 17 indicates one example of the fuel injection timings (reference characters 6051 and 6052) and the ignition timing (reference character 6053), and a combustion waveform (reference character 6054) when the engine 1 is operating in the operating state of the reference character 605 within the high-load low-speed range (3) of the engine 1.

The EGR system 55 introduces the EGR gas into the combustion chamber 17 when the operating state of the engine 1 is within the high-load low-speed range (3). The engine 1 reduces the EGR gas amount as the engine load increases. At the full load, the EGR gas may be set to zero.

When the engine 1 operates within the high-load low-speed range (3), the air-fuel ratio (A/F) of the mixture gas is at the stoichiometric air-fuel ratio (A/F≈44.7:1) in the entire combustion chamber 17. The A/F of the mixture gas may be set to remain within the purification window of the three-way catalyst. Therefore, the excess air ratio λ of the mixture gas may be set to 1.0±0.2. By setting the air-fuel ratio of the mixture gas to the stoichiometric air-fuel ratio, the fuel efficiency improves within the high-load low-speed range (3). When the engine 1 operates within the high-load low-speed range (3), the fuel concentration of the mixture gas in the entire combustion chamber 17 may be set so that the excess air ratio λ is 1 or less and equal to or higher than the excess air ratio λ within the high-load medium-speed range (2), preferably higher than the excess air ratio λ within the high-load medium-speed range (2).

On the operating range map 702, when the engine 1 operates within the high-load low-speed range (3), the injector 6 injects the fuel into the combustion chamber 17 at the timings of the intake stroke and in the retard period from the final stage of the compression stroke to the early stage of the expansion stroke (reference characters 6051 and 6052). By injecting the fuel in two injections, the amount of fuel injected in the retard period is reduced. By injecting the fuel on the intake stroke (reference character 6051), the formation period of time of the mixture gas is sufficiently secured. Additionally, by injecting the fuel in the retard period (reference character 6052), the flow in the combustion chamber 17 immediately before the ignition is strengthened, which is advantageous in stabilizing the SI combustion.

After the fuel is injected, the spark plug 25 ignites the mixture gas at a timing near CTDC (reference character 6053). The spark plug 25 ignites, for example, after CTDC. The mixture gas causes the SI combustion on the expansion stroke. Since the SI combustion starts on the expansion stroke, the CI combustion does not start.

In order to avoid the pre-ignition, the injector 6 may retard the fuel injection timing as the engine speed decreases. The fuel injection in the retard period may end on the expansion stroke.

When the engine 1 operates within the high-load low-speed range (3), the swirl flow is made weaker than when operating within the high-load medium-speed range (2). When the engine 1 operates within the high-load low-speed range (3), the opening of the SCV 56 is larger than when operating within the high-load medium-speed range (2). The opening of the SCV 56 may be, for example, about 50% (i.e., half opened).

As indicated by the one-dotted chain line in the upper chart of FIG. 2, the axes of the nozzle ports of the injector 6 do not circumferentially overlap with the spark plug 25. The fuel injected from the nozzle ports flows in the circumferential direction due to the swirl flow in the combustion chamber 17. By the swirl flow, the fuel is promptly conveyed to near the spark plug 25. The fuel is vaporized while being conveyed to near the spark plug 25.

On the other hand, if the swirl flow is excessively strong, the fuel flows in the circumferential direction and reaches away from the spark plug 25, and the fuel cannot promptly be conveyed to near the spark plug 25. For this reason, when the engine 1 operates within the high-load low-speed range (3), the swirl flow is made weaker than when operating within the high-load medium-speed range (2). As a result, the fuel is promptly conveyed to near the spark plug 25, thus the ignitability of the mixture gas improves and the SI combustion stabilizes.

Within the high-load low-speed range (3), since the engine 1 performs the SI combustion by injecting the fuel in the retard period from the final stage of the compression stroke to the early stage of the expansion stroke, the high-load low-speed range (3) may be referred to as "retarded SI range."

(High Speed Range (4))

When the engine speed is high, the time length for the crank angle to change 1° becomes shorter. Therefore, for example, within the high speed side of the high load range, it is difficult to stratify the mixture gas in the combustion chamber 17 as described above. When the engine speed increases, it becomes difficult to perform the SPCCI combustion described above.

When the engine 1 is operating within the high speed range (4), the engine 1 performs the SI combustion instead of the SPCCI combustion. Note that the high speed range (4) extends over the entire load direction from low load to high loads.

The reference character 606 in FIG. 17 indicates one example of the fuel injection timing (reference characters 6061) and the ignition timing (reference character 6062), and a combustion waveform (reference character 6063) when the engine 1 is operating in the operating state of the reference character 606 within the high speed range (4) of the engine 1.

The EGR system 55 introduces the EGR gas into the combustion chamber 17 when the operating state of the engine 1 is within the high speed range (4). The engine 1 reduces the EGR gas amount as the engine load increases. At the full load, the EGR gas may be set to zero.

When operating in the high speed range (4), the engine 1 fully opens the SCV 56. No swirl flow is generated in the combustion chamber 17, and only the tumble flow is generated. By fully opening the SCV 56, the charging efficiency is improved in the high speed range (4) and a pumping loss is reduced.

When the engine 1 operates within the high speed range (4), the air-fuel ratio (A/F) of the mixture gas is basically at the stoichiometric air-fuel ratio (A/F≈14.7:1) in the entire combustion chamber 17. The excess air ratio λ of the mixture gas may be set to 1.0±0.2. Note that within the high load side of the high speed range (4) including the full load, the excess air ratio λ of the mixture gas may be less than 1.

When the engine 1 operates within the high speed range (4), the injector 6 starts the fuel injection on the intake stroke (reference character 6061). The injector 6 injects all the fuel for one combustion cycle in a lump. By starting the fuel injection on the intake stroke, homogeneous or substantially homogeneous mixture gas is formed in the combustion chamber 17. Further, when the engine speed is high, since the vaporization time of the fuel is secured as long as possible, the unburned fuel loss and generation of soot are reduced.

After the fuel injection is ended, the spark plug 25 ignites the mixture gas at a suitable timing before CTDC (reference character 6062).

Therefore, within the high speed range (4), since the engine 1 starts the fuel injection on the intake stroke and performs the SI combustion, the high speed range (4) may be referred to as "intake SI range."

(Operation Control of Engine in Engine Speed Direction in Third Configuration Example of Operating Range Map)

A waveform 132 in the lower part of FIG. 13 illustrates a relationship between the engine speed and the opening of the SCV 56 within the range where the SPCCI combustion is performed (particularly, the SPCCIλ>1 range and the SPCCIλ=1 range) on the operating range map 702 of FIG. 7C. The two-dotted chain line in the lower part of FIG. 13 indicates a waveform 131 in the upper chart of FIG. 13. As described above, within the SPCCI range of the operating range map 702, the opening of the SCV 56 is set to the closing side regardless of the engine speed. The waveform 132 is different in this regard from the waveform 131 in which the SCV 56 is fully opened until the engine speed exceeds N4. The swirl ratio may be set to, for example, about 1.5 to 3 within the SPCCIλ>1 range and the SPCCIλ=1 range. Here, the opening of the SCV 56 may be about 25 to 40%. Since the swirl flow is formed in the combustion chamber 17, the SI combustion in the SPCCI combustion becomes sharp, therefore, the SI ratio becomes higher than when the swirl flow is not formed.

Figure 18:
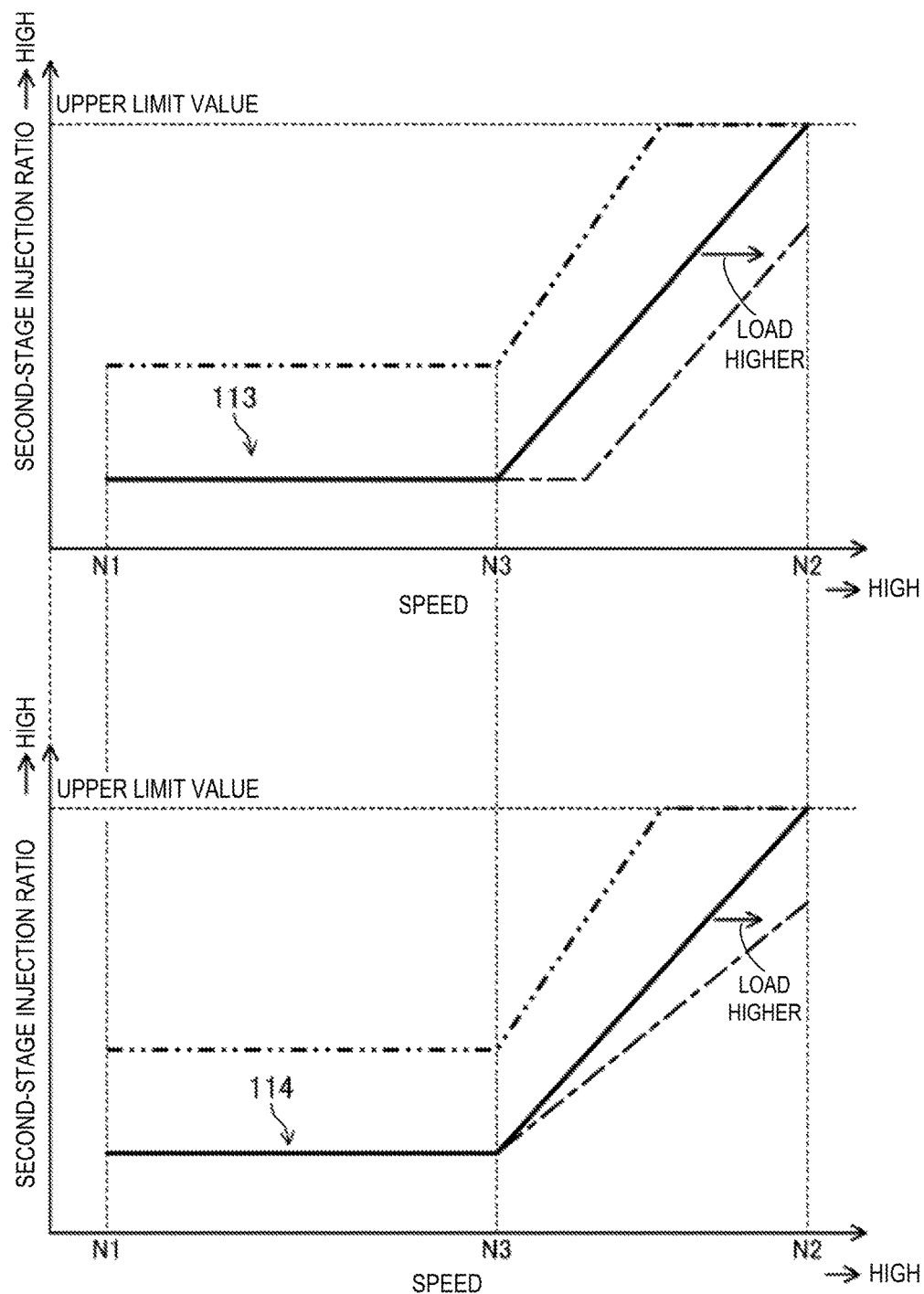
FIG. 18 shows charts in which the upper part illustrates one example of a relationship between the engine speed and the second-stage injection ratio on the operating range map of FIG. 7C, and the lower part illustrates another example of the relationship between the engine speed and the second-stage injection ratio.

FIG. 18 illustrates a relationship between the engine speed and the second-stage injection ratio within the SPCCI range of the operating range map 702 in FIG. 7C (waveform 113). In the upper chart of FIG. 18, the two-dotted chain line indicates the waveform 111 of FIG. 11. As described above, since the SI ratio becomes relatively high due to the swirl flow formed in the combustion chamber 17, the second-stage injection ratio is set relatively low. When the second-stage injection ratio is low, since the amount of fuel injected in the first-stage injection increases, a long vaporization time of the fuel is secured. This reduces the generation of unburned mixture gas and soot, which is advantageous in improving the exhaust emission performance of the engine 1. Note that also on the operating range map 702, the relationship between the engine speed and the SI ratio conforms to the relationship illustrated in FIG. 14.

Also in the waveform 113, as described above, when the engine speed exceeds N3, the second-stage injection ratio is increased to increase the SI ratio of the SPCCI combustion. The second-stage injection ratio increases as the engine speed increases. Note that the second-stage injection ratio may be increased from an engine speed higher than N3. In the example of the waveform 113, the second-stage injection ratio is continuously increased at a given change rate as the engine speed increases. Alternatively, the second-stage injection ratio may be increased in a stepwise fashion (i.e., discontinuously) as the engine speed increases. Since the SI ratio in the SPCCI combustion increases and the combustion noise caused by the SPCCI combustion is reduced, when the engine speed is high, NVH is suppressed below the allowable value.

While the second-stage injection ratio is increased as the engine speed increases, since the initial second-stage injection ratio is low, the second-stage injection ratio does not exceed the upper limit value even at the speed N2. That is, by forming the swirl flow in the combustion chamber 17, also within the highest engine speed range of the operating range in which the SPCCI combustion is performed (the range near the speed N2 in FIG. 18), when the engine speed is high, the second-stage injection ratio is increased to be higher than when the engine speed is low.

Note that although not illustrated, when the engine speed is equal to or less than the given speed N3, the change rate of the second-stage injection amount may be increased as the engine speed increases, instead of setting the change rate to zero. In this case, the change rate when the engine speed is equal to or less than the given speed N3 is preferably lower than the change rate when the engine speed exceeds the given speed N3.

Further, as illustrated by the one-dotted chain line in the upper chart of FIG. 18, the speed N3 at which the increase of the second-stage injection ratio starts may be shifted to the higher engine speed side when the engine load increases. In this manner, the range where the low second-stage injection ratio is maintained is extended to the higher speed side. If the second-stage injection ratio is low, the CI combustion in the SPCCI combustion increases, which is advantageous in improving the fuel efficiency.

Note that different from the example of the upper chart of FIG. 18, as indicated by the one-dotted chain line in a waveform 114 of the lower chart of FIG. 18, the slope of the straight line indicating the relationship between the engine speed and the second-stage injection ratio may be set gentler at a high engine load than at a low engine load.

Figure 19:
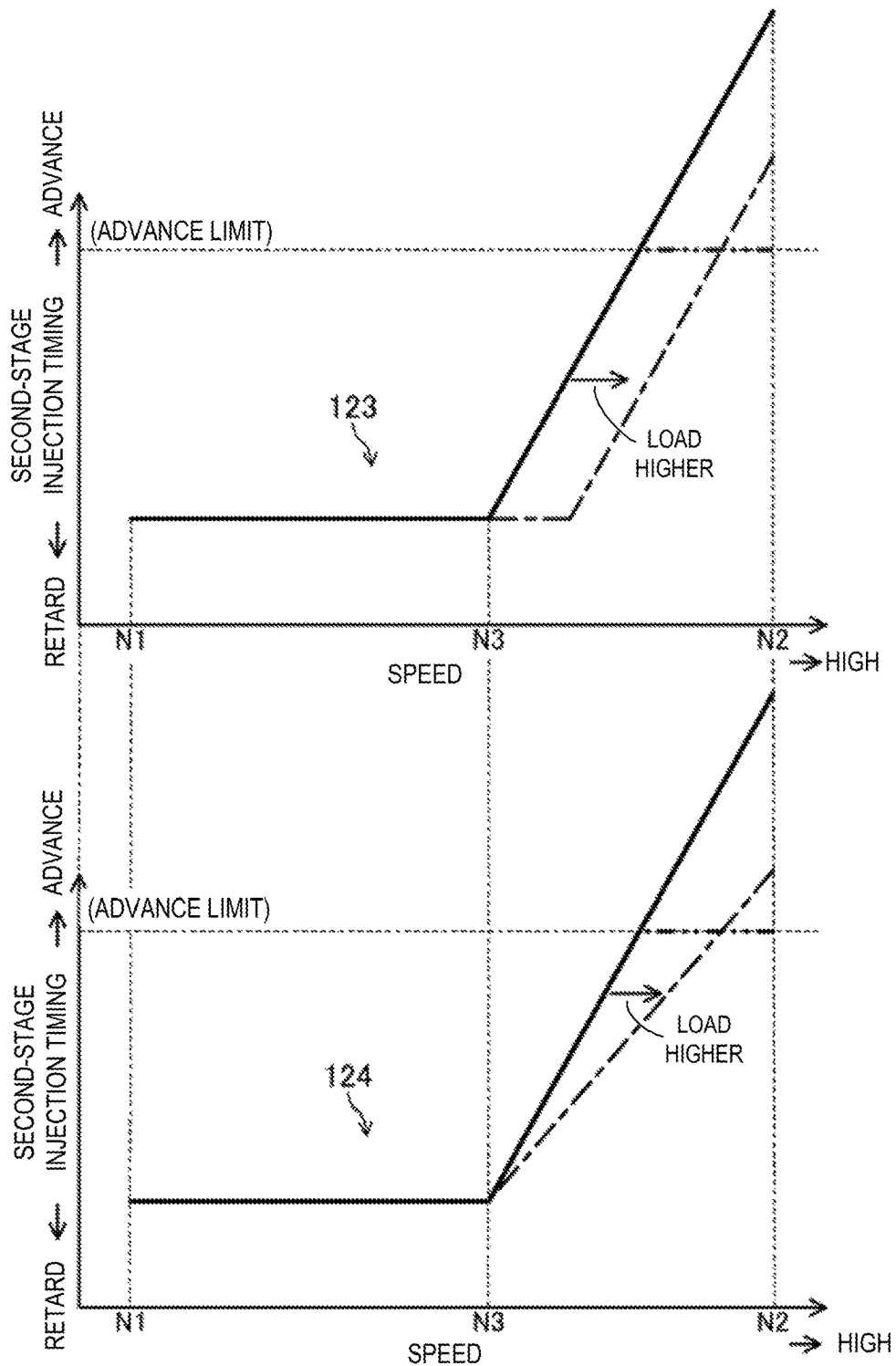
FIG. 19 shows charts in which the upper part illustrates one example of a relationship between the engine speed and the second-stage injection timing on the operating range map of FIG. 7C, and the lower part illustrates another example of the relationship between the engine speed and the second-stage injection timing.

FIG. 19 illustrates a relationship between the engine speed and the second-stage injection timing within the SPCCI range of the operating range map 702 in FIG. 7C. A waveform 123 in the upper chart of FIG. 19 corresponds to the waveform 121 in the upper chart of FIG. 12. The two-dotted chain line in FIG. 19 illustrates a part of the waveform 121 in FIG. 12.

Also in the waveform 123, when the engine speed exceeds the given speed N3, the ECU 10 advances the injection timing of the second-stage injection as the engine speed increases. When the engine speed is high, the combustion noise of the SPCCI combustion is suppressed low. Note that the injection timing of the second-stage injection may be advanced from an engine speed higher than N3.

Although not illustrated, when the engine speed is equal to or lower than the given speed N3, instead of setting the injection timing of the second-stage injection to zero, it may be increased as the engine speed increases. In this case, the change rate when the engine speed is equal to or lower than the given speed N3 may be lower than that when the engine speed exceeds the given speed N3.

If the swirl flow is not formed in the combustion chamber 17, when the injection timing of the second-stage injection is advanced, the flow in the combustion chamber 17 caused by the injection becomes weaker at the ignition timing. On the other hand, if the swirl flow is formed in the combustion chamber 17, even when the injection timing of the second-stage injection is advanced, the flow in the combustion chamber 17 caused by the injection at the ignition timing is kept strong. That is, by forming the swirl flow in the combustion chamber 17, the advance limit of the second-stage injection is eliminated, and as illustrated by the waveform 123, the injection timing of the second-stage injection is advanced as the engine speed increases. By forming the swirl flow in the combustion chamber 17, also within the highest engine speed range of the operating range in which the SPCCI combustion is performed (the range near the speed N2 in FIG. 18), the timing of the second-stage injection is advanced at a high engine speed than at a low engine speed.

When the second-stage injection timing is advanced, a long vaporization time length of the fuel is accordingly secured, and thus, the generation of unburned mixture gas and soot is reduced. Particularly, since the injection amount of the second-stage injection increases as the engine speed increases as illustrated in FIG. 18, advancing the second-stage injection timing is advantageous in securing the long time length for the fuel vaporization by the second-stage injection. This reduces the generation of unburned mixture gas and soot, which improves the exhaust emission performance of the engine.

Further, as illustrated by the one-dotted chain line in the upper chart of FIG. 18, the speed N3 at which the second-stage injection timing is started to be advanced may be shifted to the higher engine speed side when the engine load increases. In this manner, the range where the injection timing of the second-stage injection is late is extended to the higher speed side.

Note that different from the example of the upper chart of FIG. 19, as indicated by the one-dotted chain line in the waveform 124 of the lower chart of FIG. 19, the slope of the straight line indicating the relationship between the engine speed and the injection timing of the second-stage injection may be set gentler at a high engine load than at a low engine load.

(Example of Combustion Waveform of SPCCI Combustion)

Figure 20:
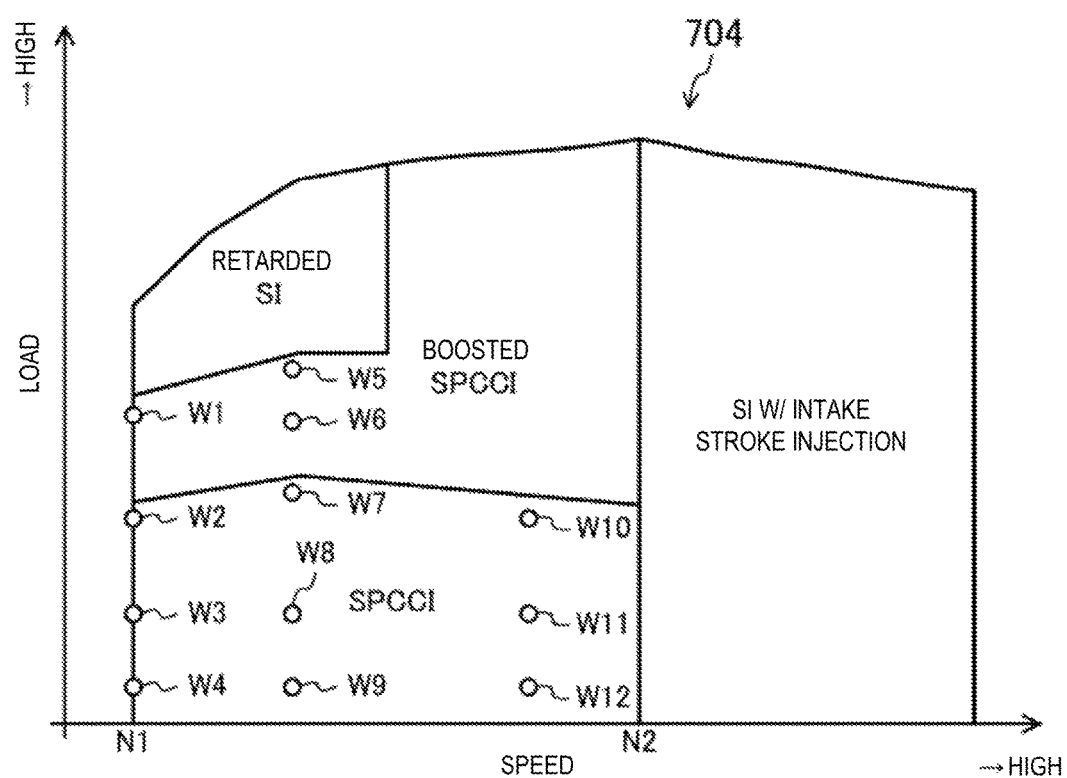
FIG. 20 is a chart illustrating another example of the operating range of the engine.
Figure 21:
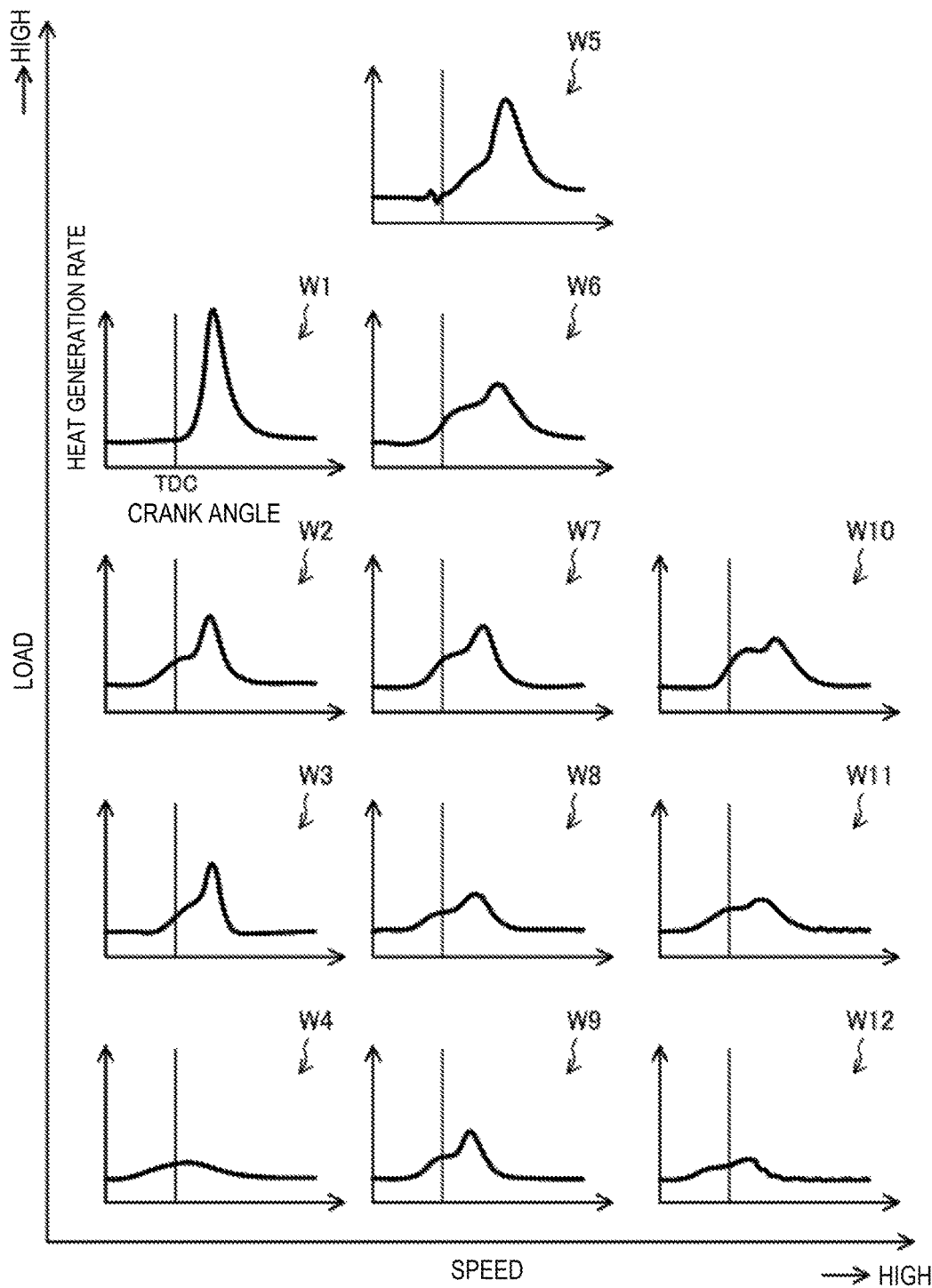
FIG. 21 is a diagram illustrating combustion waveforms in respective operating states illustrated in FIG. 20.

FIGS. 20 and 21 illustrate combustion waveforms in operating states W1 to W12 of the engine 1. An operating range map 704 illustrated in FIG. 20 conforms to the operating range map 702 in FIG. 7C. That is, the SPCCI combustion is performed within the low load range including the idle operation and extending in the low and medium speed ranges on the operating range map 704. This range corresponds to the low load range (1)-1 on the operating range map 702. Note that this range on the operating range map 704 of FIG. 20 is a range in which the boosting is not performed.

Further, on the operating range map 704 of FIG. 20, the SPCCI combustion is performed within the medium load range where the engine load is higher than the low load range and within the high load range where the engine load is further higher. This range corresponds to the medium load range (1)-2 and the high-load medium-speed range (2) on the operating range map 702. This range on the operating range map 704 of FIG. 20 is a range in which the boosting is performed.

Further, on the operating range map of FIG. 20, a low speed side of the high load range where the engine speed is lower than the medium speed range is the range in which the retarded SI combustion is performed. This range corresponds to the high-load low-speed range (3) on the operating range map 702.

Additionally, on the operating range map 704 of FIG. 20, the high speed range is the range in which the fuel is injected on the intake stroke to perform the SI combustion. This range corresponds to the high speed range (4) on the operating range map 702.

Also on the operating range map of FIG. 20, as illustrated in FIGS. 11 and 12 or FIGS. 18 and 19, within the range where the SPCCI combustion is performed, the second-stage injection ratio and/or the injection timing of the second-stage injection are changed according to the engine speed changes. The engine speeds N1 and N2 of FIGS. 11 and 12 or FIGS. 18 and 19 correspond to the engine speeds N1 and N2 of FIG. 14. Within the range in which the SPCCI combustion is performed, the SI ratio linearly increases as the engine speed increases (see FIG. 14). Since the combustion noise of the SPCCI combustion is suppressed low by increasing the SI ratio, when the engine speed is high, NVH is suppressed below the allowable value.

As described above, within the SPCCI range, the SI ratio is increased as the engine speed increases. When the waveforms of W2, W7, and W10 are compared, the peak of the SI combustion gradually increases in the order of W2, W7, and W10. As a result, the peak of the CI combustion gradually decreases in the order of W2, W7, and W10. Thus, the generation of combustion noise is reduced as the engine speed increases. Note that within the SPCCI range, the similar tendency is shown in the waveforms W3, W8, and W11 and the waveforms W4, W9, and W12, which are for lower engine loads than W2, W7, and W10.

Other Embodiments

Note that the control of the engine 1 performed by the ECU 10 is not limited to be based on the combustion model described above.

Further, the art disclosed here is not limited to be applied to the engine 1 having the above configuration. The configuration of the engine 1 may adopt various configurations.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 ECU (Controller)
17 Combustion Chamber
171 Squish Area
25 Spark Plug
3 Piston
31 Cavity
56 SCV (Intake Flow Control Device, Swirl Generating Part)
6 Injector
SW6 Pressure Sensor

What is claimed is:

1. A control system of a compression-ignition engine, comprising:
   an engine configured to cause combustion of a mixture gas inside a combustion chamber;
   an injector attached to the engine and configured to inject fuel into the combustion chamber;
   a spark plug disposed to be oriented into the combustion chamber and configured to ignite the mixture gas inside the combustion chamber; and
   a controller operatively connected to the injector and the spark plug, and configured to operate the engine by outputting a control signal to the injector and the spark plug, respectively, wherein
   after the spark plug ignites the mixture gas to start combustion, unburned mixture gas combusts by self-ignition,
   the controller outputs the control signal to the injector to perform a first-stage injection of the fuel and, after the first-stage injection, a second-stage injection in which the fuel is injected to at least form the mixture gas around the spark plug, and
   the controller also outputs the control signal to the injector to control a ratio of the injection amount of the second-stage injection with respect to the injection amount of the first-stage injection to be higher at a high engine speed than at a low engine speed.

2. The control system of claim 1, wherein
   the controller outputs the control signal to the injector so that the ratio of the injection amount of the second-stage injection changes at a given change rate as the engine speed changes, and
   the controller causes the change rate to be higher at a high engine speed than at a low engine speed.

3. The control system of claim 2, wherein
   when the engine speed is equal to or lower than a first given speed, the controller outputs the control signal to the injector so that the ratio of the injection amount of the second-stage injection is constant even when the engine speed changes, and
   when the engine speed exceeds the first given speed, the controller outputs the control signal to the injector so that the ratio of the injection amount of the second-stage injection increases as the engine speed increases.

4. The control system of claim 3, wherein when the engine speed exceeds a second given speed that is higher than the first given speed, the controller outputs the control signal to the injector so that the ratio of the injection amount of the second-stage injection becomes a given value.

5. The control system of claim 4, further comprising an intake flow control device attached to the engine that is configured to adjust a flow of intake air introduced into the combustion chamber,
   wherein, when the engine speed exceeds the second given speed, the controller outputs the control signal to the intake flow control device to strengthen the flow of the intake air.

6. The control system of claim 1, wherein the controller outputs the control signal to the injector so that an injection timing of the second-stage injection is advanced when the engine operates at a high speed compared to when the engine operates at a low speed.

7. The control system of claim 1, wherein
   the engine includes a piston constituting the combustion chamber, the piston being formed with a cavity facing the injector, by indenting an upper surface of the piston, and
   in the first-stage injection, the fuel is injected into a squish area outside the cavity on compression stroke, and in the second-stage injection, the fuel is injected into the cavity.

8. The control system of claim 1, wherein the controller sets a self-ignition (SI) ratio to be lower than 100% and sets the SI ratio to be higher at a high engine speed than at a low engine speed, the SI ratio being an index relating to a ratio of a heat amount generated when the ignited mixture gas combusts by flame propagation with respect to a total heat amount generated when the mixture gas inside the combustion chamber combusts.

9. The control system of claim 1, further comprising a swirl generating part configured to generate a swirl flow inside the combustion chamber,
   wherein the controller outputs the control signal to the swirl generating part to generate the swirl flow inside the combustion chamber regardless of the engine speed, and
   wherein, at least within a highest speed segment of an operating range of the engine in which the spark plug ignites the mixture gas to start the combustion and then the unburned mixture gas combusts by self-ignition, the controller outputs the control signal to the injector so that the ratio of the injection amount of the second-stage injection becomes higher at a high engine speed than at a low engine speed.

10. The control system of claim 1, wherein
    the controller outputs the control signal to the injector so that the ratio of the injection amount of the second-stage injection changes at a given change rate as the engine speed changes,
    the controller causes the change rate to be higher at a high engine speed than at a low engine speed,
    when the engine speed is equal to or lower than a first given speed, the controller outputs the control signal to the injector so that the ratio of the injection amount of the second-stage injection is constant even when the engine speed changes,
    when the engine speed exceeds the first given speed, the controller outputs the control signal to the injector so that the ratio of the injection amount of the second-stage injection increases as the engine speed increases, and
    when the engine speed exceeds a second given speed that is higher than the first given speed, the controller outputs the control signal to the injector so that the ratio of the injection amount of the second-stage injection becomes a given value.

11. A control system of a compression-ignition engine, comprising:
    an engine configured to cause combustion of mixture gas inside a combustion chamber;
    an injector attached to the engine and configured to inject fuel into the combustion chamber;
    a spark plug disposed adjacent to the injector and configured to ignite the mixture gas inside the combustion chamber; and
    a controller operatively connected to the injector and the spark plug, and configured to operate the engine by outputting a control signal to the injector and the spark plug, respectively, wherein
    after the spark plug ignites the mixture gas to start combustion, unburned mixture gas combusts by self-ignition,
    the controller outputs the control signal to the injector to perform a first-stage injection of the fuel in a period from intake stroke to an early half of compression stroke, and a second-stage injection in a period from a latter half of the compression stroke to an early half of expansion stroke, and the controller also outputs the control signal to the injector to control a ratio of the injection amount of the second-stage injection with respect to the injection amount of the first-stage injection to be higher at a high engine speed than at a low engine speed.

12. The control system of claim 11, wherein the controller outputs the control signal to the injector so that the ratio of the injection amount of the second-stage injection changes at a given change rate as the engine speed changes, and the controller causes the change rate to be higher at a high engine speed than at a low engine speed.

13. The control system of claim 12, wherein when the engine speed is equal to or lower than a first given speed, the controller outputs the control signal to the injector so that the ratio of the injection amount of the second-stage injection is constant even when the engine speed changes, and when the engine speed exceeds the first given speed, the controller outputs the control signal to the injector so that the ratio of the injection amount of the second-stage injection increases as the engine speed increases.

14. The control system of claim 13, wherein when the engine speed exceeds a second given speed that is higher than the first given speed, the controller outputs the control signal to the injector so that the ratio of the injection amount of the second-stage injection becomes a given value.

15. The control system of claim 14, further comprising an intake flow control device attached to the engine that is configured to adjust a flow of intake air introduced into the combustion chamber, wherein, when the engine speed exceeds the second given speed, the controller outputs the control signal to the intake flow control device to strengthen the flow of the intake air.

16. The control system of claim 11, wherein the controller outputs the control signal to the injector so that an injection timing of the second-stage injection is advanced when the engine operates at a high speed compared to when the engine operates at a low speed.

17. The control system of claim 11, wherein the engine includes a piston constituting the combustion chamber, the piston being formed with a cavity facing the injector, by indenting an upper surface of the piston, and in the first-stage injection, the fuel is injected into a squish area outside the cavity on compression stroke, and in the second-stage injection, the fuel is injected into the cavity.

18. The control system of claim 11, wherein the controller sets a self-ignition (SI) ratio to be lower than 100% and sets the SI ratio to be higher at a high engine speed than at a low engine speed, the SI ratio being an index relating to a ratio of a heat amount generated when the ignited mixture gas combusts by flame propagation with respect to a total heat amount generated when the mixture gas inside the combustion chamber combusts.

19. The control system of claim 11, further comprising a swirl generating part configured to generate a swirl flow inside the combustion chamber, wherein the controller outputs the control signal to the swirl generating part to generate the swirl flow inside the combustion chamber regardless of the engine speed, and wherein, at least within a highest speed segment of an operating range of the engine in which the spark plug ignites the mixture gas to start the combustion and then the unburned mixture gas combusts by self-ignition, the controller outputs the control signal to the injector so that the ratio of the injection amount of the second-stage injection becomes higher at a high engine speed than at a low engine speed.

20. The control system of claim 11, wherein the controller outputs the control signal to the injector so that the ratio of the injection amount of the second-stage injection changes at a given change rate as the engine speed changes, the controller causes the change rate to be higher at a high engine speed than at a low engine speed, when the engine speed is equal to or lower than a first given speed, the controller outputs the control signal to the injector so that the ratio of the injection amount of the second-stage injection is constant even when the engine speed changes, when the engine speed exceeds the first given speed, the controller outputs the control signal to the injector so that the ratio of the injection amount of the second-stage injection increases as the engine speed increases, and wherein when the engine speed exceeds a second given speed that is higher than the first given speed, the controller outputs the control signal to the injector so that the ratio of the injection amount of the second-stage injection becomes a given value.

* * * * *